United States Patent
Fahey et al.

(10) Patent No.: US 11,605,122 B2
(45) Date of Patent: Mar. 14, 2023

(54) AIRCRAFT MODIFICATION MARKETPLACE

(71) Applicant: The Boeing Company, Chicago, IL (US)

(72) Inventors: Patrick C. Fahey, Seattle, WA (US); Sheldon D. Gilley, Bellevue, WA (US); Mark A. Bowe, Arlington, WA (US)

(73) Assignee: The Boeing Company, Chicago, IL (US)

( * ) Notice: Subject to any disclaimer, the term of this patent is extended or adjusted under 35 U.S.C. 154(b) by 638 days.

(21) Appl. No.: 16/573,486

(22) Filed: Sep. 17, 2019

(65) Prior Publication Data

US 2020/0134704 A1      Apr. 30, 2020

Related U.S. Application Data

(60) Provisional application No. 62/753,914, filed on Oct. 31, 2018.

(51) Int. Cl.
*G06Q 30/00* (2012.01)
*G06Q 30/0601* (2023.01)
(Continued)

(52) U.S. Cl.
CPC ....... *G06Q 30/0641* (2013.01); *G06F 3/0482* (2013.01); *G06F 16/252* (2019.01);
(Continued)

(58) Field of Classification Search
CPC .............. G06Q 30/00; G06Q 30/0601; G06Q 30/0623; G06Q 30/0625; G06Q 30/0641
See application file for complete search history.

(56) References Cited

U.S. PATENT DOCUMENTS 7,096,193 B1 *   8/2006   Beaudoin ......... G06Q 10/06311
                                                705/26.1
8,660,912 B1 *   2/2014   Dandekar .............. G06Q 30/02
                                                705/26.1
(Continued)

OTHER PUBLICATIONS

Center, Ogden Air Logistics. "Developing a Stable Architecture to Interface Aircraft to Commercial PCs." Real-Time Software Development Requires Rigid Constraints 801: 26. (Year: 2003).*
(Continued)

*Primary Examiner* — Christopher B Seibert
(74) *Attorney, Agent, or Firm* — Haynes and Boone, LLP

(57) ABSTRACT

Methods and systems for managing aircraft modifications. A link to a customer information database is established in response to receiving a launch input for a modification marketplace entered by a user via a graphical user interface. The customer information database includes identification information and customer information associated with the user. A determination is made as to whether the user is authorized to access the modification marketplace using the identification information. A link to an engineering database containing aircraft product information is established in response to a determination that the user is authorized to access the modification marketplace. A selected level of access to the aircraft product information in the engineering database is provided, via the graphical user interface, based on the customer information associated with the user.

30 Claims, 50 Drawing Sheets

(51) Int. Cl.
   *H04L 9/40* (2022.01)
   *G06F 16/25* (2019.01)
   *G06F 3/0482* (2013.01)

(52) U.S. Cl.
   CPC ..... *G06Q 30/0603* (2013.01); *G06Q 30/0621* (2013.01); *G06Q 30/0635* (2013.01); *G06Q 30/0643* (2013.01); *H04L 63/102* (2013.01)

(56) References Cited

U.S. PATENT DOCUMENTS

| | | | |
|---|---|---|---|
| 2005/0187677 A1 | 8/2005 | Walker | |
| 2006/0034494 A1* | 2/2006 | Holloran | H04L 9/32 382/116 |
| 2006/0184381 A1* | 8/2006 | Rice | G06Q 30/0206 705/317 |
| 2007/0106570 A1* | 5/2007 | Hartman | G06Q 20/12 705/26.8 |
| 2009/0037291 A1* | 2/2009 | Dawson | G06Q 30/0603 705/27.2 |
| 2009/0282353 A1* | 11/2009 | Halbherr | G01C 21/3682 715/769 |
| 2010/0114654 A1* | 5/2010 | Lukose | G06Q 30/0256 705/14.54 |
| 2011/0066461 A1* | 3/2011 | Yang | G06Q 10/06311 705/28 |
| 2012/0136756 A1* | 5/2012 | Jitkoff | G06F 16/9577 715/224 |
| 2013/0061174 A1 | 3/2013 | Buchanan et al. | |
| 2013/0158955 A1 | 6/2013 | Song et al. | |
| 2013/0297439 A1* | 11/2013 | Chanoine | G06Q 30/08 705/26.4 |
| 2014/0108066 A1* | 4/2014 | Lam | G06Q 50/14 705/5 |
| 2014/0297461 A1* | 10/2014 | Boone | G06Q 30/06 705/26.8 |
| 2014/0337777 A1 | 11/2014 | Senesac | |
| 2014/0380179 A1* | 12/2014 | Bose | G06Q 10/10 715/738 |
| 2018/0158263 A1 | 6/2018 | Katta et al. | |
| 2020/0134705 A1* | 4/2020 | Fahey | H04L 63/102 |

OTHER PUBLICATIONS

Reis, Luis, Ana Paula Rocha, and Antonio JM Castro. "An electronic marketplace for airlines." International Conference on Practical Applications of Agents and Multi-Agent Systems. Springer, Cham, 2018. (Year: 2018).*

Brohan, Mark, Q&A with Boeing: How it flies with B2B e-commerce, https://www.digitalcommerce360.com/2018/01/31/qa-boeing-flies-b2b-e-commerce/, Jan. 31, 2018. 5 pgs.

International Search Report and Written Opinion issued for International Application No. PCT/US2019/59258, dated Jan. 24, 2020, ISA/US, 18 pages.

* cited by examiner

AIRCRAFT MODIFICATION MARKETPLACE

CROSS-REFERENCE TO RELATED APPLICATIONS

This application claims the benefit of U.S. Provisional Application No. 62/753,914, filed Oct. 31, 2018, which is incorporated herein by reference in its entirety. Further, this application is related to U.S. patent application Ser. No. 16/573,526, entitled "Aircraft Production Marketplace," as well as U.S. patent application Ser. No. 16/573,572, entitled "Aircraft Modification User Interface," each of which is filed even date hereof and is incorporated herein by reference in its entirety.

FIELD

The present disclosure relates generally to managing modifications to aircraft and, more particularly, to methods and systems for providing a virtual aircraft marketplace that determines whether a user is authorized to make modifications to an aircraft and manages the ordering of such modifications via the virtual aircraft marketplace.

BACKGROUND

Oftentimes, the ordering and purchasing of complex products is more time-consuming and difficult than desired. For example, the ordering of retrofit features for a complex product, such as an airplane, or the building of a brand new configuration for an aircraft may require a customer having to search through numerous static documents, such as product catalogs, requirements, service bulletins, and other types of documents. Some currently used e-commerce systems allow a customer to view the static documents and files for products online and allow the online purchase of products. This type of e-commerce is often used between businesses to conduct commercial transactions. However, these e-commerce systems may be unable to provide the customer with a way of placing orders for products and making purchases with the desired level of speed and efficiency. For example, these e-commerce systems may require that the customer spend more time than desired to make informed decisions about products. Further, these systems may provide a generic ordering and purchase experience and may be unable to distinguish between the needs and business strategies of different customers. Thus, systems and methods for improving customer experience are desired.

SUMMARY

In one example embodiment, a method is provided for managing modifications to aircraft. A link to a customer information database is established in response to receiving a launch input for a modification marketplace entered by a user via a graphical user interface. The customer information database includes identification information and customer information associated with the user. A determination is made as to whether the user is authorized to access the modification marketplace using the identification information associated with the user. A link to an engineering database containing aircraft product information is established in response to a determination that the user is authorized to access the modification marketplace. A selected level of access to the aircraft product information in the engineering database is provided, via the graphical user interface, based on the customer information associated with the user.

In another example embodiment, a method for managing aircraft modification is provided. A link is established to a customer information database in response to receiving a launch input for a modification marketplace entered by a user via a graphical user interface. The customer information database includes identification information and customer information associated with the user. A determination is made as to whether the user is authorized to access the modification marketplace using the identification information associated with the user. A link to at least one of a plurality of data systems containing aircraft product information is established in response to a determination that the user is authorized to access the modification marketplace. A selected level of access to the aircraft product information is provided, via the graphical user interface, based on the customer information associated with the user. User input selecting a set of aircraft is received via the graphical user interface. A feature selection to modify the set of aircraft is received, via the graphical user interface. Corresponding information from at least one of the plurality of data systems is retrieved in response to receiving the feature selection. A determination is made as to whether the feature selection includes a feature already installed on at least one of the set of aircraft selected based on the corresponding information retrieved. The user is alerted, via the graphical user interface, that the feature was previously installed on the at least one of the set of aircraft.

In yet another example embodiment, a system is provided for managing modifications to aircraft. The system includes a graphical user interface for display on a display system and a modification marketplace presented to a user via the graphical user interface. The modification marketplace comprises an access manager and a retrofit manager. The access manager establishes a link to a customer information database in response to receiving a launch input for a modification marketplace entered by the user via a graphical user interface. The customer information database includes identification information and customer information associated with the user. The access manager determines whether the user is authorized to access the modification marketplace using the identification information associated with the user. The access manager establishes a link to at least one of a plurality of data systems containing aircraft product information in response to a determination that the user is authorized to access the modification marketplace. The access manager provides, via the graphical user interface, a selected level of access to the aircraft product information based on the customer information associated with the user. The retrofit manager receives, via the graphical user interface, user input selecting a set of aircraft and customizes an experience of the user within the modification marketplace based on the set of aircraft selected.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The example embodiments described below provide various related methods and systems for configuring an aircraft. In particular, the example embodiments provide methods and apparatuses for modifying an aircraft that is already in use, configuring a new aircraft that has already been ordered, and pre-configuring an aircraft for purchase in a virtual aircraft marketplace. For example, the example embodiments described below provide a modification marketplace that allows a user to access an engineering database containing aircraft product information provided by an aircraft manufacturer for various aircraft. This aircraft product information includes modification information that identifies, for example, modifications that are available for a particular aircraft. The modification marketplace ensures that only authorized users are allowed to access such modification information. The example embodiments described below also provide a production marketplace that allows a user to explore production options for a new aircraft or to pre-configure a new aircraft.

Figure 1:
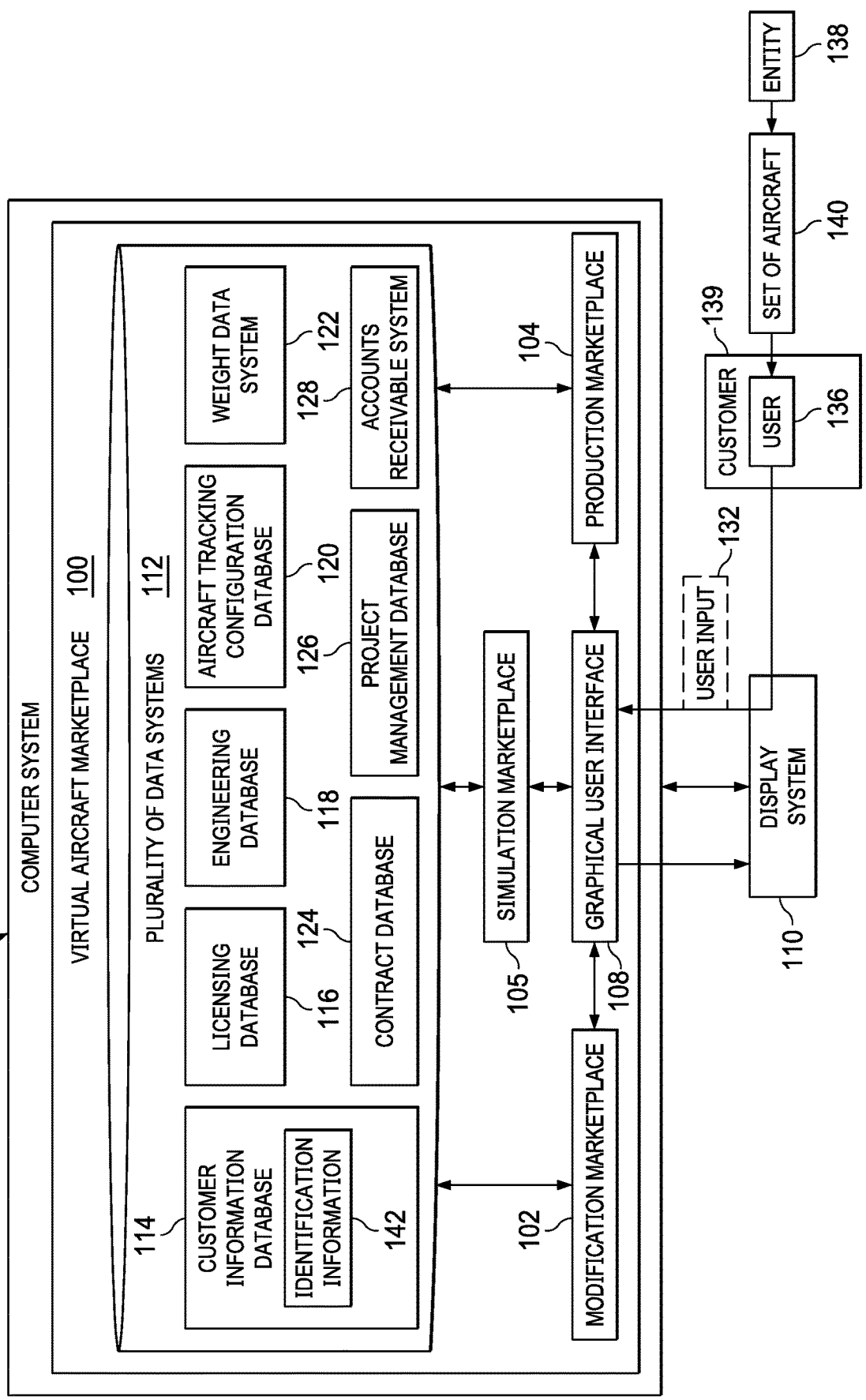
FIG. 1 is a block diagram of a virtual aircraft marketplace in accordance with an example embodiment.

Referring now to the figures, FIG. 1 is a block diagram of a virtual aircraft marketplace 100 in accordance with an illustrative embodiment. Virtual aircraft marketplace 100 is an overall virtual environment that allows a user to customize both existing and new aircraft. This overall virtual environment may include any number of individual or integrated virtual environments. Virtual aircraft marketplace 100 may include, for example, modification marketplace 102, production marketplace 104, simulation marketplace 105, or a combination thereof.

Modification marketplace 102 and production marketplace 104 may exist separately and independently or may be integrated and thereby function in combination. Simulation marketplace 105 exists separately and independently of modification marketplace 102 and production marketplace 104. But in other illustrative examples, modification marketplace 102 and simulation marketplace 105, production marketplace 104 and simulation marketplace 105, or a combination of all three may be integrated.

Each of virtual aircraft marketplace 100, modification marketplace 102, production marketplace 104, and simulation marketplace 105 may be implemented using software, hardware, firmware, or a combination thereof. When software is used, the operations performed by each of virtual aircraft marketplace 100, modification marketplace 102, production marketplace 104, and simulation marketplace 105 may be implemented using, for example, without limitation, program code configured to run on a processor unit. When firmware is used, the operations performed by each of virtual aircraft marketplace 100, modification marketplace 102, production marketplace 104, and simulation marketplace 105 may be implemented using, for example, without limitation, program code and data stored in persistent memory to run on a processor unit.

When hardware is employed, the hardware may include one or more circuits that operate to perform the operations performed by each of virtual aircraft marketplace 100, modification marketplace 102, production marketplace 104, and simulation marketplace 105. Depending on the implementation, the hardware may take the form of a circuit system, an integrated circuit, an application specific integrated circuit (ASIC), a programmable logic device, or some other suitable type of hardware device configured to perform any number of operations. A programmable logic device may be configured to perform certain operations. The device may be permanently configured to perform these operations or may be reconfigurable. A programmable logic device may take the form of, for example, without limitation, a programmable logic array, programmable array logic, a field programmable logic array, a field programmable gate array, or some other type of programmable hardware device.

Depending on the desired implementation, virtual aircraft marketplace 100 may be implemented using computer system 106, a cloud computing system, a set of virtual machines, or a combination thereof. The set of virtual machines may include one or more virtual machines. Although the below description of virtual aircraft marketplace 100 is discussed with respect to computer system 106, this description may also be applicable when virtual aircraft marketplace 100 is additionally or alternatively implemented using a cloud computing system, a set of virtual machines, or both. Computer system 106 may comprise one computer or multiple computers in communication with each other. Computer system 106 may comprise one computer or multiple computers in communication with each other Virtual aircraft marketplace 100 may be presented to a user in graphical user interface 108 displayed on a display system 110 in communication with computer system 106. Display system 110 may communicate with computer system 106 over any number of or combination of wired, wireless, optical, or other types of communications links. Display system 110 may include one or more display devices. In some illustrative examples, display system 110 is implemented as part of computer system 106. In some illustrative examples, display system 110 is implemented using a virtual reality system or an augmented reality system.

Virtual aircraft marketplace 100 is in communication with plurality of data systems 112 using any number of communications links. Each communications link may include a wired communications link, wireless communications link, optical communications link, other type of communications link, or combination thereof. Each data system of plurality of data systems 112 may be an organized collection of data, data structure, data storage, or combination thereof implemented using software, hardware, firmware, or a combination thereof. For example, a data system of plurality of data systems 112 may include at least one of a database, a data repository, a spreadsheet, a table, a file, a server, a group of servers, cloud storage, associative memory, a computer-based platform, an Internet-based platform, some other type of data system, or a combination thereof. In one or more examples, a data system includes multiple servers (e.g., a web server, a database server, a file server, etc.) in communication with each other.

In one or more illustrative examples, each of plurality of data systems 112 is stored within computer system 106. In other illustrative examples, each of plurality of data systems 112 may be stored within computer system 106, implemented as part of computer system 106, located remotely with respect to computer system 106, or a combination thereof. Plurality of data systems 112 may include, for example, without limitation, customer information database 114, licensing database 116, engineering database 118, aircraft tracking configuration (ACT) database 120, weight data system 122, contract information database 124, project management database 126, accounting receivable system 128. The different types of information stored in these databases are discussed in greater detail below.

Virtual aircraft marketplace 100 allows user 136, if user 136 is so authorized, to explore, analyze, and manage information provided by entity 138. Entity 138 may be, for example, an aircraft manufacturer. Entity 138 may be considered as "hosting" virtual aircraft marketplace 100 and thereby, modification marketplace 102 and production marketplace 104. User 136 is associated with customer 139 by either being customer 139 or representing customer 139 of entity 138. For example, user 136 may be an employee, agent, or other type of representative of customer 139. Customer 139 may be, for example, an aircraft purchaser, aircraft owner, aircraft lessor, aircraft operator, an airline, an air freight company, an aircraft charter company, an aircraft leasing company, a third-party aircraft modification center, or some other type of customer. References herein to "customer 139" with respect to virtual aircraft marketplace 100 may generally be considered interchangeable with "user 136," who is or represents customer 139. For example, a reference to user input entered by customer 139 via graphical user interface 108 may generally be considered as meaning a user input entered by user 136, who is or represents customer 139, via graphical user interface 108.

In one illustrative example, customer 139 owns set of aircraft 140, which may have been provided (e.g., manufactured) by entity 138. Set of aircraft 140 may include one or more aircraft, such as one or more airplanes. When set of aircraft 140 includes multiple aircraft, set of aircraft 140 may be referred to as a fleet. Modification marketplace 102 allows customer 139 to identify modifications for set of aircraft 140. For example, modification marketplace 102 may allow customer 139 to identify modifications available from entity 138 for retrofitting to set of aircraft 140.

In other illustrative examples, customer 139 may be looking to purchase one or more new aircraft to add to set of aircraft 140 or one or more aircraft that will be the first of its fleet. Production marketplace 104 allows customer 139 to explore production options available for a new aircraft or for pre-configuring a new aircraft. In some cases, customer 139 is a repeat customer of entity 138. In other cases, customer 139 is a new customer.

In some examples, customer 139 is looking to purchase features for one or more flight simulators. For example, customer 139 may be a flight training company, a flight simulator manufacturer, or an airline with a flight training simulator. Simulation marketplace 105 allows customer 139 to explore the feature options available for purchase a flight simulator. In these illustrative examples, simulation marketplace 105 may be implemented using many of the same, if not the same, components as modification marketplace 102 described in FIG. 1 and in FIG. 2 below. In certain examples, simulation marketplace 105 and modification marketplace 102 may be integrated. In still other example, simulation marketplace 105 may be implemented as part of modification marketplace 102. In some illustrative examples, simulation marketplace 105 may be entirely independent of modification marketplace 102.

When customer 139 enters virtual aircraft marketplace 100, customer 139 enters input (e.g., a username and password, a key, or other login credentials) via graphical user interface 108 in order to gain access to virtual aircraft marketplace 100. Customer 139 is allowed access to virtual aircraft marketplace 100 if the input entered by customer 139 is matched to corresponding identification information stored in customer information database 114. For example, identification information 142 is may be stored in customer information database 114 for customer 139.

Identification information 142 may include, for example, a user name, a user password, a company name, a company password, other types of login credentials, security clearance information, other types of identifying information, or a combination thereof. Identification information 142 may be stored in customer information database 114. Identification information 142 is used to determine the level of access to virtual aircraft marketplace 100 given to customer 139. Once within virtual aircraft marketplace 100, customer 139 is provided an option for selecting modification marketplace 102, production marketplace 104, or both.

Figure 2:
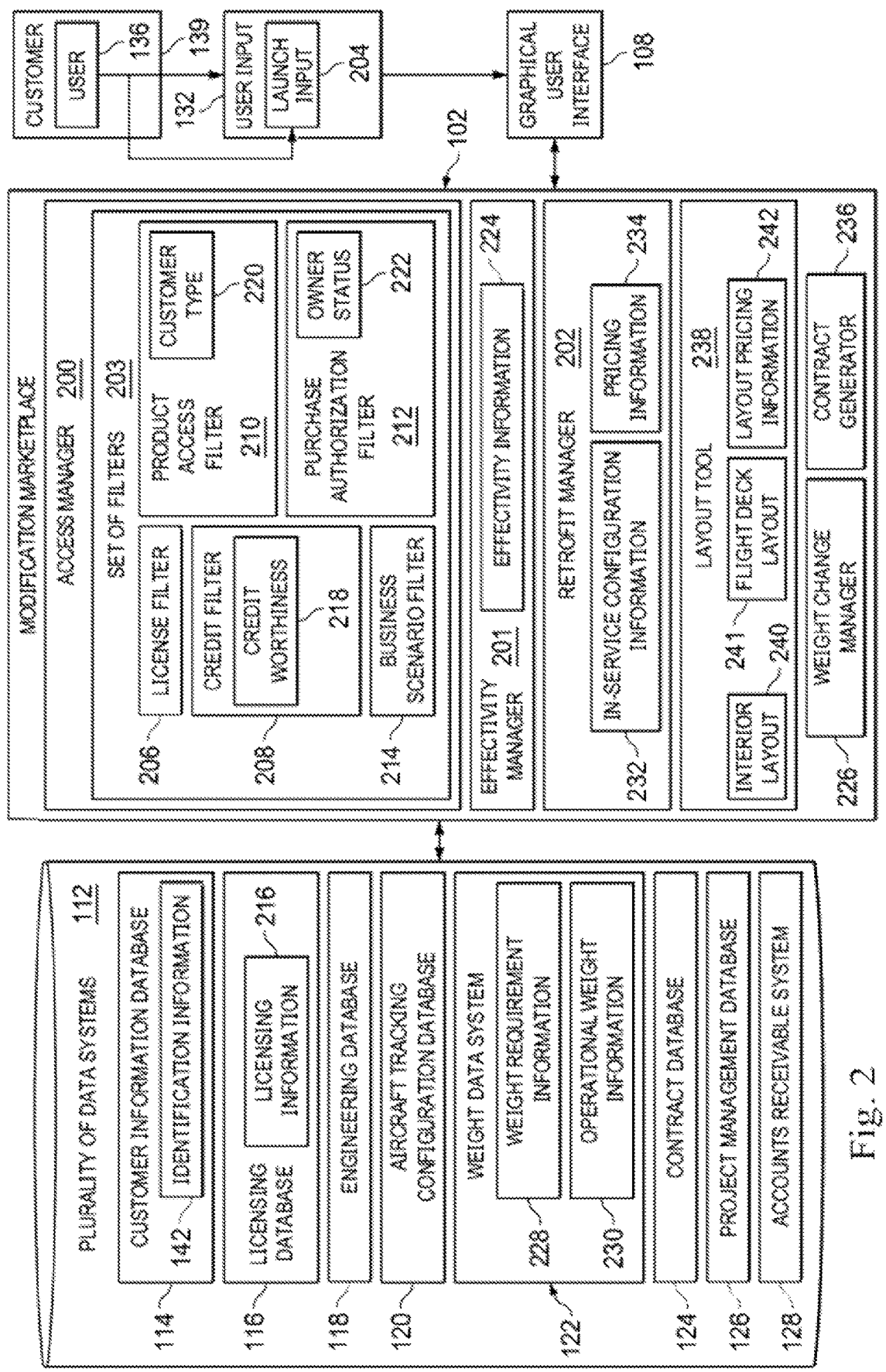
FIG. 2 is a more detailed block diagram of a modification marketplace within the virtual aircraft marketplace in accordance with an example embodiment.

FIG. 2 is a schematic diagram of modification marketplace 102 from FIG. 1 in accordance with an illustrative embodiment. As customer 139 makes selections within modification marketplace 102, modification marketplace 102 communicates with plurality of data systems 112 to retrieve information for use in managing modifications to set of aircraft 140.

Modification marketplace 102 includes access manager 200, effectivity manager 201, and retrofit manager 202. In these illustrative examples, access manager 200 is able to establish a link with at least customer information database 114, licensing database 116, and accounts receivable system 128. As previously described, customer information database 114 stores identification information 142 about the customers of entity 138.

Licensing database 116 stores licensing information indicating whether a given customer has a license in place with entity 138. Accounts receivable system 128 stores credit information. In some examples, accounts receivable system 128 is capable of connecting to and retrieving information from one or more credit reporting agencies.

Graphical user interface 108 presents virtual aircraft marketplace 100 from FIG. 1 to customer 139. Graphical user interface 108 allows customer 139 to select modification marketplace 102 or production marketplace 104. At any given point during the user's experience within virtual aircraft marketplace 100, graphical user interface 108 may display any number of graphical controls. As used herein, a graphical control may take the form of selectable text, a button, an icon, a selectable image, a search box, a check box, a radio button, a text box, a slide bar, or some other type of graphical control that is selectable or controllable in some manner by the user. For example, graphical user interface 108 displays a graphical control that allows customer 139 to enter launch input 204. This graphical control may be selectable text, a button, an icon, a selectable image, or some other type of graphical control.

Access manager 200 receiving launch input 204 via graphical user interface 108 triggers the display of modification marketplace 102 within graphical user interface 108.

Further, access manager 200 receiving launch input 204 also triggers back-end operations that are performed to validate customer 139 and customize the level of access given to customer 139, if customer 139 is validated. In these illustrative examples, these back-end operations are performed nearly instantaneously upon receipt of launch input 204 but before the full display of modification marketplace 102 within graphical user interface 108.

When access manager 200 receives launch input 204, access manager 200 uses set of filters 203 to determine whether customer 139 is allowed access to modification marketplace 102 and to determine the extent to which customer 139 may use modification marketplace 102. Set of filters 203 includes, for example, license filter 206, credit filter 208, product access filter 210, purchase authorization filter 212, and business scenario filter 214.

Access manager 200 uses license filter 206 to determine whether customer 137 has a license with entity 138. In these examples, license filter 206 uses identification information 142 for customer 139 to search licensing information 216 stored in licensing database 116 to thereby determine whether customer 139 has a license with entity 138. Access manager 200 denies access to modification marketplace 102 if customer 139 does not have a license with entity 138. A license with entity 138 may be a general license or may provide a specific level of access to modification marketplace 102. For example, customers with a first type of license may be given full access to modification marketplace 102, while customers with a second type of license may be given only partial access to modification marketplace 102. In some cases, customers with a third type of license may be given full access to modification marketplace 102 but only partial access to the modifications actually available via modification marketplace 102. In this manner, licensing information 216 is used to determine the level of one type of authorization to provide customer 139 within modification marketplace 102.

Access manager 200 uses credit filter 208 to determine credit worthiness 218 associated with customer 139. In one or more examples, credit worthiness 218 is based on a credit rating of customer 139 with respect to a history of orders made from and payments made to entity 138.

In one illustrative example, credit filter 208 uses information stored in accounts receivable system 128 to identify credit worthiness 218. The information stored in accounts receivable system 128 may identify credit worthiness 218 or information that credit filter 208 can use to compute credit worthiness 218. Credit filter 208 uses credit worthiness 218 to determine whether or not to allow or deny access to modification marketplace 102 based on whether credit worthiness 218 meet certain criteria (e.g., a threshold credit rating).

Access manager 200 uses product access filter 210 to determine which types of product information should be accessible to customer 139 via modification marketplace 102. In one or more examples, product access filter 210 uses the information stored in customer information database 114 to determine customer type 220 for customer 139. In one or more examples, customer type 220 is selected from one of a commercial airline, an aircraft leasing company, an air freight company, a business jet company, a third-party modification center, or some other type of customer. Product access filter 210 limits how much access is given or customizes the access given to customer 139 based on customer type 220.

For example, commercial airlines and aircraft leasing companies may only be allowed to access the product information in commercial airline catalogs. Air freight companies may only be allowed to access the product information in freighter aircraft catalogs. Business jet companies may only be allowed to access the product information in business jet catalogs. Further, third-party modification centers may only be allowed to access the product information in support catalogs.

Access manager 200 uses purchases authorization filter 212 to determine owner status 222 of customer 139. In these illustrative examples, owner status 222 of customer 139 is either an owner or a non-owner of aircraft. In one or more examples, purchase authorization filter 212 uses the information in customer information database 114 to determine owner status 222. Purchase authorization filter 212 limits how much access is given to customer 139 based on owner status 222. For example, when customer 139 is an aircraft owner, access manager 200 allows customer 139 to use modification marketplace 102 to create firm proposals and contracts for purchasing modifications, as well as to purchase retrofit modifications. However, when customer 139 is not an aircraft owner, access manager 200 only allows customer 139 to plan for purchases and create rough order of magnitude (ROM) proposals.

Additionally, access manager 200 uses business scenario filter 214 to determine what types of business scenarios are applicable to customer 139 and will be displayed to customer 139 to help customer 139 more easily search through and browse available modifications in the catalog(s). In one or more examples, business scenario filter 214 uses customer type 220 to filter the available business scenarios. A business scenario is a category that corresponds to a particular group of features or modifications. A business scenario allows customer 139 to access a group of features targeted for a specific business purpose.

In this manner, each of set of filters 203 provides a different way of validating customer 139, and thereby customer 139, and customizing the level of access to modification marketplace 102 given to customer 139, and thereby customer 139. Access manager 200 uses set of filters 203 to quickly and easily link to the various data systems of plurality of data systems 112, as described above, and retrieve information for use in customizing access to modification marketplace 102.

Once customer 139 has been provided access to modification marketplace 102, effectivity manager 201 manages the particular aircraft for which modifications are being sought. Effectivity manager 201 retrieves information stored in aircraft tracking configuration (ACT) database 120 to present effectivity information 224 via graphical user interface 108. In these illustrative examples, effectivity information 224 includes an effectivity for each aircraft of a plurality of aircraft owned, leased, operated, or otherwise in the control of customer 139.

An "effectivity" for an aircraft or airplane may include, for example, a variable number, a registration number, a manufacturer serial number (MSN), a line number, or a combination thereof. In one example, the effectivity of an aircraft includes each of a variable number, a registration number, a manufacturer serial number (MSN), and a line number. Each of these different numbers may be comprised of one or more digits, one or more letters, one or more symbols, or a combination thereof. A variable number for an aircraft is a number that helps identification of the particular generation of the model of that aircraft. A registration number for an aircraft is the number issued by a regulatory agency for that aircraft (e.g., a number provided by the Federal Aviation Administration (FAA). A line number of an aircraft refers to the aircraft's position in a production line. In some cases, the effectivity also includes a current configuration identifier that identifies a particular configuration of a particular aircraft model.

Based on user input, effectivity manager 201 tracks the aircraft selected by customer 139 for modification and uses the corresponding effectivity information to customize the product information that is presented to customer 139. Modification marketplace 102 tailors the experience provided to customer 139 based not only on the results provided by access manager 200 but also on the effectivity information corresponding to the aircraft selected for modification.

Retrofit manager 202 tracks retrofit features that were previously installed on aircraft after the aircraft left the factory. Retrofit manager 202 ensures that customer 139 is prevented from purchasing or planning to purchase a retrofit feature that was already previously installed. Retrofit manager 202 uses the information stored in project management database 126 to track previously installed retrofit features.

Project management database 126 stores information about projects. In one or more examples, a project corresponds to the order of a particular aircraft and the configuration for that aircraft. A configuration of an aircraft includes, for example, the wiring, hardware components, software components, firmware components, and other types of components or features of the aircraft. In some examples, a project corresponds to the order for a feature or group of features for a particular aircraft. In yet other examples, a project corresponds to the order for a retrofit feature or group of retrofit features for a particular aircraft.

In one illustrative example, user input selects a retrofit feature in modification marketplace 102 to modify an aircraft (or set of aircraft) that have already left the factory. Retrofit manager 202 communicated with effectivity manager 201 to identify the aircraft to be modified based on the effectivities selected by customer 139. Based on the information stored in project management database 126 for the selected aircraft, retrofit manager 202 determines whether the selected retrofit feature was previously installed on the aircraft. This check may be referred to as a "configuration check."

Retrofit manager 202 prevents customer 139 from adding the selected retrofit feature to virtual cart 225 if the retrofit feature was previously installed on the aircraft. But if the retrofit feature was not previously installed, retrofit manager 202 allows customer 139 to add the selected retrofit feature to virtual cart 225. Virtual cart 225 tracks any features selected by customer 139 via modification marketplace 102 and allows customer 139 to make a firm proposal, a rough order of magnitude proposal, or a purchase for each selected feature, depending on the level of access granted to customer 139.

In some illustrative examples, the addition of a selected retrofit feature to virtual cart 225 requires that one or more additional retrofit features be installed prior to or installed simultaneously with the selected retrofit feature. These one or more additional retrofit features are referred to as "prerequisite retrofit features." Retrofit manager 202 prevents customer 139 from automatically adding the selected retrofit feature to virtual cart 225 if the one or more prerequisite retrofit features were not previously installed. Retrofit manager 202 may generate a notification to alert customer 139 via graphical user interface 108 that the one or more prerequisite features need to be either installed before or simultaneously with the selected retrofit feature. In some cases, if customer 139 chooses to continue adding the selected retrofit feature to virtual cart 225, retrofit manager 202 automatically adds the one or more prerequisite retrofit features also to virtual cart 225.

In one or more illustrative examples, retrofit manager 202 uses in-service configuration information 232 to provide pricing information 234 for selected retrofit features that are configuration-dependent. A configuration-dependent retrofit feature is a feature that requires a review of an aircraft's current configuration in order to provide pricing information 234 for adding that retrofit feature to the aircraft. A retrofit feature that is not configuration-dependent (i.e., a configuration-independent retrofit feature) is one for which pricing information 234 is independent of the current configuration of the aircraft to which the retrofit feature is to be added.

In-service configuration information 232 includes information obtained from at least one of engineering database 118, aircraft tracking configuration database 120, project management database 126, or some other data system in plurality of data systems 112. In some cases, in-service configuration information 232 also includes information obtained from customer information database 114. As one illustrative example, in-service configuration information 232 includes information obtained from wiring diagrams, engineering drawings, project databases, filled out forms, service bulletins, and other items stored in these various data systems. In some examples, retrofit manager 202 uses one or more tools to communicate with these data systems and obtain at least a portion of in-service configuration information 232 that is needed. Retrofit manager 202 uses in-service configuration information 232 provided by this tool to generate pricing information 234.

Pricing information 234 includes a price for purchasing the selected retrofit feature(s) for a particular aircraft or set of aircraft. In these illustrative examples, pricing information 234 takes into account the cost of parts, hardware, wiring, software, engineering labor house for developing the modification package to add the selected retrofit feature(s), certification, other factors, or a combination thereof. In some examples, pricing information 234 also takes into account the travel by employees of entity 138 to the location of the aircraft for installation of the selected retrofit feature(s).

In some examples, modification marketplace 102 also includes weight change manager 226. In these examples, modification marketplace 102 allows customer 139, and thereby customer 139, to purchase or generate proposals for features that alter the weight and balance of one or more aircraft. Weight change manager 226 communicates with effectivity manager to identify the one or more aircraft based on the effectivities selected by customer 139. Further, weight change manager 226 is in communication with weight data system 122 to manage the weight and balance information for the selected aircraft.

Weight data system 122 stores operational weight information 228 and weight requirement information 230. Operational weight information 228 includes information about weight and pricing for aircraft that are already in-service. As one example, for each in-service aircraft, operational weight information 228 includes current operational weights for that in-service aircraft and the paid weight for that in-service aircraft. Current operational weights for an aircraft include, for example, the current weight quantities for a takeoff weight, a taxi weight, a landing weight, and a zero fuel weight for that aircraft. The paid weight for an in-service aircraft represents the maximum operational weights paid for by customer 139.

Weight requirement information 230 may include information about the requirements or limits for the different operational weights for aircraft. For example, weight requirement information 230 may include a maximum takeoff weight (MTOW), a maximum taxi weight (MTW), a maximum landing weight (MLW), and a maximum zero fuel weight (MZFW).

Weight change manager 226 allows customer 139 to request a weight change in an aircraft (or set of aircraft). The requested weight change may be a quantity in, for example, pounds. Based on this requested weight change, weight change manager 226 is able to retrieve information from weight data system 122 to determine whether the requested weight change exceeds weight requirements for the aircraft. Weight change manager 226 also determines a pricing for the requested weight change.

Further, weight change manager 226 also allows customer 139 to request alternate weights and leased weights. For example, customer 139 may purchase a landing weight change, as well as two alternate landing weight changes, for a particular aircraft. These different landing weights may be used, for example, at different airports. In some examples, weight change manager 226 also allows customer 139 to lease certain operational weights for a limited period of time.

In some illustrative examples, customer 139 owns a fleet of aircraft. The fleet may include, for example, several hundred airplanes. When customer 139 requests a weight change within modification marketplace 102, weight change manager 226 processes each airplane in the fleet to obtain weight information and pricing for that airplane. Weight change manager 226 may group airplanes that have the same weight information and pricing into packages.

In these illustrative examples, modification marketplace 102 also includes interior layout tool 236. Interior layout tool 236 allows customer 139 to customize the interior of an aircraft (e.g., the cabin interior of an airplane). In one or more examples, interior layout tool 236 includes interactive layout 238 which represents the interior of the aircraft. Interactive layout 238 may be, for example, a map of the interior of the aircraft. Customer 139 may be able to interact with and manipulate interactive layout 238 via graphical user interface 108.

Interior layout tool 236 allows customer 139 to create a new interior for an aircraft or reconfigure an existing interior. An existing interior may be reconfigured to, for example, support a new flight route, improve passenger cabin service, improve passenger convenience and comfort, achieve some other objective, or a combination thereof. Based on the one or more selected effectivities, interior layout tool 236 presents available interior features such as, for example, seats, galleys, closets, lavatories, overhead baggage bins, passenger entertainment system components, and other types of interior features. These interior features may be available for building a new interior or reconfiguring an existing interior. In other illustrative examples, interior layout tool 236 allows customer 139 to interact with interactive layout 238 to rearrange current or existing interior features.

Further, interior layout tool 236 provides interior pricing information 240 to customer 139. Interior pricing information 240 may be, for example, a rough order of magnitude price quote. Interior layout tool 236 provides customer 139 with the option to add this price quote, and thereby the selected modification (i.e., one or more interior features), to virtual cart 225. From virtual cart 225, customer 139 can request a firm proposal with contract to purchase the selected modification.

In one or more illustrative examples, modification marketplace 102 includes contract generator 242. Contract generator 242 electronically generates a contract for the purchase of one or more features (or modifications) that have been added to virtual cart 225. If customer 139 accepts (e.g., electronically signs) this contract via graphical user interface 108, the purchase transaction becomes final, legal, and binding. Further, in response to the acceptance of the contract, contract generator 242 triggers the generation of a new project within project management database 126. In one or more examples, the creation of this new project triggers the preparation of the necessary documents for performing the modification, the assembly of kits for installation of the modification, the development of software, and the development of updates to engineering drawings, wiring diagrams, or both. Updates to software and the engineering drawings and wiring diagrams may be made up until the point that the one or more features purchased are shipped to customer 139.

Figure 3:
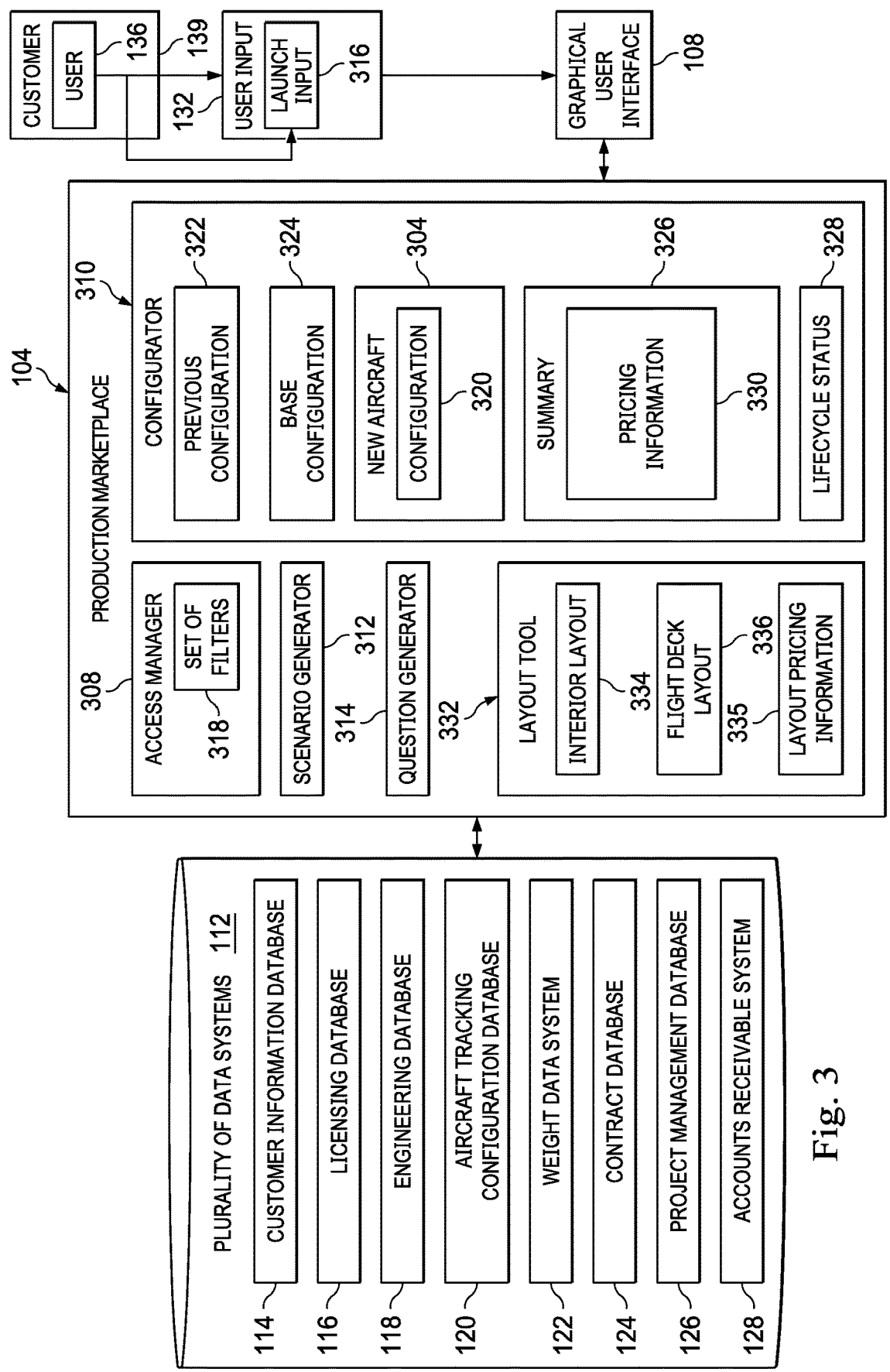
FIG. 3 is a more detailed block diagram of a production marketplace within the virtual aircraft marketplace in accordance with an example embodiment.

FIG. 3 is a block diagram of production marketplace 104 and plurality of data systems 112 from FIG. 1 depicted in in accordance with an illustrative embodiment. Production marketplace 104 operates in a manner similar to modification marketplace 102 but allows customer 139 to create a customized configuration for new aircraft 304. In some cases, customer 139 can use production marketplace 104 to create a fleet of new aircraft, each having this with customized configuration.

In some examples, production marketplace 104 is independent from modification marketplace 102 in virtual aircraft marketplace 100 in FIG. 1. In other examples, production marketplace 104 is integrated fully within modification marketplace 102. In still other examples, production marketplace 104 and modification marketplace 102 are partially integrated with each other.

In one or more examples, production marketplace 104 includes access manager 308, configurator 310, scenario generator 312, and question generator 314. In some examples, scenario generator 312 and question generator 314 are implemented, at least partially, as part of configurator 310.

Access manager 308 may operate in a manner similar to access manager 200 of modification marketplace 102 described above in FIG. 2. For example, graphical user interface 108 presents virtual aircraft marketplace 100 from FIG. 1 to customer 139. Graphical user interface 108 allows customer 139 to select production marketplace 104. For example, graphical user interface 108 displays a graphical control that allows customer 139 to enter launch input 316 to select production marketplace 104. The graphical control may be selectable text, a button, an icon, a selectable image, or some other type of graphical control.

Access manager 308 receiving launch input 316 via graphical user interface 108 triggers the display of production marketplace 104 within graphical user interface 108. Further, access manager 308 receiving launch input 316 also triggers back-end operations that are performed to validate customer 139 and customize the level of access given to customer 139, if customer 139 is validated. In these illustrative examples, these back-end operations are performed nearly instantaneously upon receipt of launch input 316 but before the full display of production marketplace 104 within graphical user interface 108.

When access manager 308 receives launch input 316, access manager 308 uses set of filters 318 to determine whether customer 139 is allowed access to modification marketplace 102 and to determine the extent to which customer 139 may use production marketplace 104. In some illustrative examples, set of filters 318 includes one or more filters similar to those in set of filters 203 in FIG. 2, but customized for production marketplace 104. In other illustrative examples, set of filters 318 may be the same as set of filters 203 and each of set of filters 203 may be used for performing validation and the filtering of access for both modification marketplace 102 and production marketplace 104.

For example, access manager 308 may communicate with licensing database 116 to determine whether customer 139 has a valid license with entity 138 to purchase and configure new aircraft 304. Access manager 308 denies access to production marketplace 104 if customer 139 does not have a valid license with entity 138. A license with entity 138 may be a general license or may provide a specific level of access to production marketplace 104. For example, customers with a first type of license may be given full access to production marketplace 104, while customers with a second type of license may be given only partial access to production marketplace 104. If customer 139 has a license with entity 138, access manager 308 may also use information provided by accounts receivable system 128 to determine whether customer 139 has a sufficient credit rating to purchase and configure new aircraft 304.

In these illustrative examples, access manager 308 determines customer type 220 for customer 139 using the information stored in customer information database 114. Access manager 308 uses customer type 220 to customize the experience of production marketplace 104 for customer 139. For example, if customer type 220 is a commercial airline, access manager 308 filters all of the available aircraft models and available aircraft features to present to customer 139 only those aircraft models and aircraft features related to commercial use.

Further, access manager 200 uses the information in customer information database 114 to determine owner status 222 of customer 139. In some examples, access manager 200 uses owner status 222 to further customize the experience of production marketplace 104 for customer 139. In other examples, owner status 222 is used by other components of production marketplace 104 to customize the experience of production marketplace 104 for customer 139.

Once access manager 308 has fully processed launch input 316 and determined whether customer 139 should be given access to production marketplace 104 and, if so, the extent to which customer 139 should be given access to production marketplace 104, configurator 310 of production marketplace 104 helps customer 139 build configuration 320 for new aircraft 304.

Configurator 310 guides customer 139 through the process of building configuration 320 for new aircraft 304 in a way that is completely tailored (i.e., customized) for customer 139 based on the information corresponding to customer 139, as obtained from plurality of data systems 112. In particular, configurator 310 helps guide customer 139 to build configuration 320 that is optimized for customer 139 based on customer type 220 and known objectives for customer type 220 and customer 139, specifically. In other words, configurator 310 tailors the experience of production marketplace 104 in a manner that targets the specific needs and strategy of customer 139.

Configurator 310 allows customer 139 to build configuration 320 based on previous configuration 322. For example, if owner status 222 indicates that customer 139 is an aircraft owner, configurator 310 may use information provided by at least one of customer information database 114, aircraft tracking configuration database 120, engineering database 118, contract information database 124, or project management database 126 to identify the different configurations for the different aircraft owned by customer 139.

Configurator 310 may present all or some subset of the previous configurations of aircraft purchased by customer 139 via graphical user interface 108. Customer 139 is allowed to select one of these previous configurations as previous configuration 322 off of which configuration 320 for new aircraft 304 is to be built. In one or more illustrative examples, the previous configurations identified by configurator 310 include any modifications (e.g., retrofit feature modifications) made to aircraft after the aircraft left the factory. By allowing customer 139 to begin building configuration 320 from previous configuration 322, the amount of time customer 139 needs to spend building configuration 320 is reduced. Further, customer 139 can focus only on the areas of configuration 320 that need to be updated based on new objectives, an updated strategy, new flight route information, other factors, or a combination thereof.

In one or more examples, configurator 310 uses scenario generator 312 to present information to customer 139 in graphical user interface 108 based on customized business scenarios. With respect to production marketplace 104, business scenarios may include, for example, but are not limited to, passenger experience, cabin and crew equipment, connectivity, branding, ground operations, flight operations, engines, other types of business scenarios, or a combination thereof.

Scenario generator 312 uses different types of information to customize the business scenarios presented to customer 139 via graphical user interface 108. For example, scenario generator 312 may use information about customer 139 (e.g., customer type 220, information in aircraft tracking configuration database 120 corresponding to customer 139, etc.) to provide customized business scenarios via graphical user interface 108. In some cases, scenario generator 312 is able to connect to at least one of the Internet, a web server, or some other application to identify media content associated with customer 139 for use in customizing business scenarios for customer 139. In these illustrative examples, scenario generator 312 may use data obtained from any combination of configuration information, design models, engineering drawings, three-dimensional (3D) geometry, prices, weight information, customer brochures, brochures provided by entity 138, feature promotion information, media content, or other type of information to customize business scenarios.

In addition to customizing business scenarios, scenario generator 312 may provide recommendations for configuring new aircraft 304. In some illustrative examples, scenario generator 312 provides recommendations for reconfiguring existing aircraft in the fleet owned by customer 139 based on configuration 320 built for new aircraft 304.

In one or more examples, configurator 310 also uses question generator 314 to customize the experience of production marketplace 104 for customer 139. Question generator 314 may use information, similar to the information used by scenario generator 312, to generate questions that are presented to customer 139 via graphical user interface 108. In particular, question generator 314 generates questions that are selected to help customize the options presented to customer 139 for building configuration 320 for new aircraft 304. For example, question generator 314 may generate customer strategy questions and market-driven questions.

Customer 139 enters responses to these questions via graphical user interface 108. Configurator 310 processes these responses. In particular, configurator 310 uses the responses to create base configuration 324, which may also be referred to as a template configuration, preliminary configuration, or pre-configuration. Base configuration 324 includes auto-populated features that are populated or selected based on the responses of customer 139. In some cases, base configuration 324 includes identifiers or prompts indicating where customer 139 should provide further clarification. In other cases, base configuration 324 includes multiple recommendations for a particular type of feature. For example, for the overhead bins of new aircraft 304, configurator 310 may use the responses of customer 139 to provide multiple options for this feature type.

In one or more examples, configurator 310 uses responses to provide multiple base configurations and a comparison of these base configurations. Configurator 310 may prompt customer 139 for input via graphical user interface 108 to select one of these base configurations from which to build configuration 320.

In these illustrative examples, when customer 139 makes a feature selection for addition to configuration 320, configurator 310 adds the one or more features included in this feature selection to configuration 320. In one or more examples, configurator 310 analyzes the feature selection to determine whether any additional features are required to be included along with the feature selection.

As one illustrative example, when customer 139 selects a main feature for addition to configuration 320, configurator 310 analyzes information from engineering database 118 to determine whether there are features related to this main feature. If any of these related features is associated with at least one attribute choice (e.g., type, length width, color, etc.), configurator 310 presents the at least one choice to customer 139. For example, a lavatory selected as a main feature may be related to multiple features, including the lavatory door. The lavatory door may be selected from one of different types of lavatory doors. In these cases, configurator 310 presents the various choices for the different types of lavatory door (e.g., single panel door, bifold door, etc.) to customer 139. In one or more examples, configurator 310 requires input from customer 139 making selections for the one or more attributes of each related feature prior to fully adding the main feature to configuration 320.

In some illustrative examples, a related feature may not be associated with any selectable attribute. In these examples, configurator 310 automatically adds the related feature to configuration 320. In some illustrative examples, a portion of the features related to a main feature may include one or more selectable attributes, while a portion of the features related to a main feature may include no selectable attributes.

Configurator 310 allows customer 139 to manage multiple configurations. In one or more examples, configurator 310 allows customer 139 to print configuration reports and share configurations with other customers. In some cases, configurator 310 allows customer 139 to merge multiple configurations into a single configuration file that identifies duplicate selections or other types of issues.

In one or more examples, in response to receiving corresponding user input 132, configurator 310 generates summary 326. Summary 326 may also be referred to as a "build completion status." Summary 326 may be generated at any point during the building of configuration 320. Summary 326 provides an overview of the various features already added to configuration 320 and the various features that still need to be added to configuration 320. Summary 326 may also provide an indication of which feature selections are required for new aircraft 304 and which feature selections are optional.

In some cases, summary 326 may also indicate, of the optional feature selections, which are recommended by entity 138. For example, summary 326 may indicate which feature selections are recommended by the engineering group of entity 138. Configurator 310 may present links in summary 326 to one or more file attachments (e.g., documents, images, slide deck, etc.) that includes relevant information about features.

Configurator 310 may also have the capability to provide lifecycle status 328. Lifecycle status 328, in some cases, may be included as part of summary 326. Lifecycle status 328 indicates the status of new aircraft 304 in the configuration lifecycle. In other examples, lifecycle status 328 may indicate the physical build status of new aircraft 304 based on configuration 320 built by customer 139.

In one or more examples, production marketplace 104 includes interior layout tool 332. Interior layout tool 332 may be implemented in a manner similar to interior layout tool 236 of modification marketplace 102 described in FIG. 2. Interior layout tool 332 allows customer 139 to customize the interior configuration of new aircraft 304 (e.g., the cabin interior of a new airplane). For example, interior layout tool 332 may include interactive layout 334 which represents the interior of new aircraft 304. Interactive layout 334 may be, for example, a map of the interior of the aircraft. Customer 139 may be able to interact with and manipulate interactive layout 334 via graphical user interface 108 to build the interior configuration of new aircraft 304. Further, interior layout tool 332 provides interior pricing information 336 to customer 139. Interior pricing information 335 may be, for example, a rough order of magnitude price quote.

The illustrations of virtual aircraft marketplace 100 in FIG. 1, modification marketplace in FIGS. 1 and 2, and production marketplace 104 in FIGS. 1 and 3 are not meant to imply physical or architectural limitations to the manner in which an example embodiment may be implemented. The blocks are presented to illustrate functional components. Other components in addition to or in place of the ones illustrated may be used. Some components may be optional. Further, one or more of these blocks may be combined, divided, or combined and divided into different blocks when implemented in an example embodiment.

FIGS. 4-38 are illustrations of a graphical user interface presenting a virtual aircraft marketplace in accordance with an example embodiment. In describing these figures, references to "customer" may generally be considered interchangeable with "user," who is or represents the customer. For example, a reference to user input entered by the user via graphical user interface 108 may generally be considered as meaning a user input entered by the customer because the customer. Thus, in some cases, a reference to the "customer" may not be distinguishable from the "user," while in other cases, a reference to the "customer" may be distinguishable from the "user." For example, a reference to the identification number for a customer may not be equivalent to an identification number for the user.

Further, these illustrations are meant to be examples of how the graphical user interface may be implemented. In other examples, wording, placement of graphical controls, arrangement of menus and menu options, other elements of visual configuration, or a combination thereof may be varied with respect to the graphical user interface. As one example, in describing these figures, references to an "order" may refer to an order for one or more features (e.g., a purchase order) or may refer to a request for a firm proposal based on one or more features. Thus, in general, the descriptions of FIGS. 4-38 below may refer to either a purchase order or request for a firm proposal even though the illustration itself may present details with respect to one of these.

Various graphical controls are depicted in FIGS. 4-38. These are example graphical controls and in other illustrative examples, different graphical controls may be used to accomplish the same purpose. Additionally, when a user is described as selecting a graphical control, this selection may made in various ways. For example, a selection may be made by clicking on a graphical control, hovering a cursor over the graphical control, sliding the graphical control, applying touch pressure to the graphical control, gazing at the graphical control for at least a threshold period of time, or performing some other type of gesture that indicates a "selection."

Figure 4:
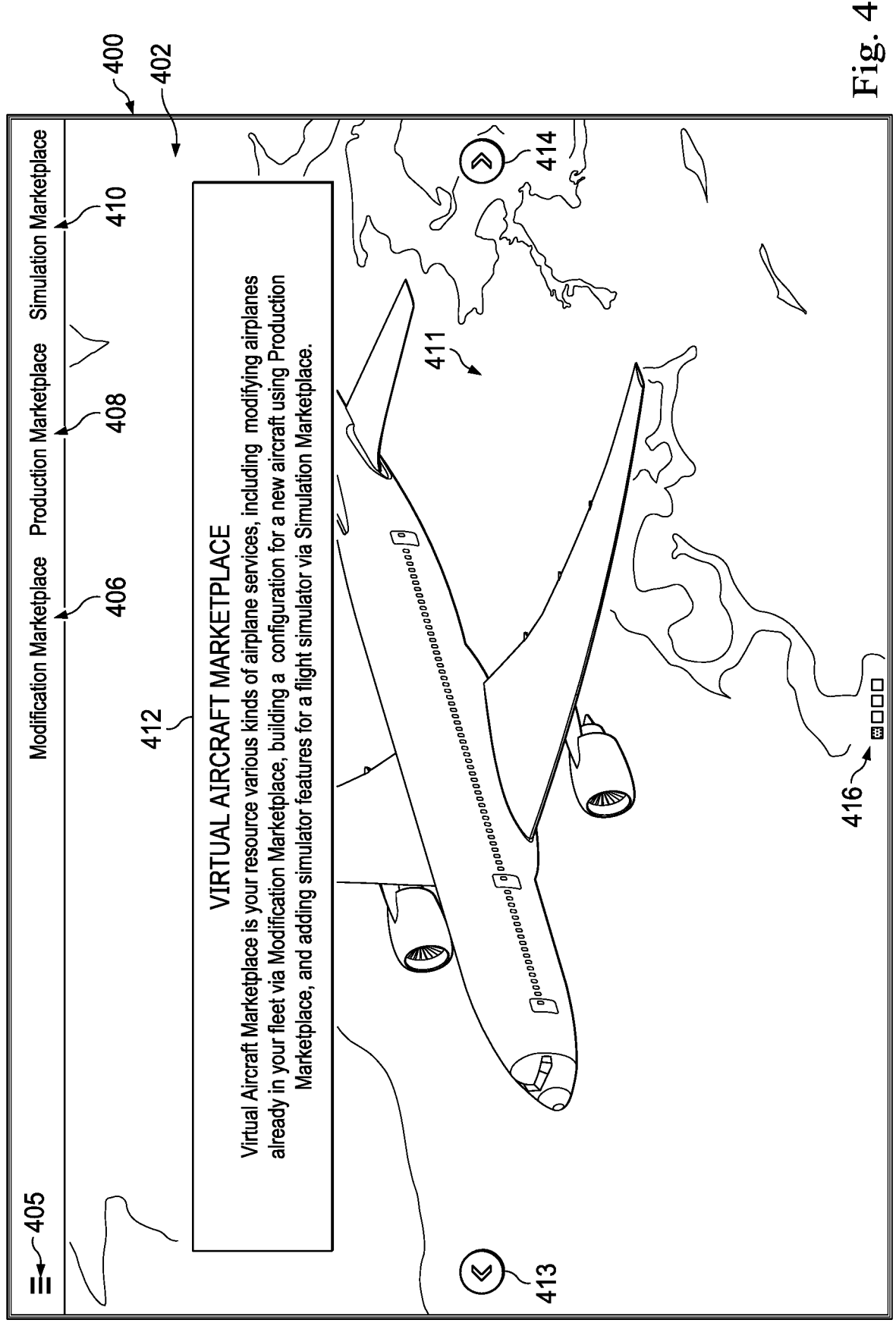
FIG. 4 is an illustration of a graphical user interface presenting a virtual aircraft marketplace in accordance with an illustrative embodiment.

FIG. 4 is an illustration of a graphical user interface presenting a virtual aircraft marketplace in accordance with an example embodiment. Graphical user interface 400 is an example of one implementation for graphical user interface 108 in FIGS. 1-2 above. Graphical user interface 400 presents virtual aircraft marketplace 402. Specifically, graphical user interface 400 displays home page 404 for virtual aircraft marketplace 402. In one or more examples, home page 404 is scrollable.

Home page 404 includes menu control 405, modification marketplace control 406, production marketplace control 408, and simulation marketplace control 410. Each of these controls is selectable via user input for launching the corresponding marketplace. For example, a selection of menu control 405 displays a menu of options available to the user. A selection of modification marketplace control 406 may constitute the launch input for launching the modification marketplace. Similarly, a selection of production marketplace control 408 may constitute the launch input for launching the production marketplace. A selection of simulation marketplace control 410 may constitute the launch input for launching the simulation marketplace.

In one example, home page 404 presents image 411 and description 412. Description 412 is a general description of the services available through virtual aircraft marketplace 401. In this example, image 411 and description 412 are changeable. For example, a user may use arrow 413 or arrow 414 to change image 411 and description 412 presented on home page 404. In the example depicted in FIG. 4, a user may switch between four different views, as indicated by image selection controls 416.

In other illustrative examples, other graphical elements, controls, or both may be presented in graphical user interface 400 in addition to those shown, in place of those shown, or both. For example, in some cases, graphical user interface 400 may include a graphical control linked to the launching of a proposal request manager that allows the user to request proposals.

Figure 5:
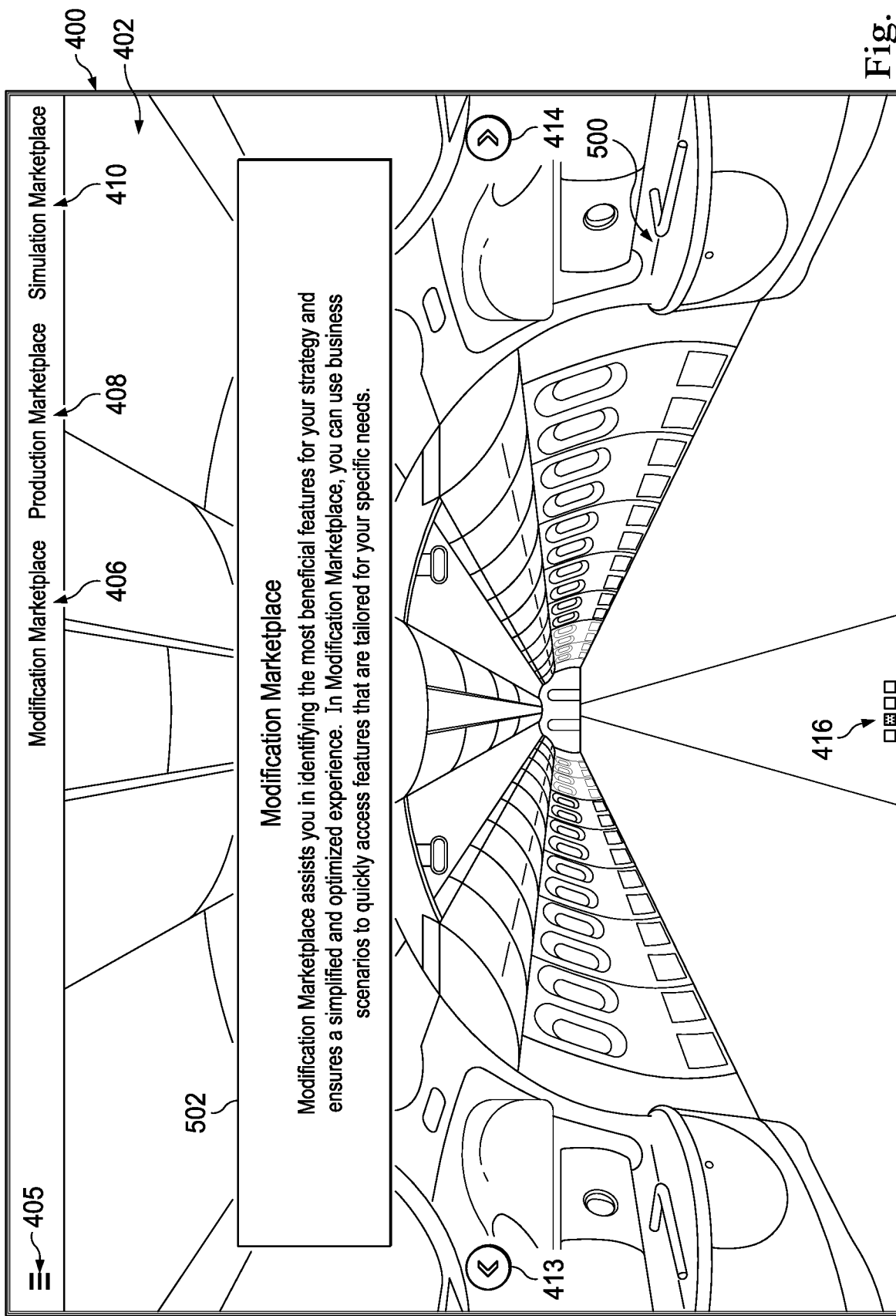
FIG. 5 is another illustration of the graphical user interface presenting a virtual aircraft marketplace in accordance with an illustrative embodiment.

FIG. 5 is another illustration of graphical user interface 400 presenting a different view of home page 404 of virtual aircraft marketplace 402 from FIG. 4 in accordance with an example embodiment. In this illustrative example, image 500 and description 502 are presented in graphical user interface 400. Image 500 provides a user with a brief description of modification marketplace. The remaining two views (not shown) of home page 404 may provide an image and corresponding description for the production marketplace and the simulation marketplace.

Figure 6:
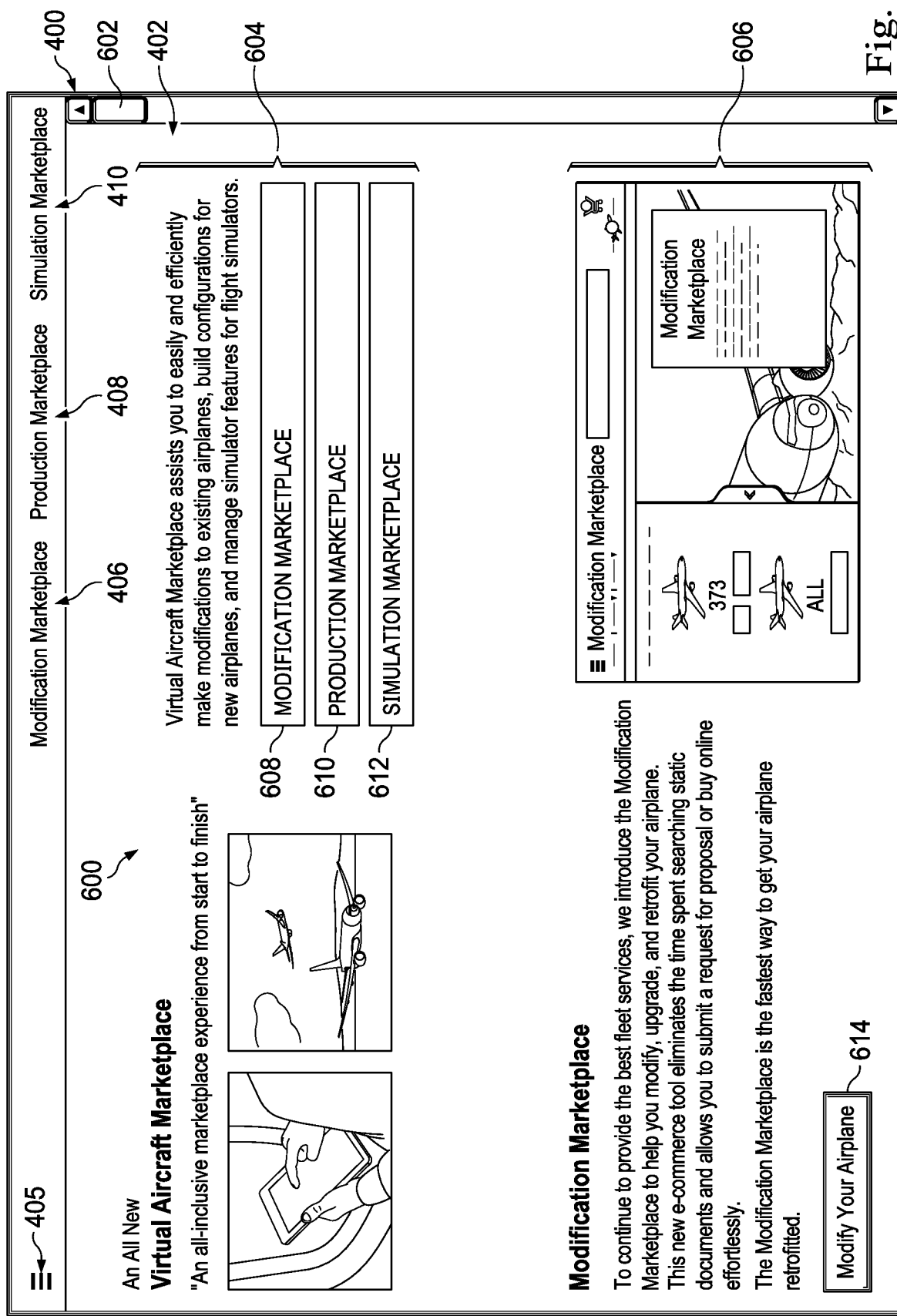
FIG. 6 is another illustration of the graphical user interface presenting a virtual aircraft marketplace in accordance with an illustrative embodiment.

FIG. 6 is another illustration of graphical user interface 400 presenting menu 600 of virtual aircraft marketplace 402 in accordance with an example embodiment. Menu 600 is displayed in response to a user selecting an option available to the user via menu control 405. In one or more examples, menu 600 is scrollable. The portion of menu 600 displayed is based on the scrolled position of menu 600 selected by the user.

As one illustrative example, as depicted in FIG. 6, menu 600 is displayed at scrolled position 602. At scrolled position 602, menu 600 includes general menu section 604 as well as modification marketplace section 606. General menu section 604 presents information about the various marketplaces or tools available to a user via virtual aircraft marketplace 402. For example, general menu section 604 includes modification marketplace control 608, production marketplace control 610, and simulation marketplace control 612. Modification marketplace control 608, production marketplace control 610, and simulation marketplace control 612 may be used to access a user interface for a modification marketplace, a production marketplace, and a simulation marketplace, respectively. Modification marketplace section 606 includes modification marketplace control 614, which also provides access the user interface for the modification marketplace.

Figure 7:
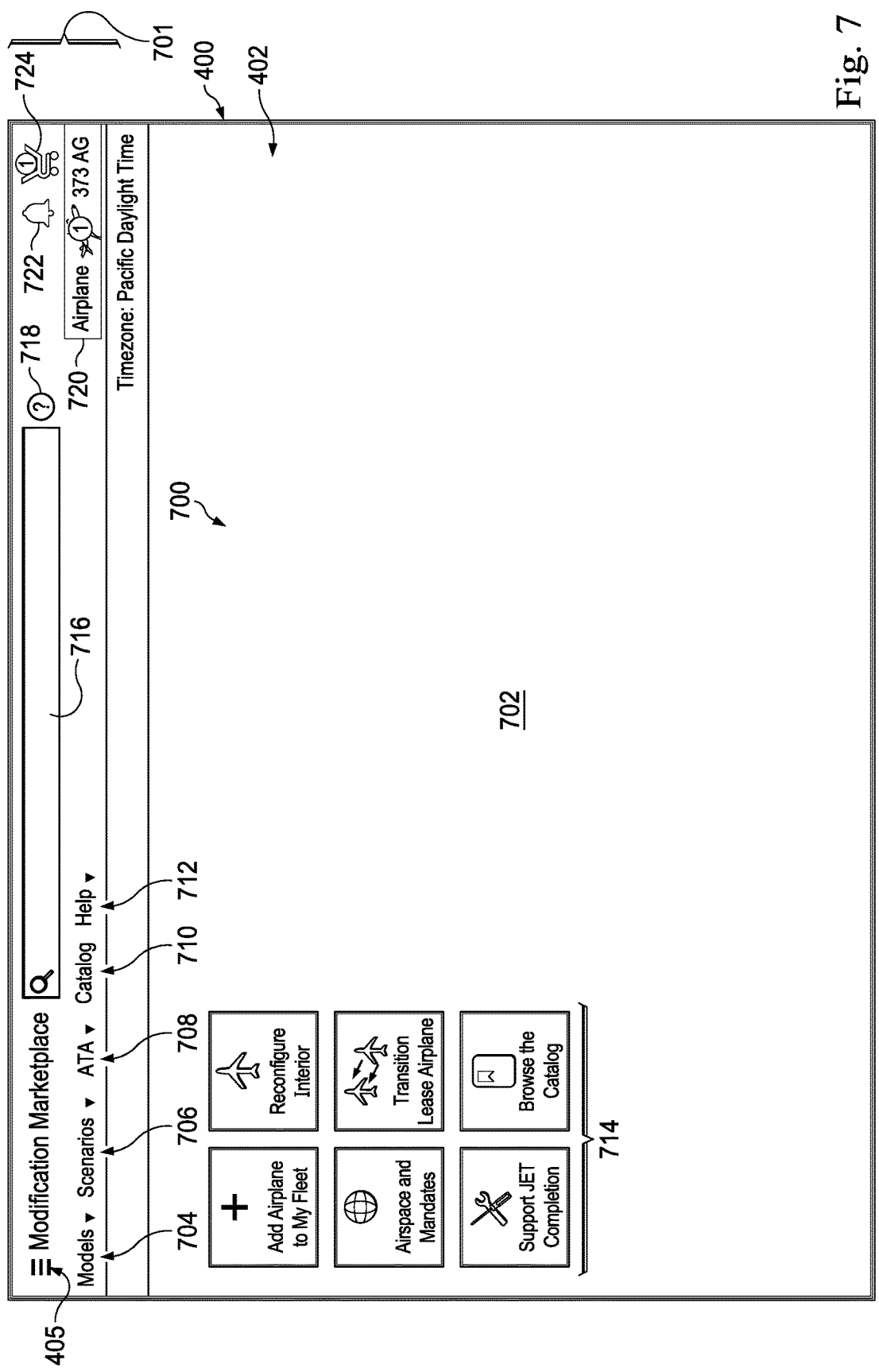
FIG. 7 is an illustration of the graphical user interface presenting a modification marketplace in accordance with an illustrative embodiment.

FIG. 7 is an illustration of graphical user interface 400 presenting modification marketplace 700 in accordance with an example embodiment. When graphical user interface 400 presents modification marketplace 700, graphical user interface 400 may be referred to as a "modification interface," a "modification user interface," or "an aircraft modification user interface." Prior to modification marketplace 700 being displayed in graphical user interface 400, a number of In FIG. 7, graphical user interface 400 displays navigation section 701 and main page 702. Navigation section 701 includes models menu control 704, scenarios menu control 706, category menu control 708, catalog control 710, and help menu control 712, each of which is a graphical control that displays a corresponding menu when selected. When selected, models menu control 704 presents a menu identifying various aircraft models.

When selected, scenarios menu control 706 presents a menu of scenarios, such as business scenarios. The scenarios presented are tailored based on the information provided when the user logged into virtual aircraft marketplace 100. In other words, the scenarios presented are customized for the user. Main page 702 includes scenario tiles 714. In this illustrative example, each of scenario tiles 714 matches a corresponding scenario presented upon the selection of scenarios menu control 706.

Category menu control 708, when selected, presents a menu of categories grouping various features. In one or more examples, the categories included in this menu correspond to Air Transport Association (ATA) chapters of the ATA 100 numbering system. Catalog control 710, when selected, presents a searchable catalog of features (e.g., products, services, software, etc.) to the user. Further, help menu control 712, when selected presents a help menu to the user.

Navigation section 701 also includes search box 716, help icon 718, selected aircraft display 720, notifications 722, and cart control 724. Search box 716 allows a user to search through a catalog of available features based on user input. For example, a user may enter a product number, a product name, or some other type of identifier in search box 716 in order to quickly and efficiently search for different products. Help icon 718 allows a user to view a help menu or some other visual form of help options. Selected aircraft display 720 displays information about the particular aircraft model selected by the user. In some cases, selected aircraft display 720 also displays the quantity selected for that particular aircraft model. Notifications 722 is a graphical control that allows a user to quickly identify when a notification is present and to view that notification.

Cart control 724 is selectable to display a virtual cart, implemented similarly to virtual cart 225 described in FIG. 2, in graphical user interface 400. The virtual cart tracks any features selected by the customer via modification marketplace 700 and allows the customer to make a firm proposal, a rough order of magnitude proposal, or a purchase for each selected feature, depending on the level of access granted to the customer. In some illustrative examples, the addition of a selected retrofit feature to the virtual cart requires that one or more additional retrofit features be installed prior to or installed simultaneously with the selected retrofit feature. For example, retrofit manager 202 described in FIG. 2 may prevent the customer from automatically adding the selected retrofit feature to the virtual cart if the one or more prerequisite retrofit features were not previously installed.

Figure 8:
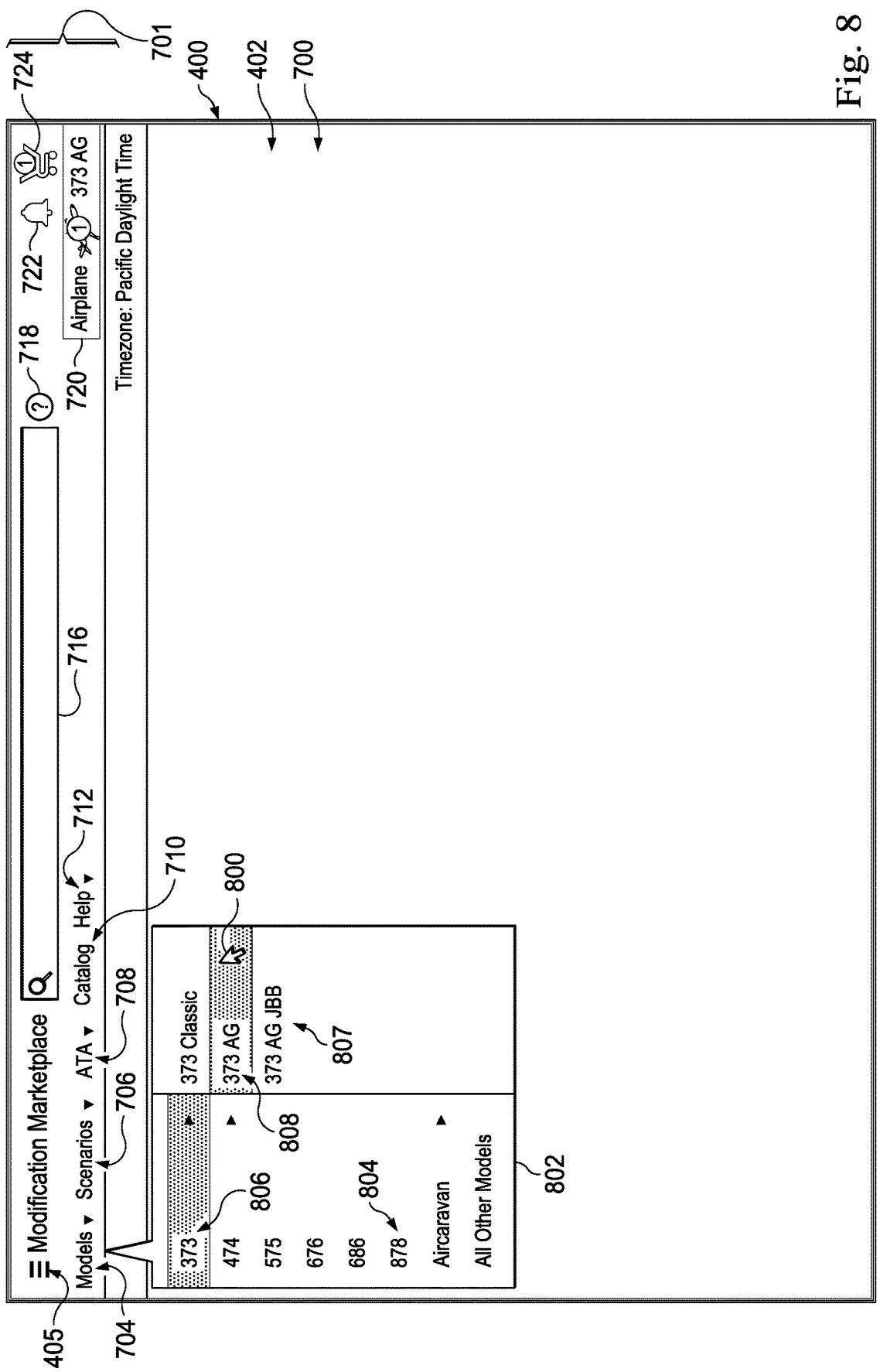
FIG. 8 is another illustration of the graphical user interface presenting the modification marketplace in accordance with an illustrative embodiment.

FIG. 8 is another illustration of graphical user interface 400 presenting modification marketplace 700 in accordance with an example embodiment. In FIG. 8, in response to models menu control 704 being selected via cursor 800 (e.g., clicked on or hovered over with cursor 800), menu 802 is displayed. Menu 802 identifies plurality of aircraft model groups 804, each of which is associated with a sub-menu. For example, a user may select model group 806 to display a sub-menu that identifies plurality of models 807 that fall within that selected model group 806. As illustrated, a user may then select a particular aircraft model, such as model 808, to display customized information within modification marketplace 700.

Figure 9:
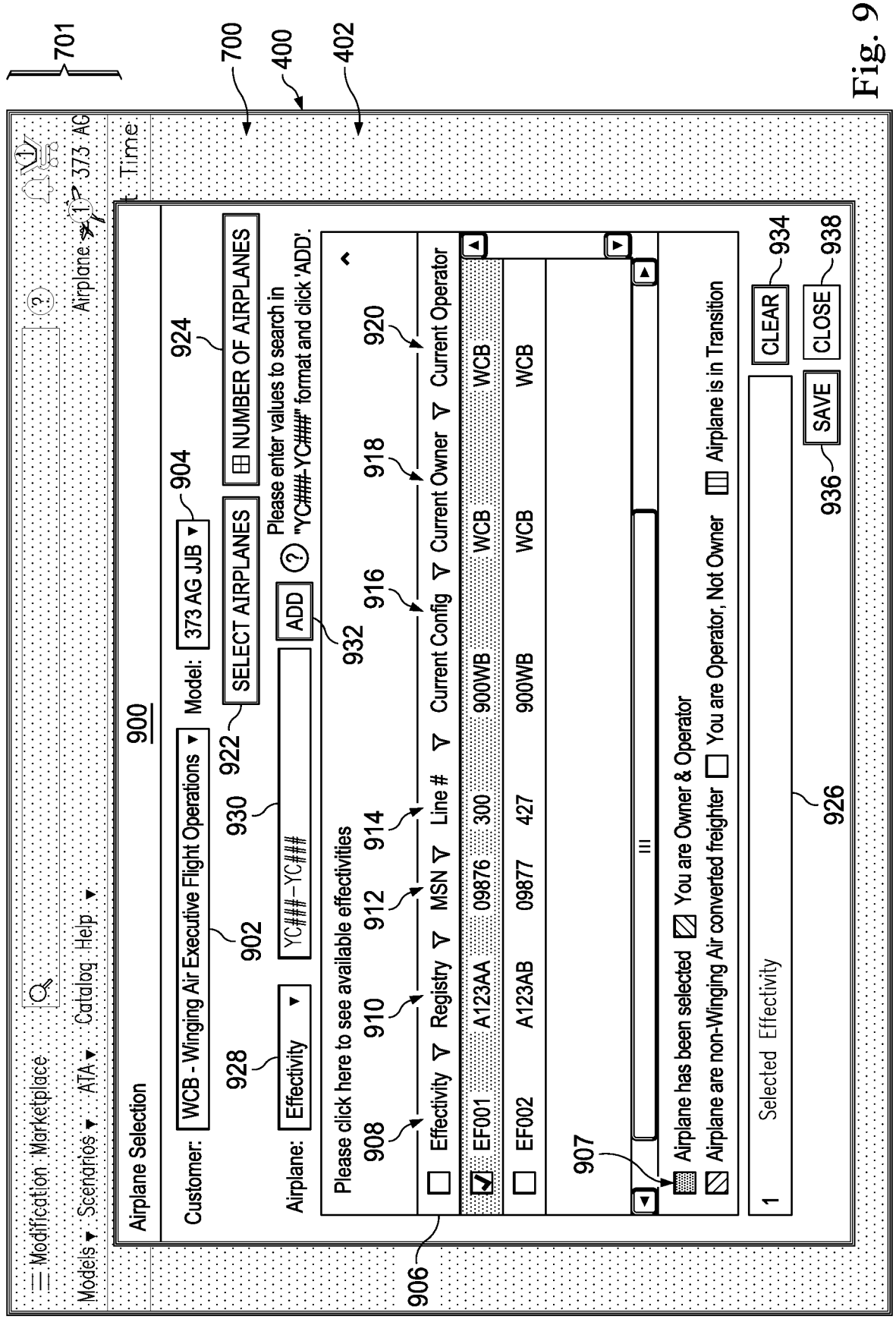
FIG. 9 is another illustration of the graphical user interface presenting the modification marketplace in accordance with an illustrative embodiment.

FIG. 9 is another illustration of graphical user interface 400 presenting modification marketplace 700 in accordance with an example embodiment. In FIG. 9, effectivity selector 900 is displayed. Effectivity selector 900 enables a user to select a particular set of aircraft. Effectivity selector includes, for example, without limitation, customer selector 902, model selector 904, effectivity identifier 906, and legend 907. Customer selector 902 may be, for example, a drop-down menu that allows a particular customer or customer type to be selected. Model selector 904 may be, for example, a drop-down menu that allows a particular model or model group to be selected.

Effectivity identifier 906 identifies the aircraft effectivities available for selection by the user. For example, effectivity identifier 906 displays effectivity information for the various aircraft corresponding to the customer selected via customer selector 902 and the model selected via model selector 904. Effectivity identifier 906 identifies effectivity information within, for example, variable number column 908, registration number column 910, manufacturer serial number column 912, line number column 914, current configuration column 916, current owner column 918, and current operator column 920.

For each aircraft identified in effectivity identifier 906, variable number column 908 identifies a variable number that helps identification of the particular generation of the model of that aircraft. For each aircraft identified in effectivity identifier 906, registration number column 910 identifies a registration number for issued by a regulatory agency for that aircraft (e.g., a number provided by the Federal Aviation Administration (FAA). For each aircraft identified in effectivity identifier 906, manufacturer serial number column 912 identifies a manufacturer serial number for that aircraft.

Further, for each aircraft identified in effectivity identifier 906, line number column 914 identifies a line number indicating the position in a production line for that aircraft. Further, for each aircraft identified in effectivity identifier 906, current configuration column 916 includes a current configuration identifier that identifies a particular configuration of the particular model of the aircraft. For each aircraft identified in effectivity identifier 906, current owner column 918 identifies a current owner of that aircraft. Similarly, for each aircraft identified in effectivity identifier 906, current operator column 920 identifies the current operator of that aircraft.

Legend 907 provides information about how a user may read the information presented in effectivity identifier 906. For example, a user may use legend 907 to determine whether a particular aircraft in effectivity identifier 906 has been selected, whether the user has been identified as both an owner and operator of the aircraft, whether the aircraft is a freighter, whether the user has been identified as an operator but is not the owner, and whether the aircraft is in transition.

Effectivity selector 900 also includes aircraft selector 922 and quantity selector 924. Aircraft selector 922 allows the user to select a set of aircraft for use all computations performed in or via modification marketplace 700. For example, aircraft selector 922 may be a graphical control that enables the user to select any of the aircraft that have been selected or "checked" in effectivity identifier 906. Quantity selector 924 enables the user to adjust the overall number of aircraft selected or the number of aircraft selected for each type of effectivity selected. Effectivity selector 900 also includes selection display 926. Selection display 926 identifies the number of aircraft selected from the aircraft identified in effectivity identifier 906.

Effectivity selector 900 includes search category 928, text field 930, and adder 932. Search category 928 allows the user to select a category for searching, which may be, for example, by effectivity. Text field 930 allows the user to enter an effectivity. And adder 932 allows the user to add the aircraft corresponding to that effectivity, if any, to what is displayed via effectivity identifier 906.

Effectivity selector 900 also includes clear control 934, save control 936, and close control 938. Clear control 934, when pressed or otherwise selected with via the user, clears the entries displayed via effectivity identifier 906. Save control 936 allows the user to save any selections made. Close control 938 allows the user to close effectivity selector 900.

Figure 10:
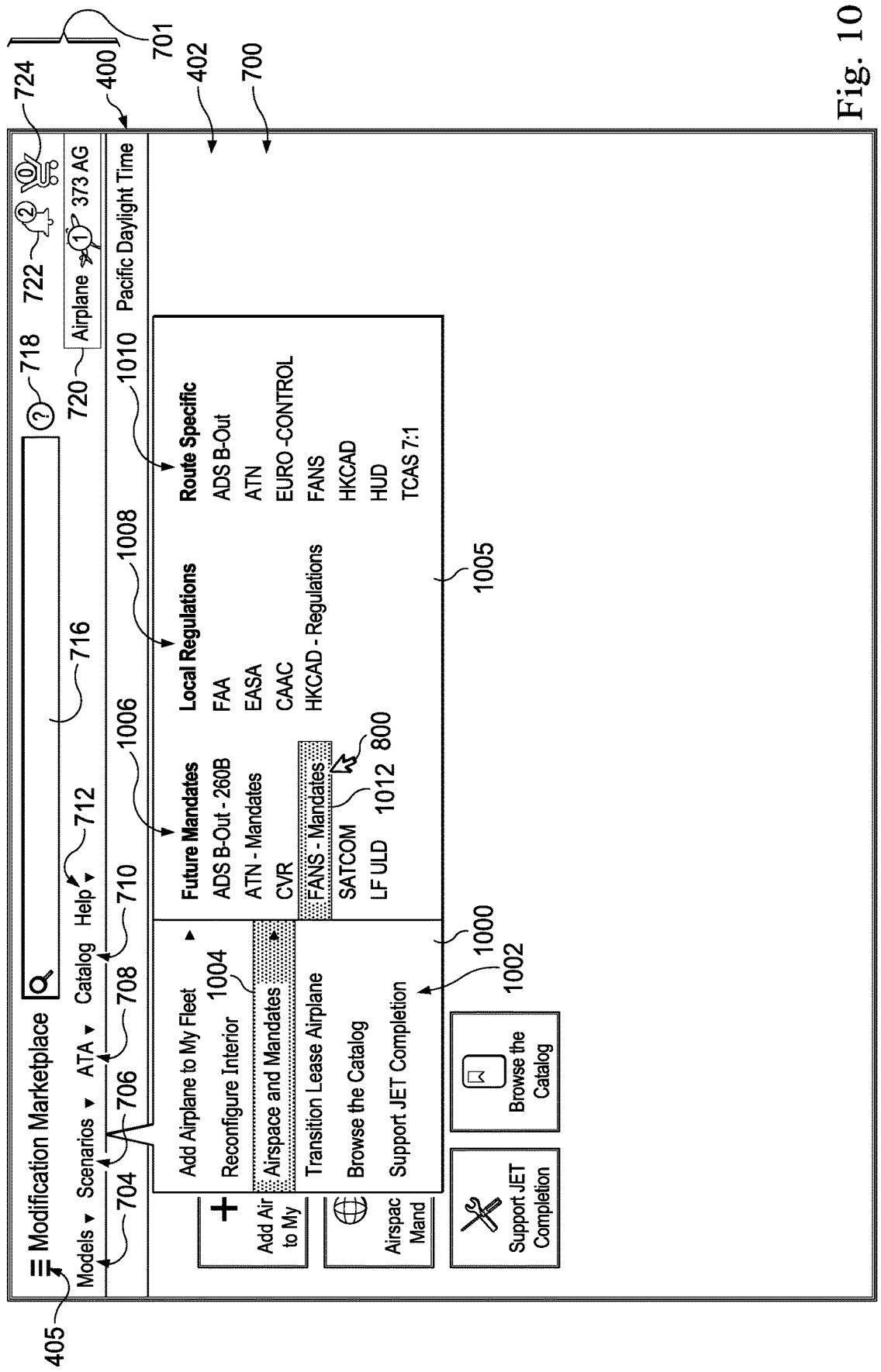
FIG. 10 is another illustration of the graphical user interface presenting the modification marketplace in accordance with an illustrative embodiment.

FIG. 10 is another illustration of graphical user interface 400 presenting modification marketplace 700 in accordance with an example embodiment. In FIG. 10, in response to a selection of scenarios menu control 706, scenarios menu 1000 is displayed. Scenarios menu 1000 presents a plurality of scenarios 1002 such as, for example, business scenarios. Scenarios 1002 are tailored based on the information provided when the user logged into virtual aircraft marketplace 100. In other words, scenarios 1002 presented are customized for the user.

In this illustrative example, the user has selected airspace and mandates scenario 1004 from scenarios 1002. In response to this selection, airspace and mandates menu 1005 is displayed. Airspace and mandates menu 1005 displays submenus, each providing a list of options. These submenus include future mandates submenu 1006, local regulations submenu 1008, and route specific mandates submenu 1010. The user may select any one of the options listed in the submenus. In this illustrative example, the user has selected option 1012. Option 1012 represents future air navigation system (FANS) mandates.

Figure 11:
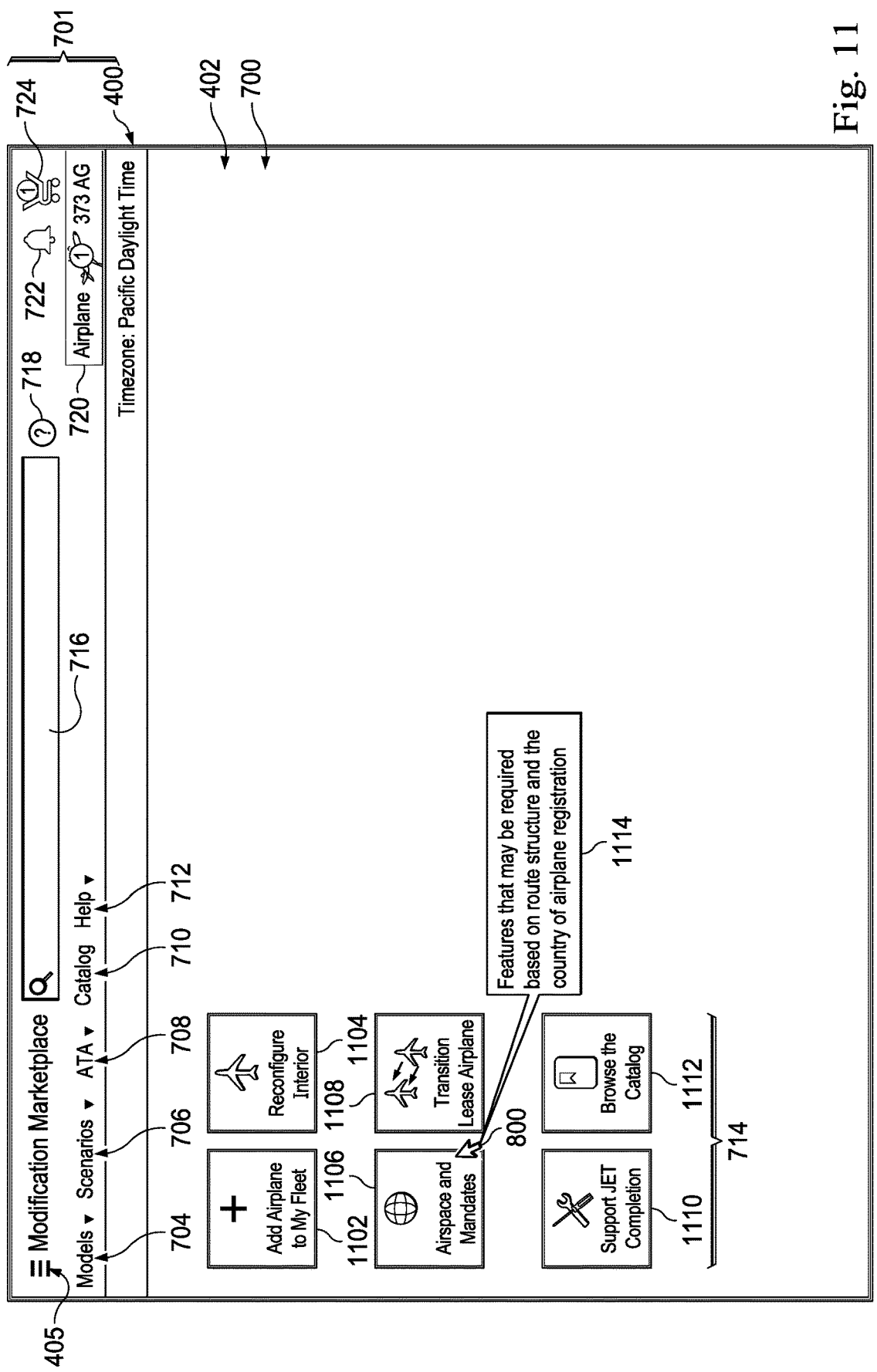
FIG. 11 is another illustration of the graphical user interface presenting the modification marketplace in accordance with an illustrative embodiment.

FIG. 11 is another illustration of graphical user interface 400 presenting modification marketplace 700 in accordance with an illustrative embodiment. As shown in FIG. 11, instead of using scenarios the user may select a scenario using scenario tiles 714 instead of via scenarios menu control 706. Scenario tiles 714 include tile 1102, tile 1104, tile 1106, tile 1108, tile 1110, and tile 1112, with each of these tiles representing a different scenario or business scenario. Scenario tiles 714 represent the same scenarios as presented within scenarios menu 1000 in FIG. 10.

Tile 1102 represents the scenario "add airplane to my fleet." Tile 1104 represents the scenario "reconfigure interior." Tile 1106 represents the scenario "airspace and mandates," which is the same as airspace and mandates scenario 1004 in FIG. 10. Tile 1108 represents the scenario "transition lease airplane." Tile 1110 represents the scenario "support JET completion." Tile 1112 represents the tile "browse the catalog."

Scenario tiles 714 are interactive control elements that allow the user to select a particular scenario and allow the user to quickly glean general information about each of the different scenarios. For example, when the user hovers cursor 800 over tile 1106, pop-up window 1114 is displayed in which pop-up window 1114 provides a description of the "airspace and mandates" scenario represented by tile 1106. The user may select the "airspace and mandates" scenario by selecting tile 1106.

Figure 12:
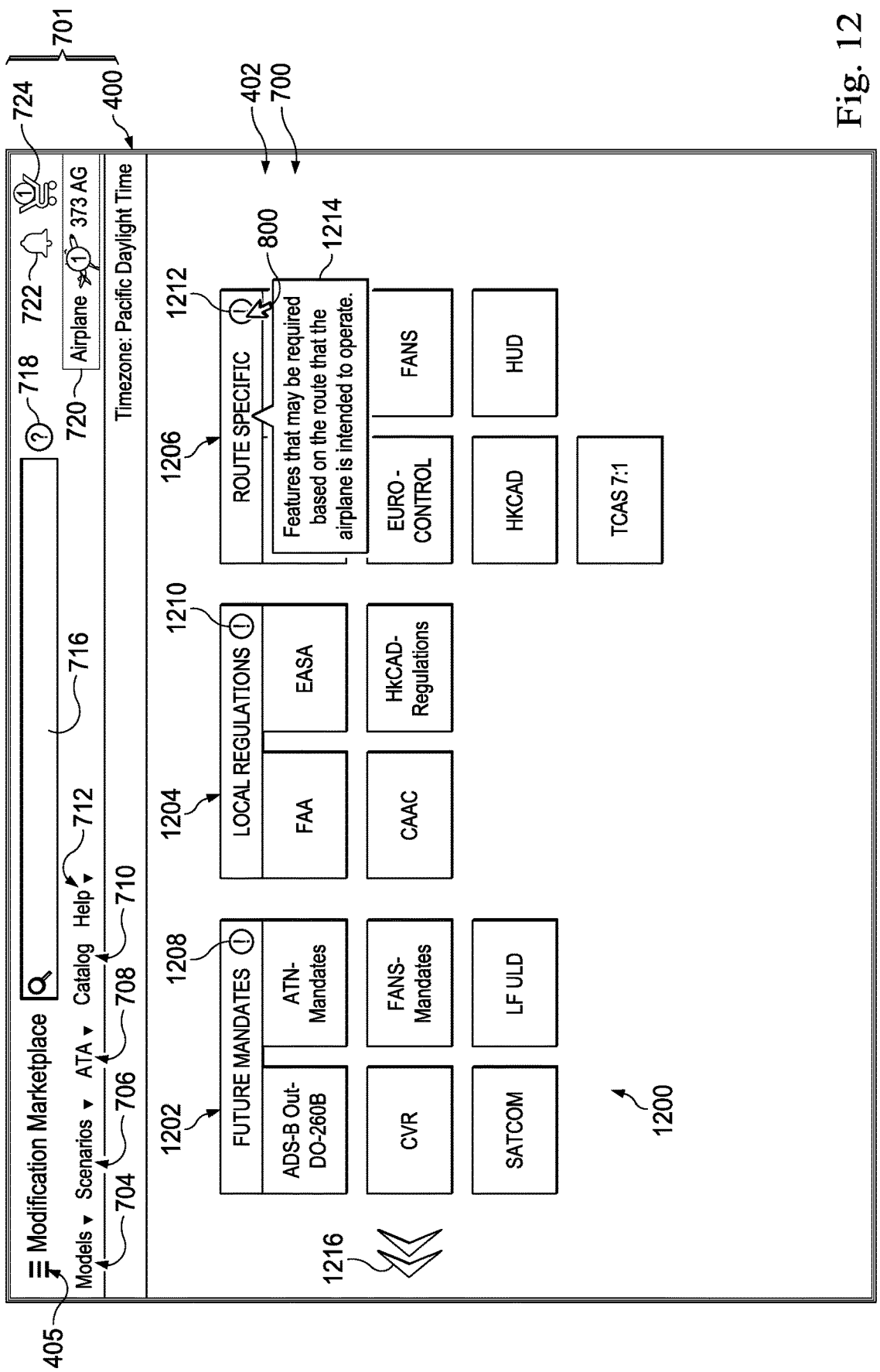
FIG. 12 is another illustration of the graphical user interface presenting the modification marketplace in accordance with an illustrative embodiment.

FIG. 12 is another illustration of graphical user interface 400 presenting modification marketplace 700 in accordance with an illustrative embodiment. In this illustrative example, tiled submenus 1200 are displayed in modification marketplace 700 in response to the user selecting tile 1106 in FIG. 11.

Tiled submenus 1200 include future mandates tiled submenu 1202, local regulations tiled submenu 1204, and route specific tiled submenu 1206, which correspond with future mandates submenu 1006, local regulations submenu 1008, and route specific mandates submenu 1010, respectively, in FIG. 10. Each of these tiled submenus includes a plurality of selectable tiles.

Further, each of future mandates tiled submenu 1202, local regulations tiled submenu 1204, and route specific tiled submenu 1206 includes a control that allows a user to learn more information about each submenu. For example, future mandates tiled submenu 1202 includes information control 1208, local regulations tiled submenu 1204 includes information control 1210, and route specific tiled submenu 1206 includes information control 1212. The user may hover over or select any one of these information controls. When the user hovers over or selects information control 1212, pop-up window 1214 is displayed and provides a description of the options provided by route specific tiled submenu 1206.

The user may return to the previous display by selecting back button 1216. For example, when the user selects back button 1216, the display may be returned to the display of scenario tiles 714 as shown in FIG. 11.

Figure 13:
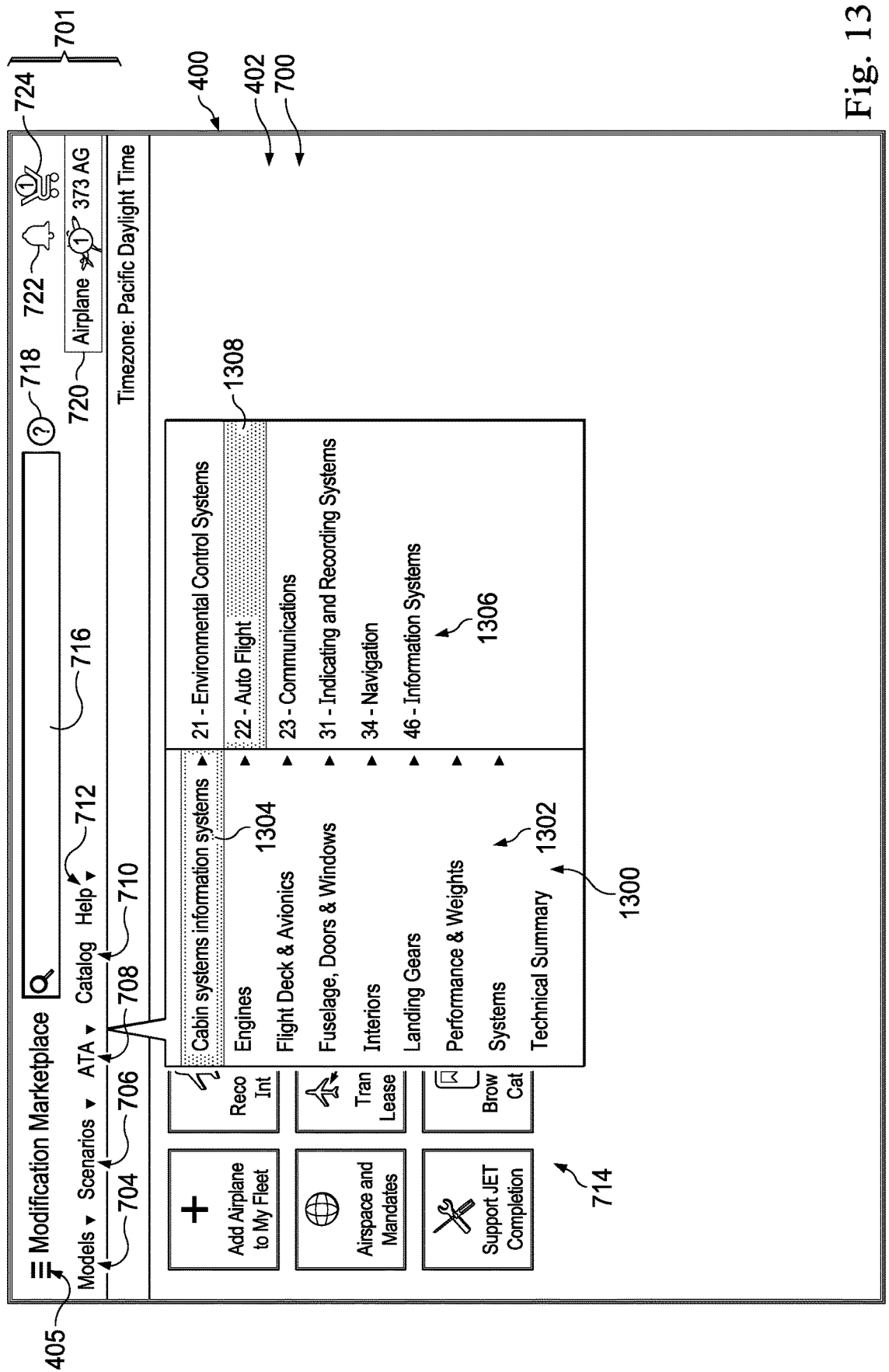
FIG. 13 is another illustration of the graphical user interface presenting the modification marketplace in accordance with an illustrative embodiment.

FIG. 13 is another illustration of graphical user interface 400 presenting modification marketplace 700 in accordance with an illustrative embodiment. In FIG. 13, in response to a selection of category menu control 708, category menu 1300 is displayed. Category menu 1300 presents a plurality of categories 1302 to the user. In one or more illustrative examples, categories 1302 are tailored based on the information provided when the user logged into virtual aircraft marketplace 100. In other words, categories 1302 presented are customized for the user.

In this illustrative example, the user first hovered cursor over cabin systems information systems category 1304, which caused submenu 1306 to be displayed. In other illustrative examples, the user may need to select cabin systems information systems category 1304 via cursor 800 to cause submenu 1306 to be displayed. Submenu 1306 provides options for different types of cabin systems and information systems and orders these options by their ATA numbering. In this illustrative example, the user is hovering cursor 800 over option 1308, which represents an auto flight system.

Figure 14:
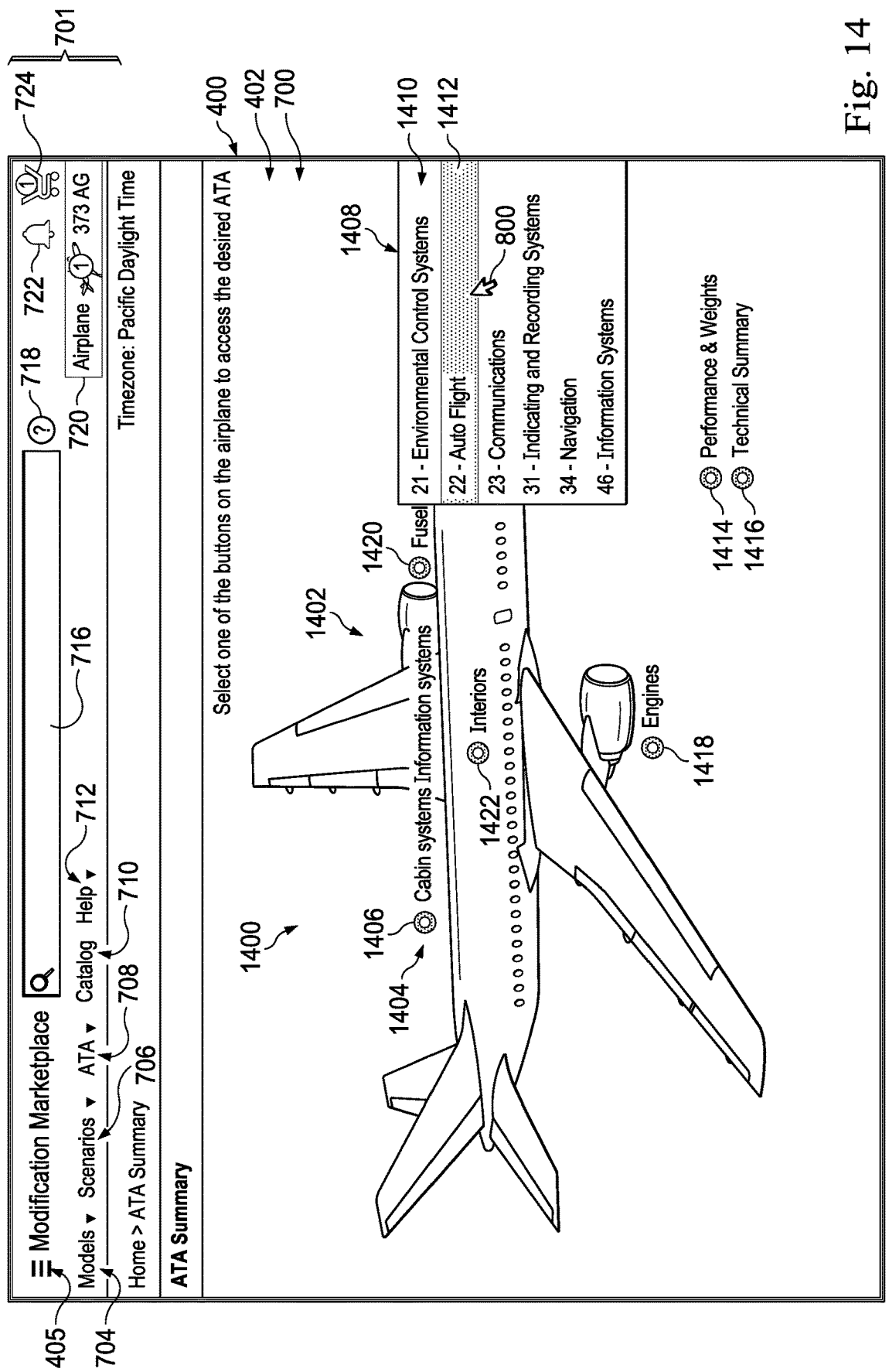
FIG. 14 is another illustration of the graphical user interface presenting the modification marketplace in accordance with an illustrative embodiment.

FIG. 14 is another illustration of graphical user interface 400 presenting modification marketplace 700 in accordance with an illustrative embodiment. In FIG. 14, category selection interface 1400 is displayed in modification marketplace 700. Category selection interface 1400 includes aircraft 1402 and category buttons 1404. Aircraft 1402 may be, for example, a representation of the particular aircraft model shown in selected aircraft display 720.

Category buttons 1404 surround aircraft 1402 and, in some illustrative examples, may include a button for each of categories 1302 shown in FIG. 13. In this illustrative example, the user has cabin systems information systems button 1406. In response to this selection, options menu 1408 is displayed. Options menu 1408 displays the same category options as submenu 1306 in FIG. 13. In this example, out of options 1410 displayed in options menu 1408, the user has hovered cursor 800 over or used cursor 800 to select auto flight option 1412.

In this illustrative example, category buttons 1404 further include performance and weights button 1414, technical summary button 1416, engines button 1418, fuselage button 1420, and interiors button 1422. Category buttons 1404 may also include other buttons not shown in this view.

Figure 15:
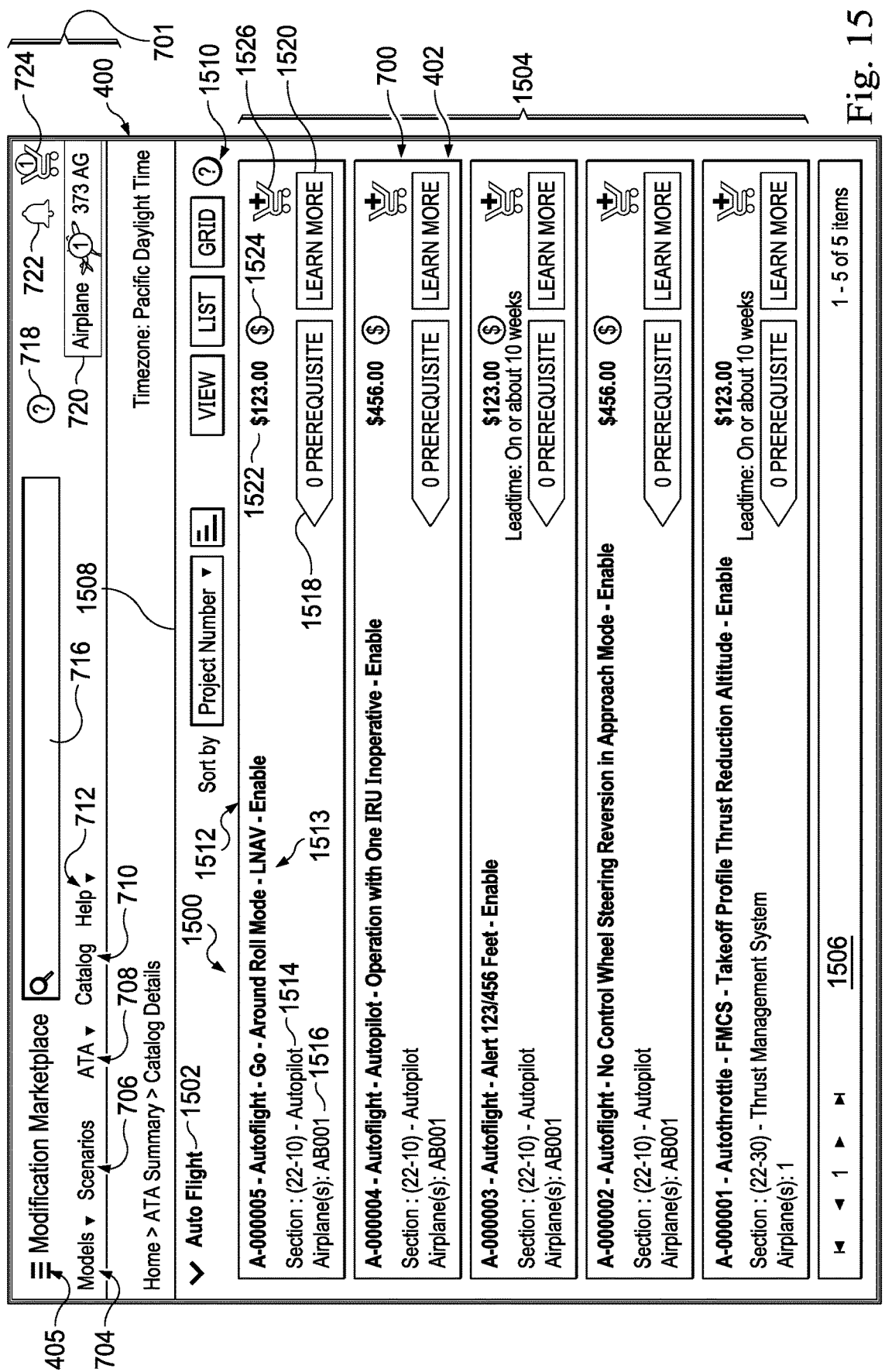
FIG. 15 is another illustration of the graphical user interface presenting the modification marketplace in accordance with an illustrative embodiment.

FIG. 15 is another illustration of graphical user interface 400 presenting modification marketplace 700 in accordance with an illustrative embodiment. In FIG. 15, auto flight catalog 1500 is displayed in modification marketplace 700 in response to a user selection of option 1412 in FIG. 14 or option 1308 in FIG. 13. Auto flight catalog 1500 includes auto flight features that may be added to an aircraft. Auto flight catalog identifier 1502 identifies that the features presented are auto flight features. Auto flight catalog identifier 1502 is also an interactive element that allows the user to collapse the auto flight features (e.g., hide from display) if desired.

Feature entries 1504 are displayed in this illustrative example. Each of feature entries identifies a particular feature. Auto flight catalog 1500 only includes the five feature entries shown, in this example. But in other illustrative examples, auto flight catalog 1500 may include many more feature entries than can be displayed at once. In these other examples, catalog navigation section 1506 allows the user to navigate through the various pages of auto flight catalog 1500. Sort control 1508 allows the user to sort the feature entries presented in auto flight catalog 1500. In this illustrative example, feature entries 1504 are sorted by project number. The user may use help button 1510 to view help or support information for auto flight catalog 1500 (e.g., information about navigating through auto flight catalog 1500).

Feature entry 1512 is an example of one of feature entries 1504. Feature entry 1512 may include, for example, feature identifier 1513, category identifier 1514, aircraft identifier 1516, prerequisite information 1518, detailed information button 1520, price information 1522, additional pricing button 1524, and add to cart button 1526. Feature identifier 1513 identifies the particular feature represented by feature entry 1512. In this illustrative example, feature identifier 1513 identifies a feature for enabling an "Autoflight Go-Around Roll Mode" for lateral navigation. In some examples, the user may select feature identifier 1513 to cause additional information about the identified feature to be presented. Category identifier 1514, which may also be referred to as a section identifier, identifies the particular catalog category to which the identified feature belongs. Aircraft identifier 1516 identifies, for example, the particular aircraft to which the identified feature may be added.

Prerequisite information 1518 indicates whether any prerequisite features are required to have been previously installed or simultaneously installed on the aircraft in order for the identified feature to be installed. Detailed information button 1520 allows the user to view additional, detailed information about the identified feature. This detailed information may include some of the information presented when feature identifier 1513 is selected, as well as other detailed information about the identified feature. Price information 1522 indicates a purchase price for the identified features. Additional pricing button 1524 allows the user to find additional pricing information. Add to cart button 1526 allows the user to quickly and easily add the identified feature to a virtual "cart" for purchase.

Figure 16:
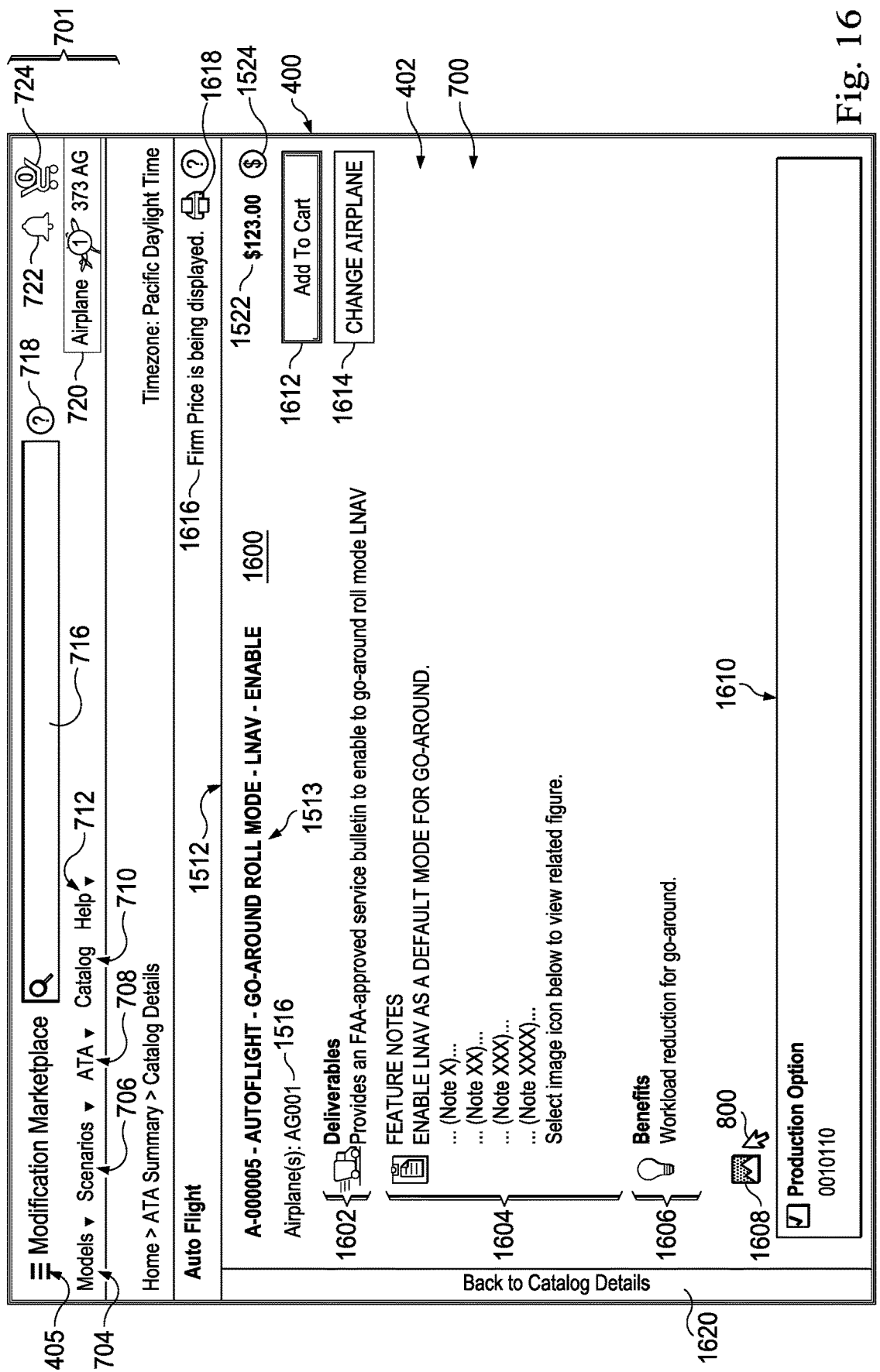
FIG. 16 is another illustration of the graphical user interface presenting the modification marketplace in accordance with an illustrative embodiment.

FIG. 16 is another illustration of graphical user interface 400 presenting modification marketplace 700 in accordance with an illustrative embodiment. In this illustrative example, detailed display 1600 is presented in modification marketplace 700 in response to the user having selected detailed information button 1520 in FIG. 15. As illustrated, detailed display 1600 may include at least some of the information, graphical controls, or both presented in auto flight catalog 1500 in FIG. 15.

Detailed display 1600 includes deliverable information 1602, notes section 1604, benefits section 1606, image button 1608, and production option section 1610. Deliverable information 1602 identifies a brief description of what the user is actually purchasing with the identified feature. Notes section 1604 includes, for example, further notes or details about the identified feature. Benefits section 1606 includes benefits or advantages of the identified feature. When present, image button 1608 allows the user to view an image, screenshot, model, or other visual representation of the identified feature. Production option section 1610 identifies options for production.

Detailed display 1600 also includes add to cart button 1612 and change airplane button 1614. Add to cart button 1612 is similar to add to cart button 1526 and allows the user to quickly and easily add the identified feature to his or her virtual "cart" for purchase. Change airplane button 1614 allows the user to change the aircraft selected so that this feature may be considered with respect to a different aircraft. Price description 1616 indicates whether the price presented by price information 1522 is a firm price for use in a firm proposal. Print button 1618 allows the user to print the displayed information.

Figure 17:
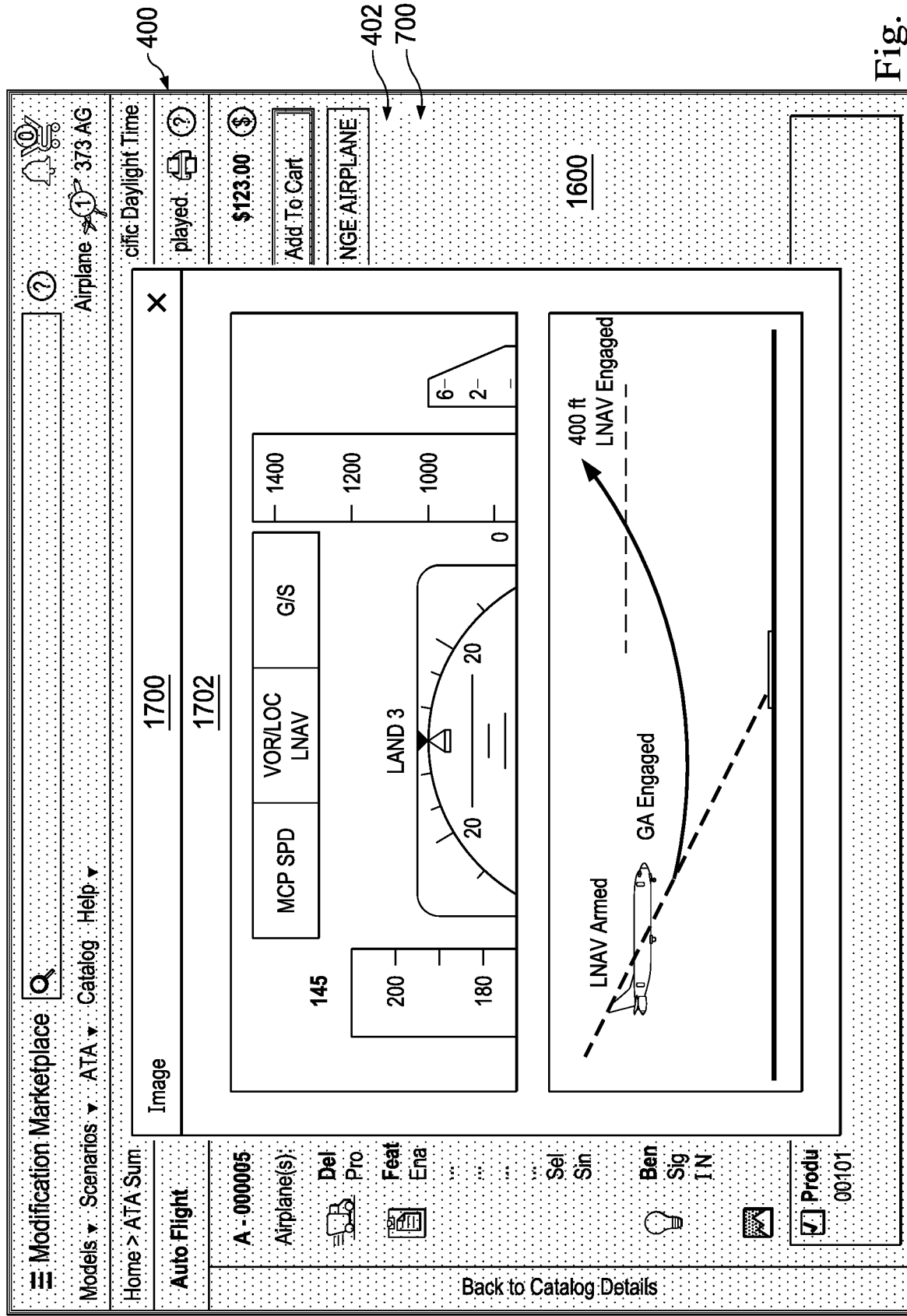
FIG. 17 is another illustration of the graphical user interface presenting the modification marketplace in accordance with an illustrative embodiment.

FIG. 17 is another illustration of graphical user interface 400 presenting modification marketplace 700 in accordance with an illustrative embodiment. In this illustrative example, window 1700 is displayed in response to the user selecting image button 1608 in FIG. 16. Window 1700 includes image 1702 that helps the user better understand what the "Autoflight Go-Around Roll Mode" feature for lateral navigation provides. Image 1702 is displayed directly over detailed display 1600.

Figure 18:
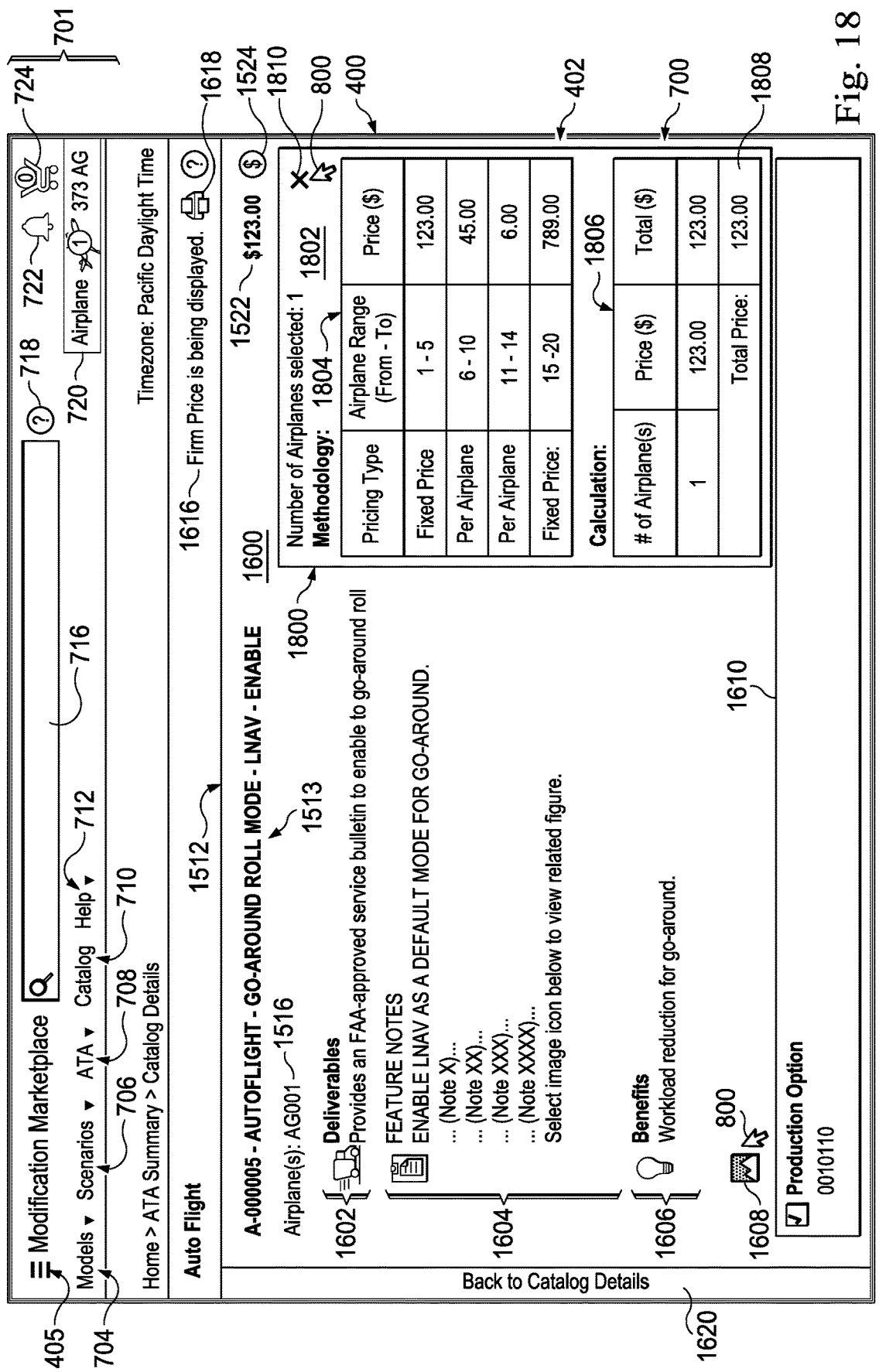
FIG. 18 is another illustration of the graphical user interface presenting the modification marketplace in accordance with an illustrative embodiment.

FIG. 18 is another illustration of graphical user interface 400 presenting modification marketplace 700 in accordance with an illustrative embodiment. In this illustrative example, pricing window 1800 is displayed in response to the user selecting or hovering or rolling cursor 800 over additional pricing button 1524 shown in FIG. 16. Pricing window 1800 displays detailed pricing information 1802 for the "Autoflight Go-Around Roll Mode" feature.

Detailed pricing information 1802 includes methodology information 1804 and calculation information 1806. Methodology information 1804 identifies how the price for the feature changes based on the quantity of aircraft for which the feature is being ordered. Calculation information 1806 indicates the expected total price 1808 for adding this feature based on the number of aircraft selected, as indicated by selected aircraft display 720. Close button 1810 allows the user to close pricing window 1800 and return to detailed display 1600.

Figure 19:
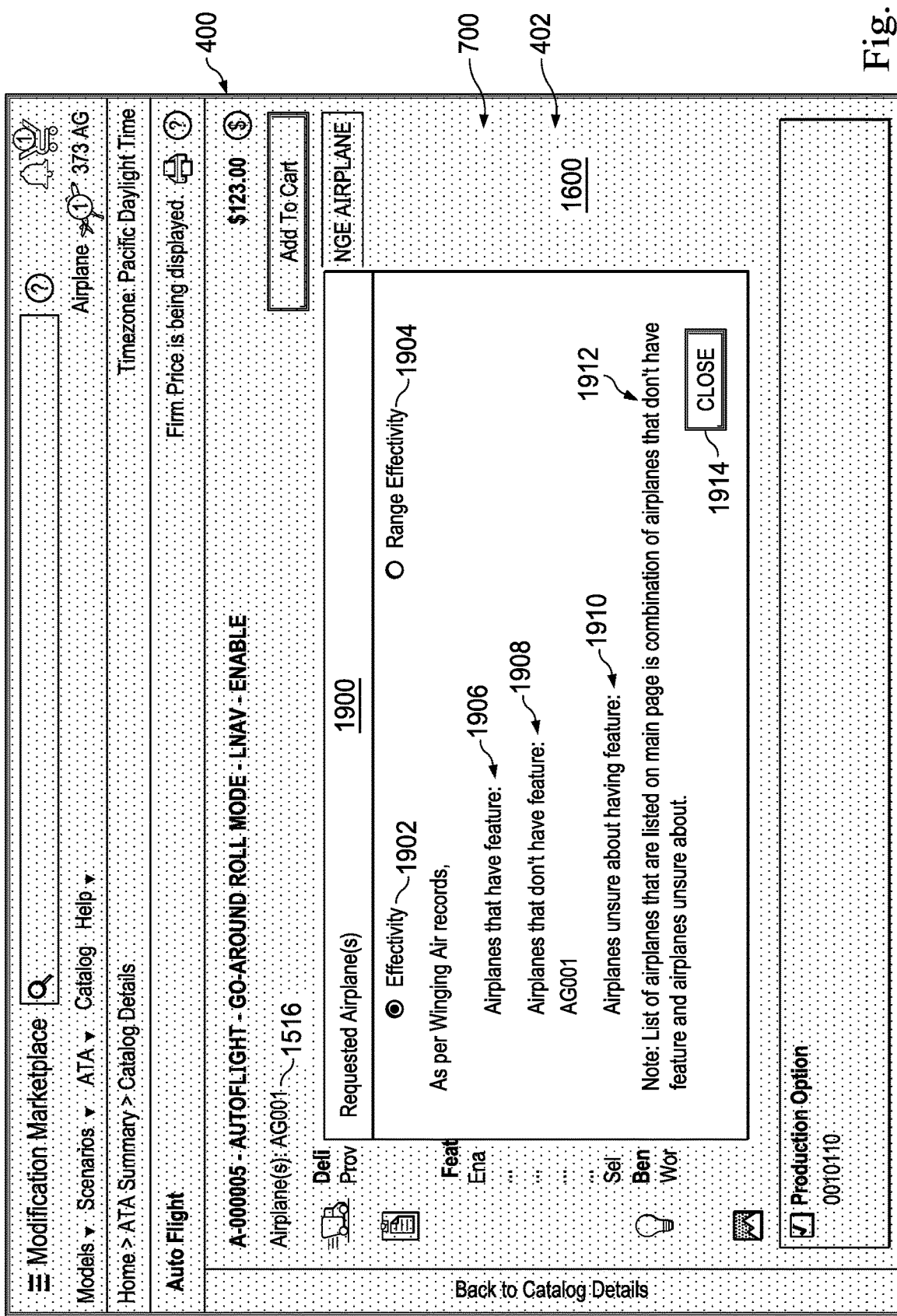
FIG. 19 is another illustration of the graphical user interface presenting the modification marketplace in accordance with an illustrative embodiment.

FIG. 19 is another illustration of graphical user interface 400 presenting modification marketplace 700 in accordance with an illustrative embodiment. In this illustrative example, window 1900 is displayed in response to the user selecting aircraft identifier 1516. Window 1900 is displayed over detailed display 1600. Window 1900 includes effectivity selector 1902 and range effectivity selector 1904, one of which may be selected by the user at a given time.

Window 1900 presents information about whether the "Autoflight Go-Around Roll Mode" feature is present or not present in any of the aircraft identified by aircraft identifier 1516 from FIGS. 15 and 16. For example, present category 1906 lists any aircraft in which the feature is already installed. Not present category 1908 lists any aircraft in which the feature is not already installed. And unsure category 1910 lists any category for which the installation status of the feature is unclear. Note 1912 provides additional information to help the user understand the breakdown of information presented in window 1900 as compared to the aircraft listed by aircraft identifier 1516. Close button 1914 allows the user to close window 1900 and return to detailed display 1600.

Figure 20:
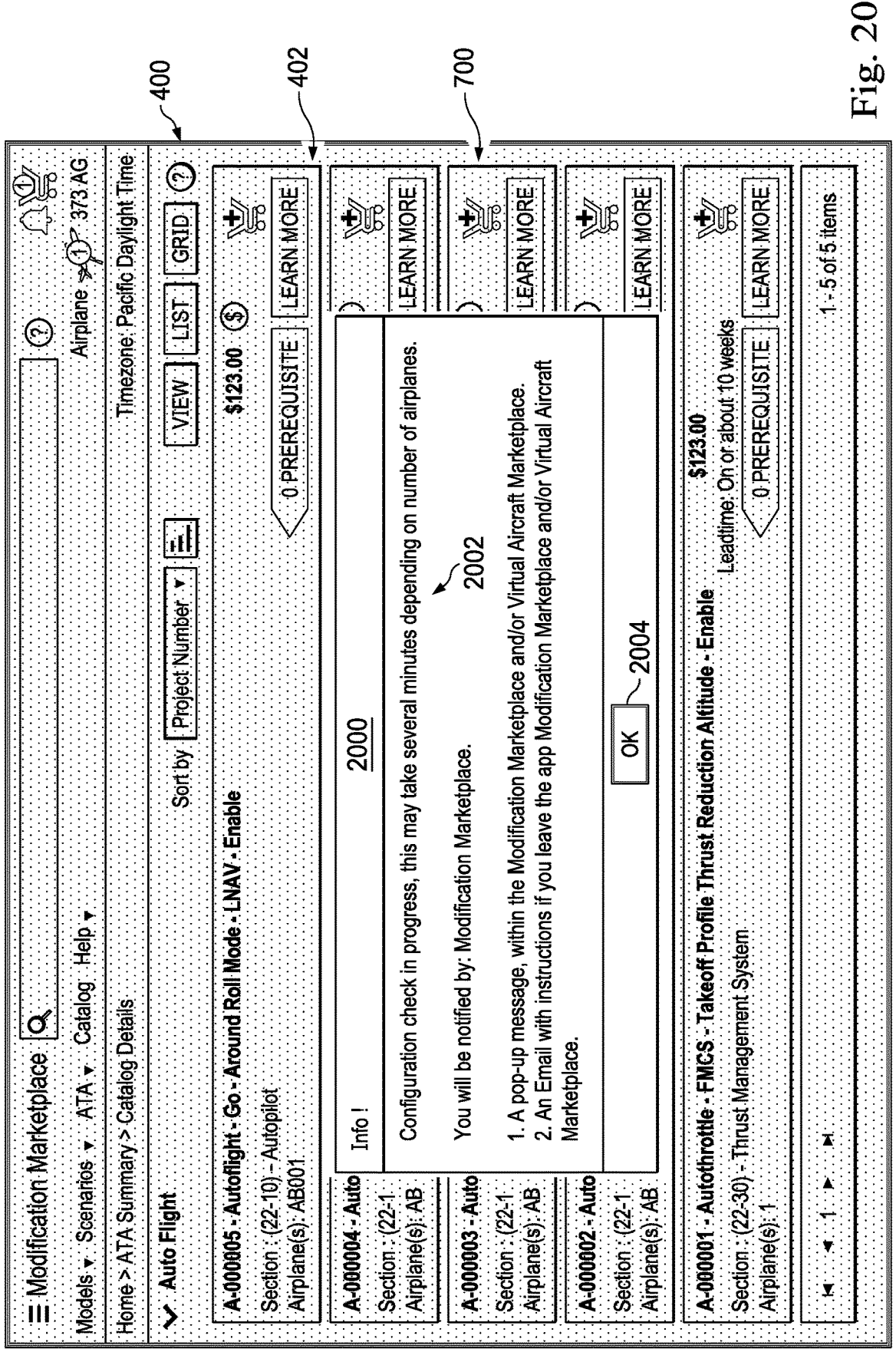
FIG. 20 is another illustration of the graphical user interface presenting the modification marketplace in accordance with an illustrative embodiment.

FIG. 20 is another illustration of graphical user interface 400 presenting modification marketplace 700 in accordance with an illustrative embodiment. In this illustrative example, the user has added a feature (e.g., the "Autoflight Go-Around Roll Mode" feature) to a virtual cart by selecting add to cart button 1526 from FIG. 15. In other illustrative examples, the feature may be added to the virtual cart by the user selecting add to cart button 1612 from FIG. 16.

Once one of these "add to cart" buttons has been selected, window 2000 is displayed. Window 2000 presents in progress information 2002 to the user. In progress information 2002 gives the user an indication of how long it will take to complete the process of adding the feature to the virtual cart given the number of aircraft selected, as indicated by selected aircraft display 720. For example, a configuration check may be performed to determine whether the selected feature was previously installed on the aircraft, can be installed on the aircraft based on any needed prerequisites, or both.

Further, in progress information 2002 indicates one or more ways in which the user may be notified when this process is complete. Once the user has read in progress information 2002, the user may select ok button 2004 to close window 2000. The add to cart process is performed in the background.

Figure 21:
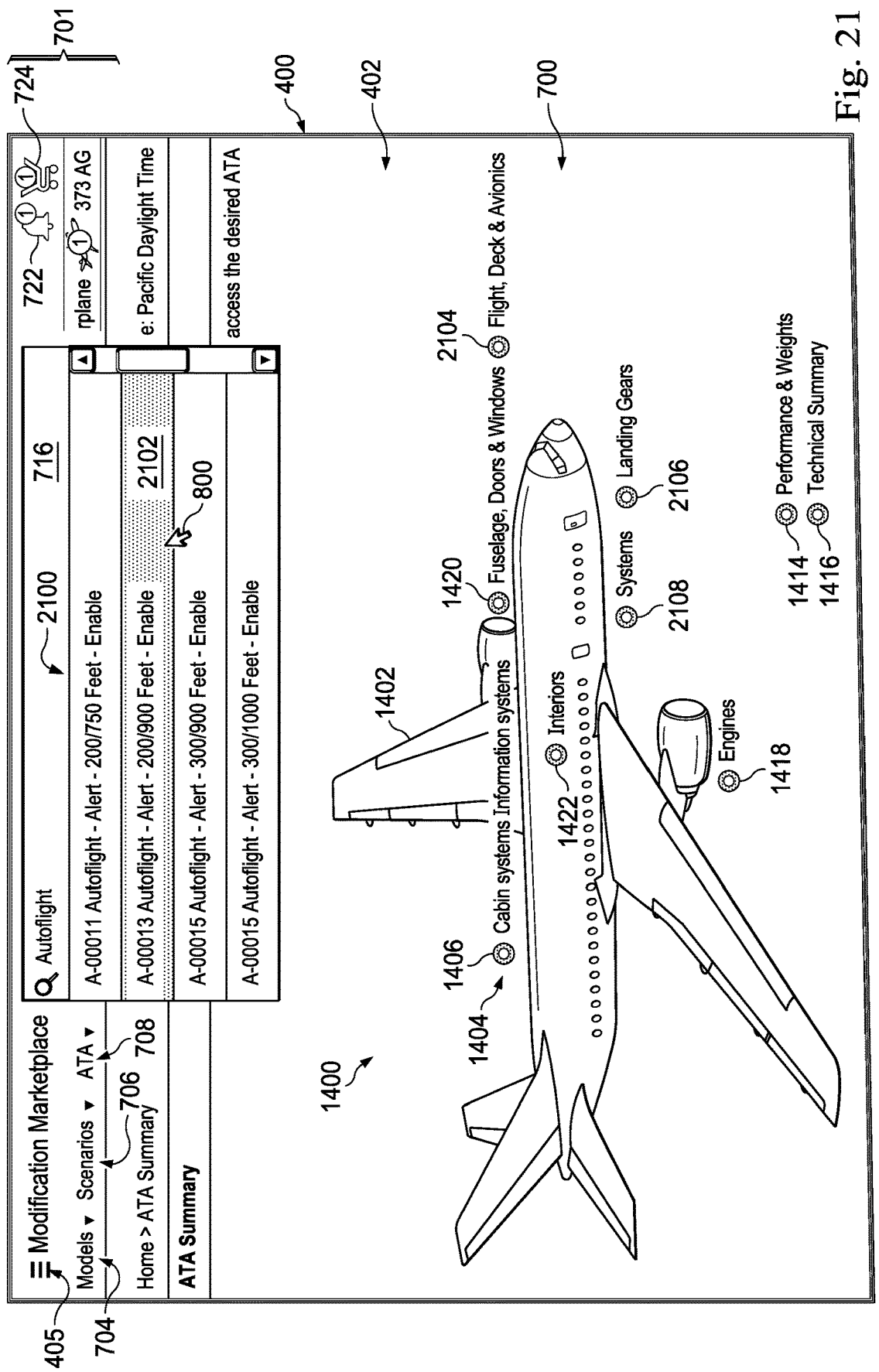
FIG. 21 is another illustration of the graphical user interface presenting the modification marketplace in accordance with an illustrative embodiment.

FIG. 21 is another illustration of graphical user interface 400 presenting modification marketplace 700 in accordance with an illustrative embodiment. In some examples, the user may wish to search for a feature directly by its identification number. For example, the user may use search box 716 to perform a keyword search. In this illustrative example, the user has entered the keyword "autoflight" in search box 716, which causes list of features 2100 to be displayed under search box 716. Each feature in list of features 2100 is one that belongs to the autoflight category or has the word "autoflight" in its title or description. For example, feature 2102 includes "autoflight" in its title. If the user selects a feature, such as feature 2102, a feature entry, similar to feature entry 1512 in FIG. 15, that corresponds to the selected feature is displayed to the user. Flight, deck, and avionics button 2104 of category buttons 1404 is visible in this view.

Figure 22:
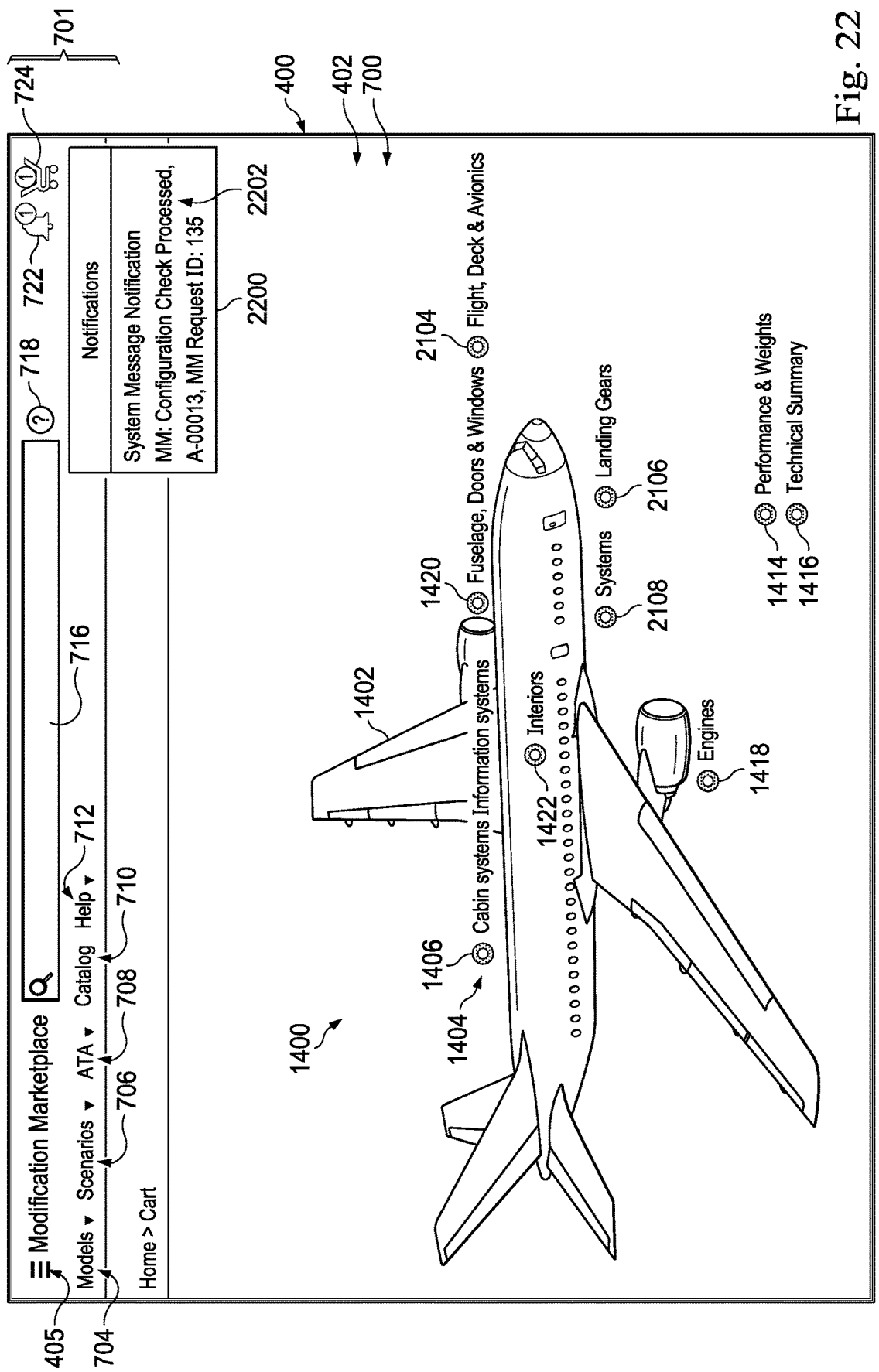
FIG. 22 is another illustration of the graphical user interface presenting the modification marketplace in accordance with an illustrative embodiment.

FIG. 22 is another illustration of graphical user interface 400 presenting modification marketplace 700 in accordance with an illustrative embodiment. As previously discussed, the process of adding a feature to the virtual cart may take place in the background while the user continues to navigate or explore modification marketplace 700. Notifications 722 track any notifications that are generated specific to the user. For example, when the process of adding a feature to the virtual cart is complete, a notification may be generated, and the user may be alerted to this notification via notifications 722.

In response to the user selecting notifications 722, notification window 2200 is displayed to the user. Notification window 2200 may include one or more notifications. In this illustrative example, notification window 2200 includes notification 2202 that provides a status of the configuration check that was performed. In particular, notification 2202 signals to the user that the process of adding the feature to the virtual cart has been completed. The user may select notification 2202 (e.g., by clicking anywhere within notification 2202) to view additional information.

Figure 23:
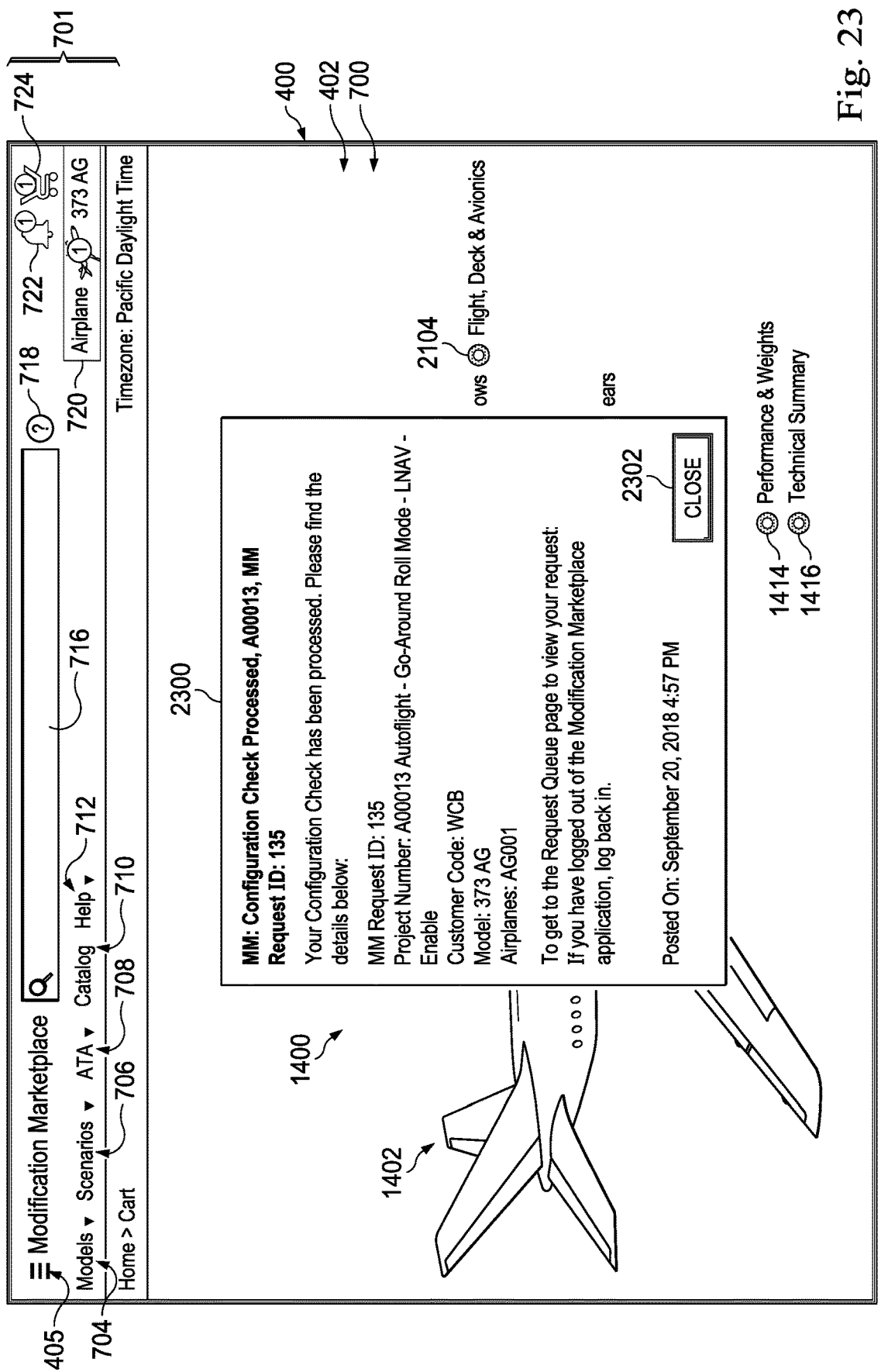
FIG. 23 is another illustration of the graphical user interface presenting the modification marketplace in accordance with an illustrative embodiment.

FIG. 23 is another illustration of graphical user interface 400 presenting modification marketplace 700 in accordance with an illustrative embodiment. In this illustrative example, detailed status update 2300 is presented to the user in response to the user selecting notification 2202 in FIG. 22. Detailed status update 2300 provides information to the user regarding the user's request to add the selected feature to the selected aircraft. Close button 2302 allows detailed status update 2300 to be closed and removed from display.

Figure 24:
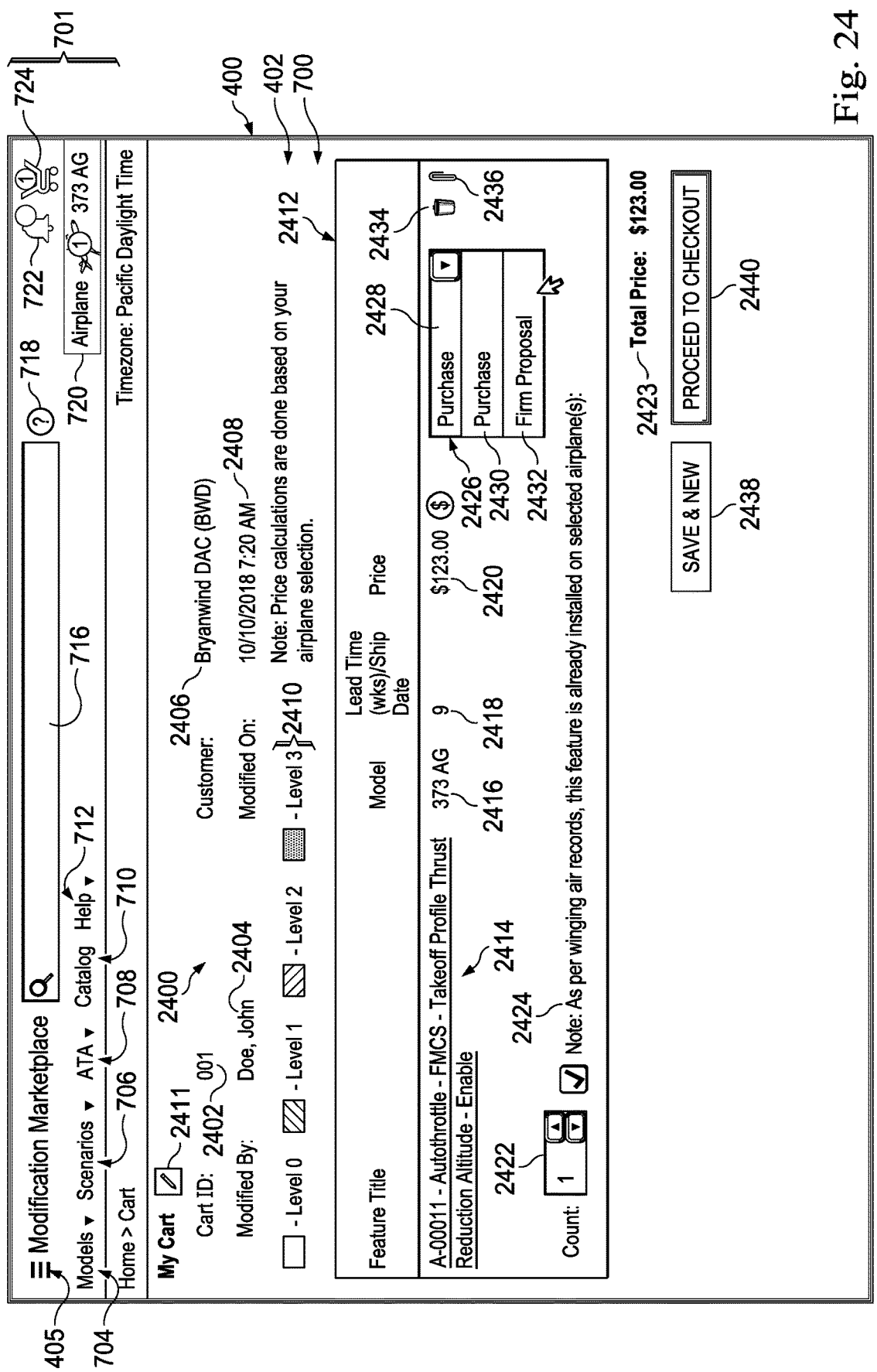
FIG. 24 is another illustration of the graphical user interface presenting the modification marketplace in accordance with an illustrative embodiment.

FIG. 24 is another illustration of graphical user interface 400 presenting modification marketplace 700 in accordance with an illustrative embodiment. In this illustrative example, cart display 2400 is presented to the user in response to the user selecting, for example, cart control 724. In other illustrative examples, cart display 2400 may be presented to the user in response to the user selecting some other type of button or graphical control within modification marketplace 700.

Cart display 2400 presents cart identification 2402, modifier 2404, customer identification 2406, last modified date 2408, legend 2410, and edit button 2411. Cart identification 2402 identifies the virtual cart to which one or more features have been added. In some cases, cart identification 2402 identifies an order id that corresponds to an "instance" of the virtual cart. Modifier 2404 identifies the user that is making changes to the virtual cart, such as adding features to the virtual cart. Customer identification 2406 identifies the customer, which may be the user or an entity represented by the user. Last modified date 2408 identifies the date and time on which the virtual cart was last modified. In this illustrative example, legend 2410 identifies the color coding or pattern coding used to provide visual information about the different features in the virtual cart. In some illustrative examples, edit button 2411 allows the user to make changes to at least some portion of cart display 2400.

Additionally, cart display 2400 presents contents section 2412 to the user. Contents section 2412 identifies the one or more features in the virtual cart. In this illustrative example, the virtual cart only includes a single feature. Contents section 2412 includes feature identifier 2414, aircraft model identifier 2416, lead time 2418, price 2420, quantity selector 2422, note 2424, and purchase type selector 2426. The area surrounding this information may be color-coded or pattern-coded to indicate certain types of information about the corresponding feature, as defined by legend 2410.

Feature identifier 2414 identifies the feature. Aircraft model identifier 2416 identifies the aircraft model to which the feature is being added. Lead time 2418 identifies the number of weeks to delivery. In some instances, lead time 2418 identifies a ship or delivery date. Price 2420 identifies the price per unit for the feature. Quantity selector 2422 allows the user to select the number of units of the feature being requested. Note 2424 identifies additional information about the feature that may be relevant to the user.

Purchase type selector 2426 allows the user to select whether the feature is being requested as part of a purchase order or as part of a request for a firm proposal. Box 2428 identifies the current selection, which may be one of purchase option 2430 or firm proposal option 2432.

Cart display 2400 also includes delete button 2434 and attachment button 2436. Delete button 2434 allows the user to remove this feature from the virtual cart. Attachment button 2436 may allow the user to upload one or more attachments corresponding to the request, view documentation associated with the feature, or both.

Additionally, cart display 2400 includes save and new button 2438 and checkout button 2440. Save and new button 2438 allows the user to save any changes made to the virtual cart for that particular "instance" of the virtual cart. The user may also be taken to a different display to allow the user to begin adding a new feature to the virtual cart, working with a new instance of the virtual cart, or working with a different virtual cart. In other illustrative examples, save and new button 2438 may be replaced with just a save button that allows the user to save the instance of the virtual cart and return to a previous display. Proceed to checkout button 2440 allows the user to begin a formal checkout process to finalize the order.

Figure 25:
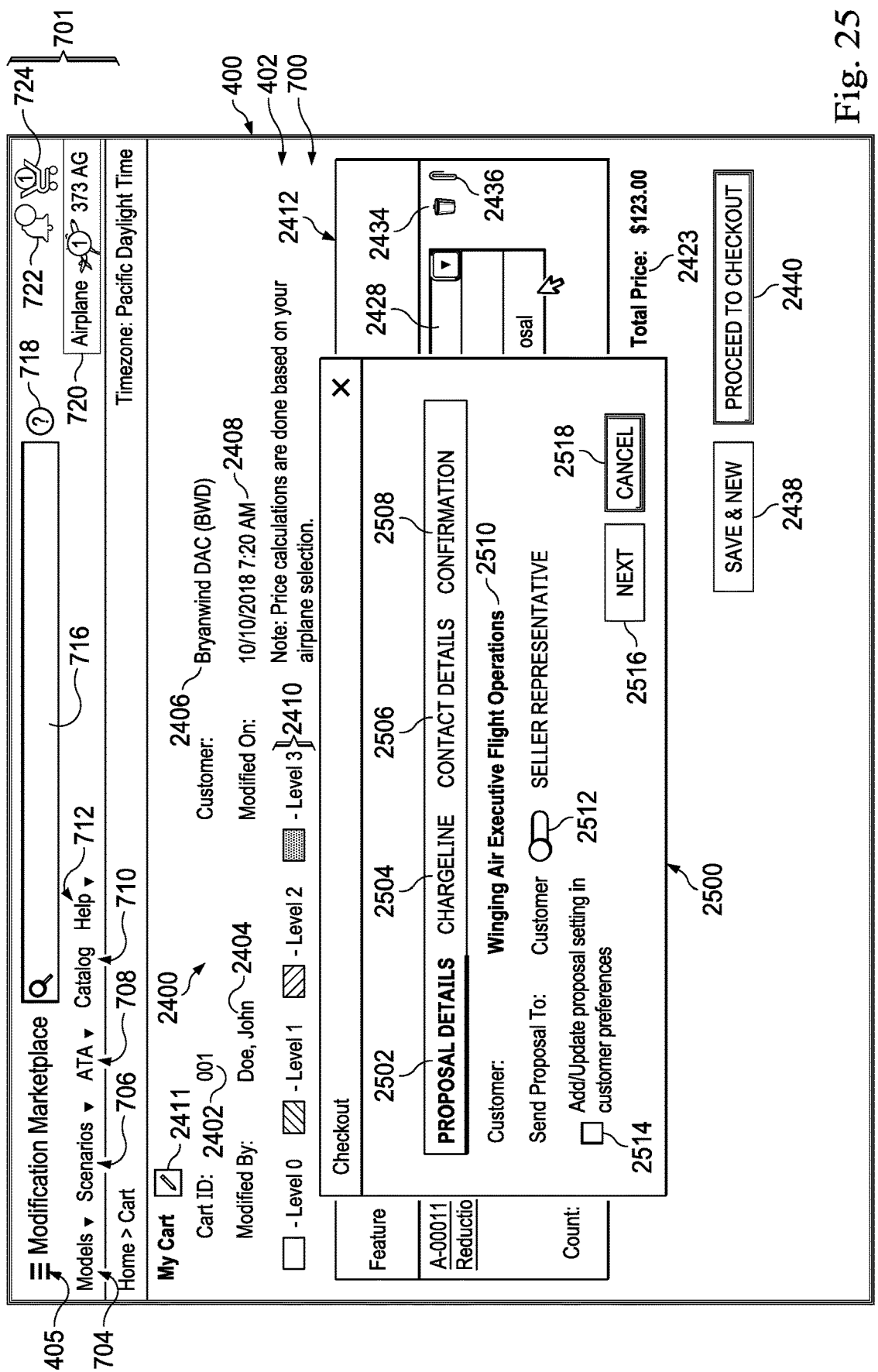
FIG. 25 is another illustration of the graphical user interface presenting the modification marketplace in accordance with an illustrative embodiment.

FIG. 25 is another illustration of graphical user interface 400 presenting modification marketplace 700 in accordance with an illustrative embodiment. In this illustrative example, checkout window 2500 is displayed to the user in response to the user selecting checkout button 2440 from FIG. 24. Checkout window 2500 is displayed over cart display 2400. Checkout window 2500 helps facilitate the checkout process. For example, checkout window 2500 first presents a display for proposal details 2502. As the user progresses through the checkout process, checkout window 2500 then presents a display for each of chargeline 2504, contact details 2506, and confirmation 2508.

When the display for proposal details 2502 is presented, customer identification 2510, order destination selector 2512, and add/update proposal setting box 2514 are displayed. Customer identification 2510 identifies the customer for which the order is being placed. Order destination selector 2512 identifies whether the purchase order or proposal is to be sent to the customer or a representative. The representative may be a representative of the customer, a representative of the entity hosting modification marketplace 700, or some other representative. Add/update proposal setting box 2514 allows the user to update preferences regarding who the proposal is to be sent to based on the selection via order destination selector 2512. The user may progress to the next step in the checkout process by selecting next button 2516 or may cancel the checkout process by selecting cancel button 2518.

Figure 26:
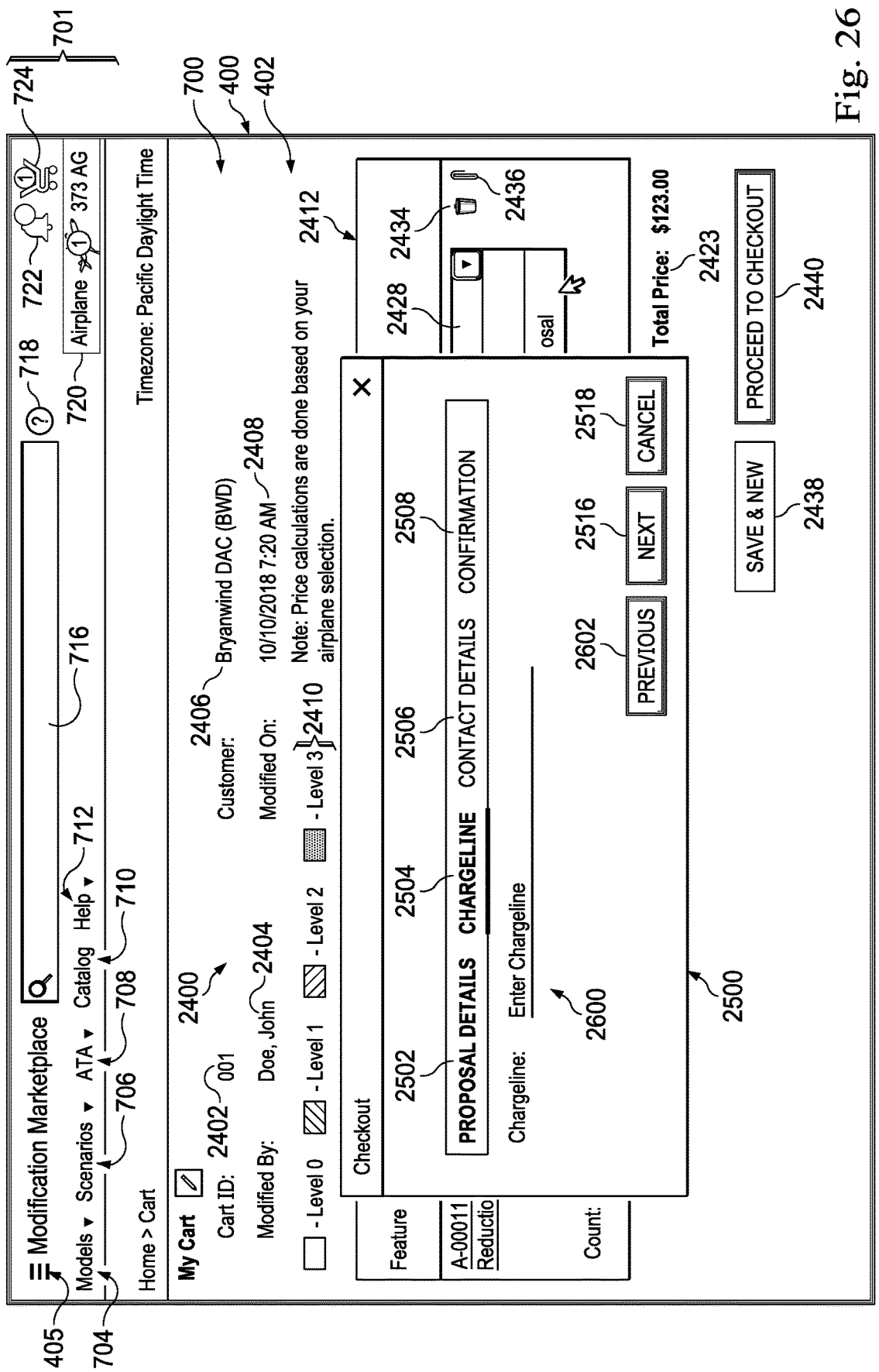
FIG. 26 is another illustration of the graphical user interface presenting the modification marketplace in accordance with an illustrative embodiment.

FIG. 26 is another illustration of graphical user interface 400 presenting modification marketplace 700 in accordance with an illustrative embodiment. In this illustrative example, a display for chargeline 2504 is presented in response to the user selecting next button 2516 from FIG. 25. In particular, chargeline input 2600 is presented and allows the user to enter, for example, an account number for a chargeline to which the purchase of the feature would be billed. The user may proceed to the next step in the checkout process by selecting next button 2516, may cancel the checkout process by selecting cancel button 2518, or may return to the previous display of proposal details 2502 by selecting the previous button 2602.

Figure 27:
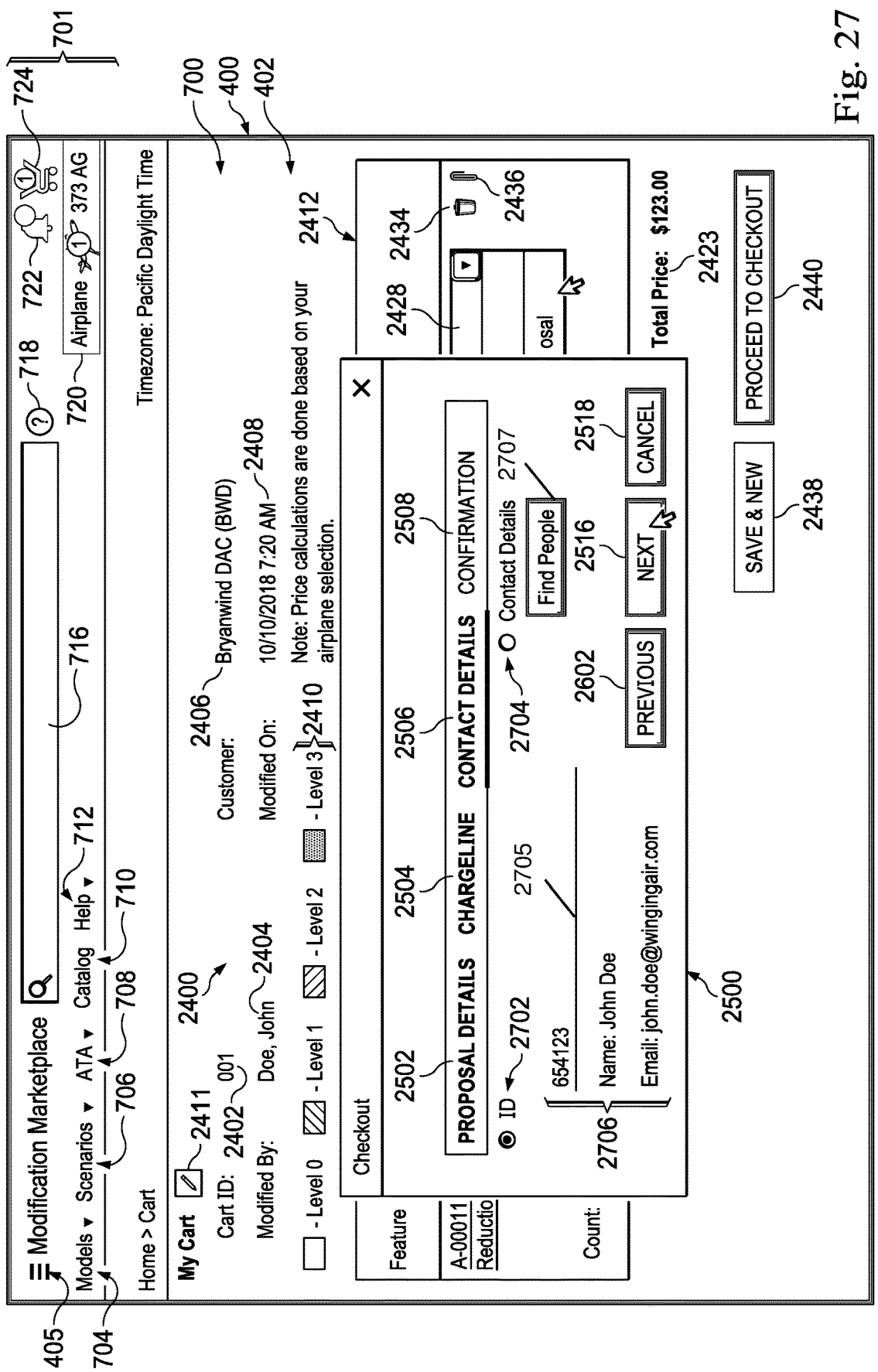
FIG. 27 is another illustration of the graphical user interface presenting the modification marketplace in accordance with an illustrative embodiment.

FIG. 27 is another illustration of graphical user interface 400 presenting modification marketplace 700 in accordance with an illustrative embodiment. In this illustrative example, a display for contact details 2506 is presented in response to the user selecting next button 2516 in FIG. 26. This display allows the user to enter his or her contact details via an identification number (ID) or by entering his or her contact information. For example, the user may toggle between ID radio button 2702 and contact details radio button 2704.

When ID radio button 2702 has been selected, the user is allowed to enter an identification number at line 2705 in search section 2706. The user may select find people button 2707 to search for this identification number. The results of the search are populated within search section 2706. When contact details radio button 2704 is selected, the user may enter contact information within search section 2706. This contact information may include at least one of an email address, a name, or a phone number. The user may then select find people button 2707 to find the rest of his or her contact information, which is then populated within search section 2706. Once the user has ensured that his or her proper contact details have been found, the user may select next button 2516.

Figure 28:
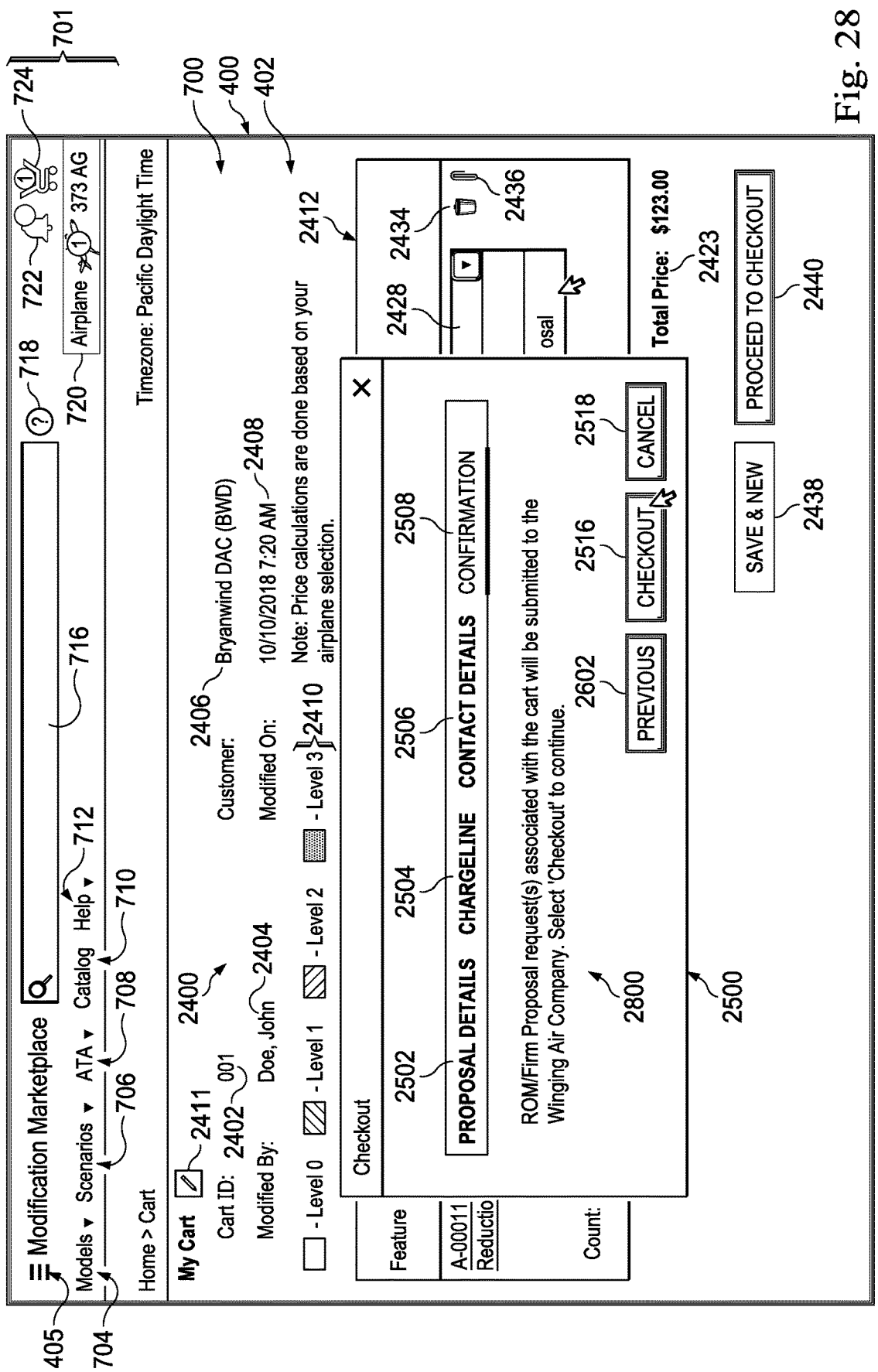
FIG. 28 is another illustration of the graphical user interface presenting the modification marketplace in accordance with an illustrative embodiment.

FIG. 28 is another illustration of graphical user interface 400 presenting modification marketplace 700 in accordance with an illustrative embodiment. In this illustrative example, a display for confirmation 2508 is presented in response to the user selecting next button 2516 as described above in FIG. 27. This display includes confirmation message 2800 that is presented to the user letting the user know that the checkout process is near completion. The user may select checkout button 2802 to complete the checkout process.

Figure 29:
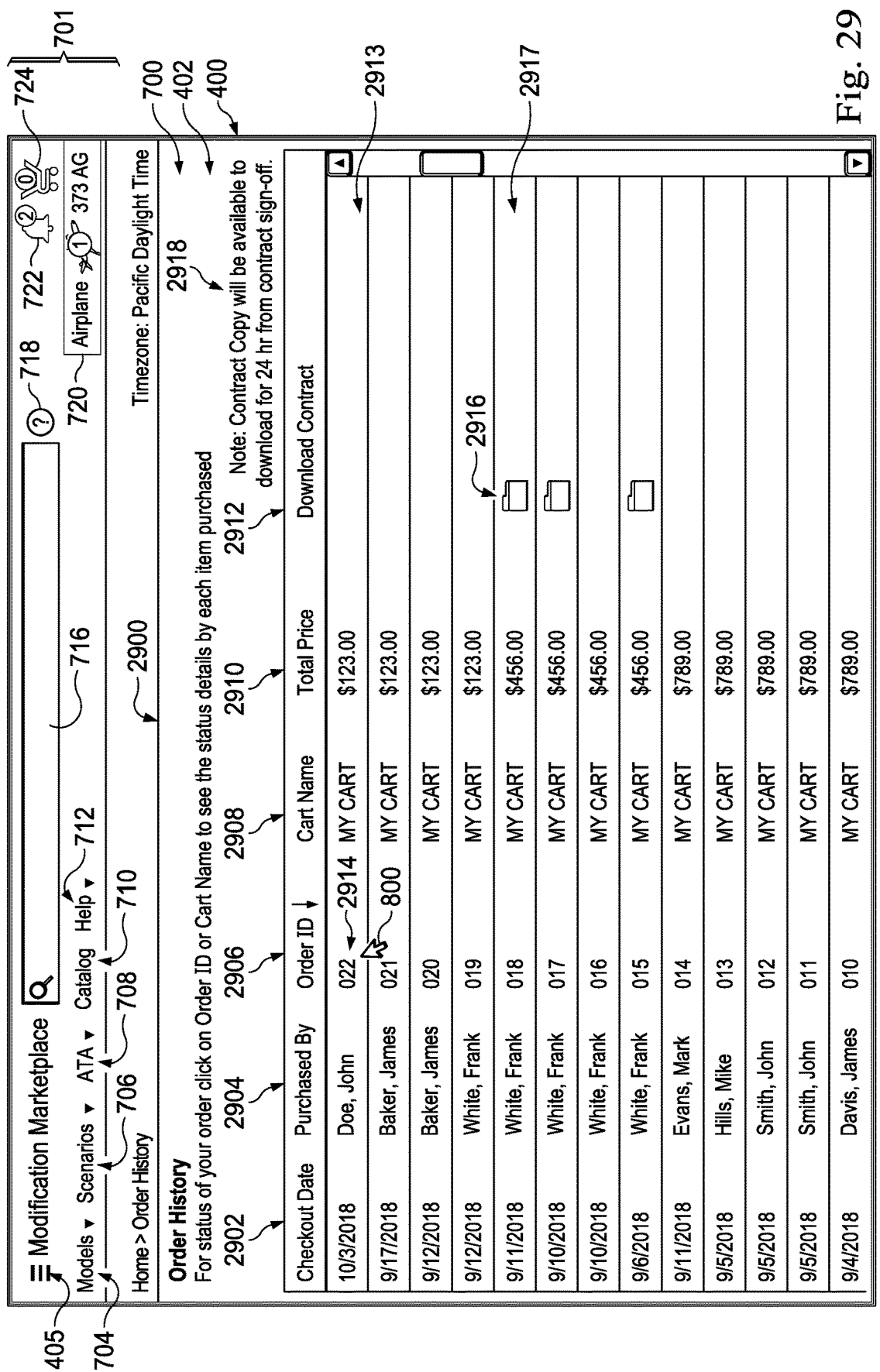
FIG. 29 is another illustration of the graphical user interface presenting the modification marketplace in accordance with an illustrative embodiment.

FIG. 29 is another illustration of graphical user interface 400 presenting modification marketplace 700 in accordance with an illustrative embodiment. In this illustrative example, the user may navigate through modification marketplace 700 and cause order history display 2900 to be presented to the user. Order history display 2900 presents information about the various orders that have been placed by the particular customer over time.

For example, order history display 2900 provides information corresponding to checkout date column 2902, purchased by column 2904, order ID column 2906, cart name column 2908, total price column 2910, and download contract column 2912. Checkout date column 2902 identifies the date on which a "checkout process" was completed for a particular order or a purchase request was made. Purchased by column 2904 identifies the user who made requested the particular order. Order ID column 2906 identifies the particular order. In some cases, order ID column 2906 identifies an identifier associated with the virtual cart or an "instance" of the virtual cart for that particular order. Cart name column 2908 identifies a name associated with the virtual cart used for the particular order. Total price column 2910 identifies the total price for the particular order. Download contract column 2912 indicates whether there is a downloadable contract available for that particular order.

Order 2913 is an example of one of the orders presented within order history display 2900. The user may select order ID 2914 identified in order ID column 2906 for order 2913 to view additional details about order 2913. Icon 2916 associated with order 2917 is an indication that order 2917 is associated with a downloadable contract.

In some cases, order history display 2900 may also include note 2918, which may provide different types of information to the user. In this illustrative example, note 2918 indicates that copies of contracts are generally available for download 24 hours after the contract has been signed.

Figure 30:
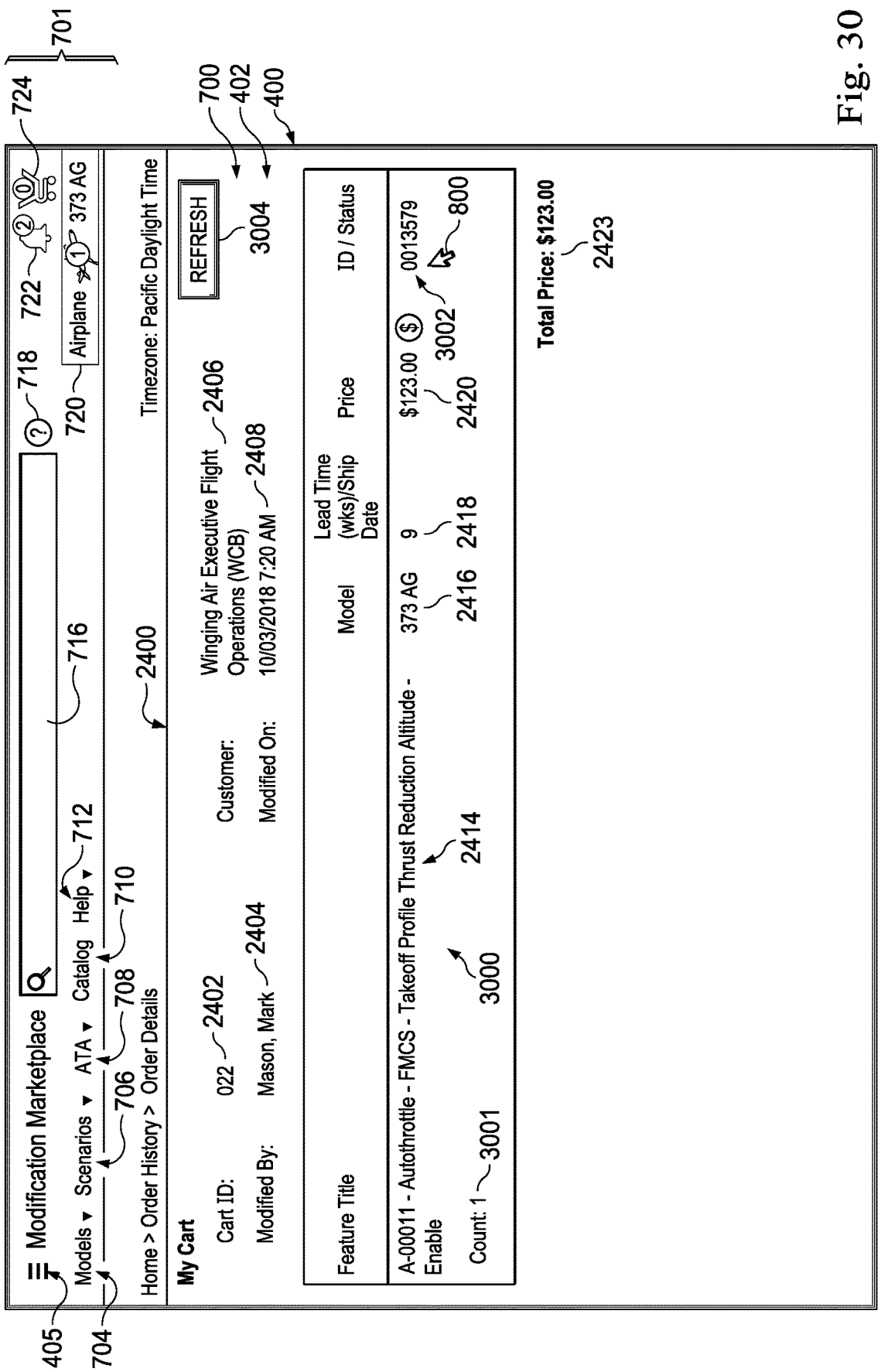
FIG. 30 is another illustration of the graphical user interface presenting the modification marketplace in accordance with an illustrative embodiment.

FIG. 30 is another illustration of graphical user interface 400 presenting modification marketplace 700 in accordance with an illustrative embodiment. Cart display 2400 may be presented to the user in response to the user selecting order ID 2914 in FIG. 29. Cart display 2400 is similar to cart display 2400 in FIG. 24 but presented with respect to a particular instance of the virtual cart. Thus, FIG. 24 depicts an "in-progress" view of cart display 2400, while FIG. 30 depicts a "finalized" view of cart display 2400 after the checkout process has been completed.

The finalized view of cart display 2400 in FIG. 30 generally includes the same information as presented in the in-progress view of cart display 2400 in FIG. 24. But in FIG. 30, cart display 2400 does not include legend 2410. Further, contents section 2412 from FIG. 24 is finalized as features ordered section 3000. Quantity 3001 represents the final quantity of the feature ordered. Identifier 3002 may indicate, for example, whether this particular order was formed as a purchase or a firm proposal. In this illustrative example, the user may select identifier 3002 to view more details about the particular order.

Refresh button 3004 is included in cart display 2400 in FIG. 30. Refresh button 3004 allows the user to "refresh" or otherwise update the information associated with this order. For example, refreshing may cause a change in the identified lead time 2418. In some examples, refreshing updates the information that is presented in response to the user selecting identifier 3002.

Figure 31:
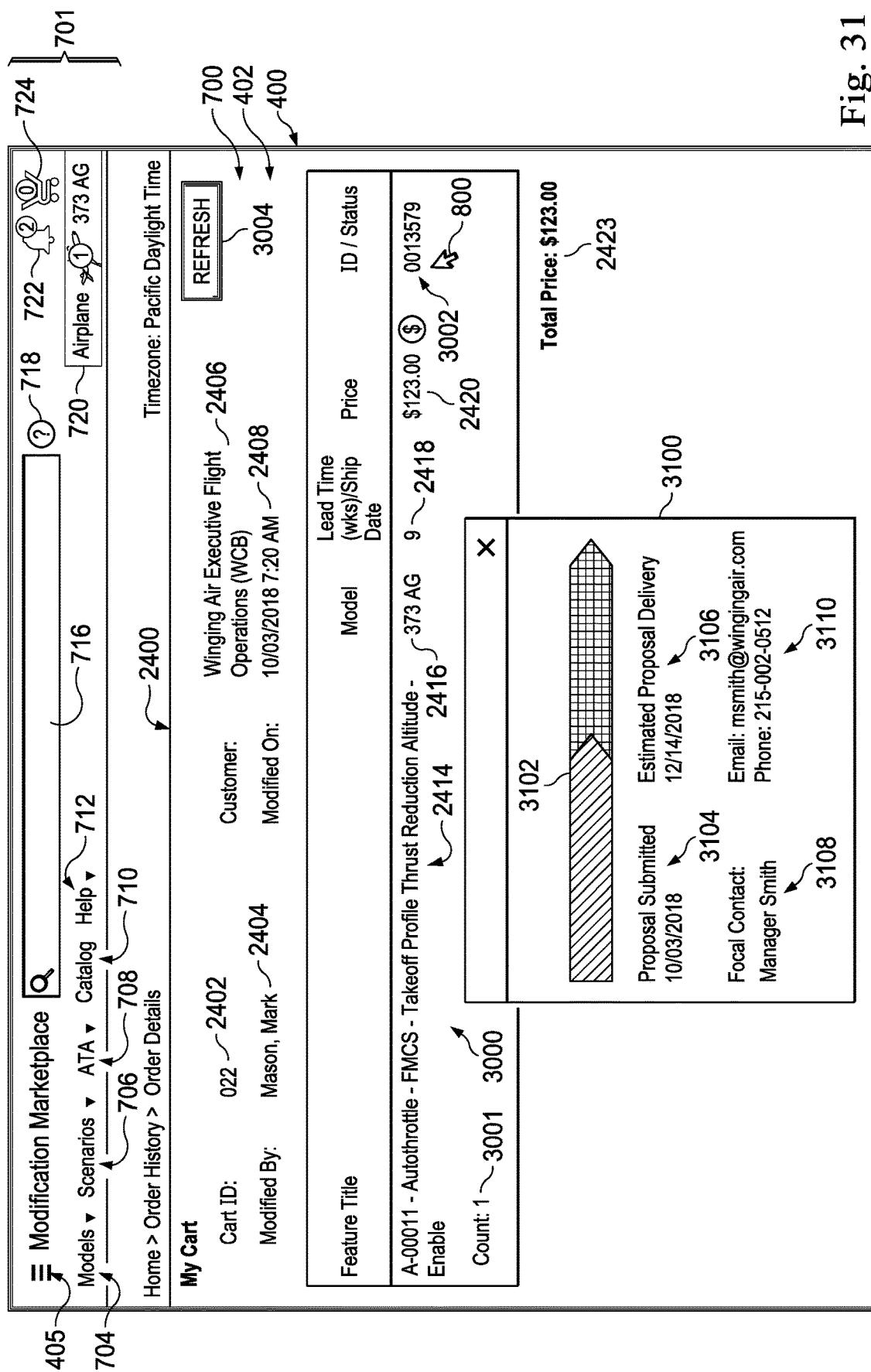
FIG. 31 is another illustration of the graphical user interface presenting the modification marketplace in accordance with an illustrative embodiment.

FIG. 31 is another illustration of graphical user interface 400 presenting modification marketplace 700 in accordance with an illustrative embodiment. In this illustrative example, status box 3100 is presented to the user in response to the user having selected identifier 3002 from FIG. 30. Status box 3100 gives the user an indication of the current status of the particular order.

For example, status box 3100 includes progress bar 3102 which provides a visual indication of the time remaining before a purchase order or a proposal is delivered. Submitted date 3104 identifies when the purchase order or request for proposal was submitted. In this illustrative example, submitted date 3104 identifies a date for when a request for a firm proposal was made. Estimated delivery date 3106 identifies an estimated date on which the purchased feature or proposal will be delivered. This delivery may include a physical delivery, a virtual delivery, or both. For example, a purchased feature may be delivered physically or virtually (e.g., via email, downloadable content, etc.). A proposal may be delivered virtually.

Focal contact name 3108 identifies a name of a focal point of contact. For example, focal contact name 3108 may identify the name of an employee or manager overseeing the fulfillment of the particular order. Focal contact information 3110 identifies contact information to help the user contact the focal point of contact. In this illustrative example, focal contact information 3110 includes an email address and a phone number.

Figure 32:
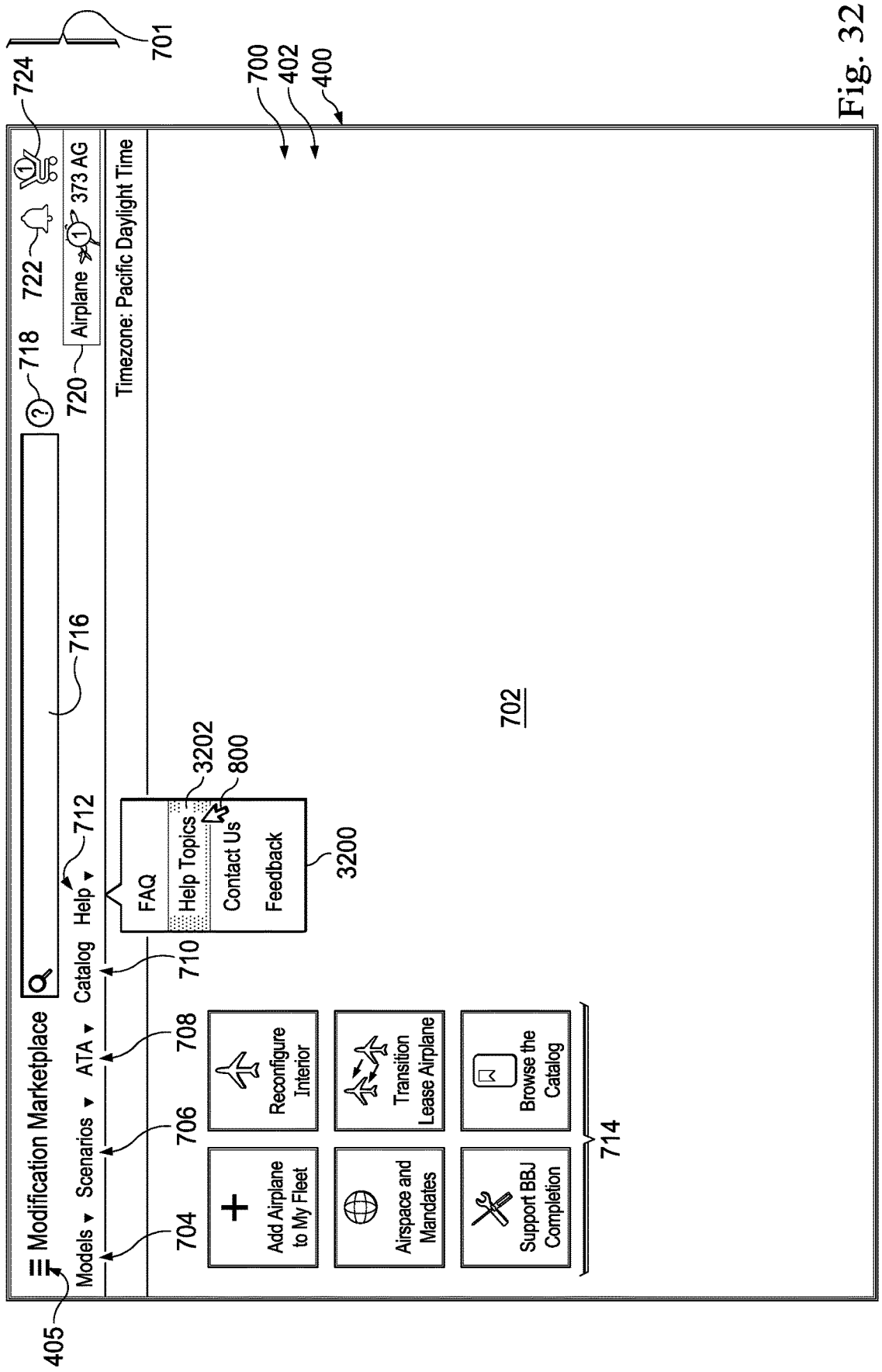
FIG. 32 is another illustration of the graphical user interface presenting the modification marketplace in accordance with an illustrative embodiment.

FIG. 32 is another illustration of graphical user interface 400 presenting modification marketplace 700 in accordance with an illustrative embodiment. In this illustrative example, help menu 3200 is displayed to the user in response to the user having selecting help menu control 712. Help menu 3200 allows the user to select from various help or support categories. In this illustrative example, the user may select help topics option 3202 to view training information to help the user navigate and use modification marketplace 700.

Figure 33:
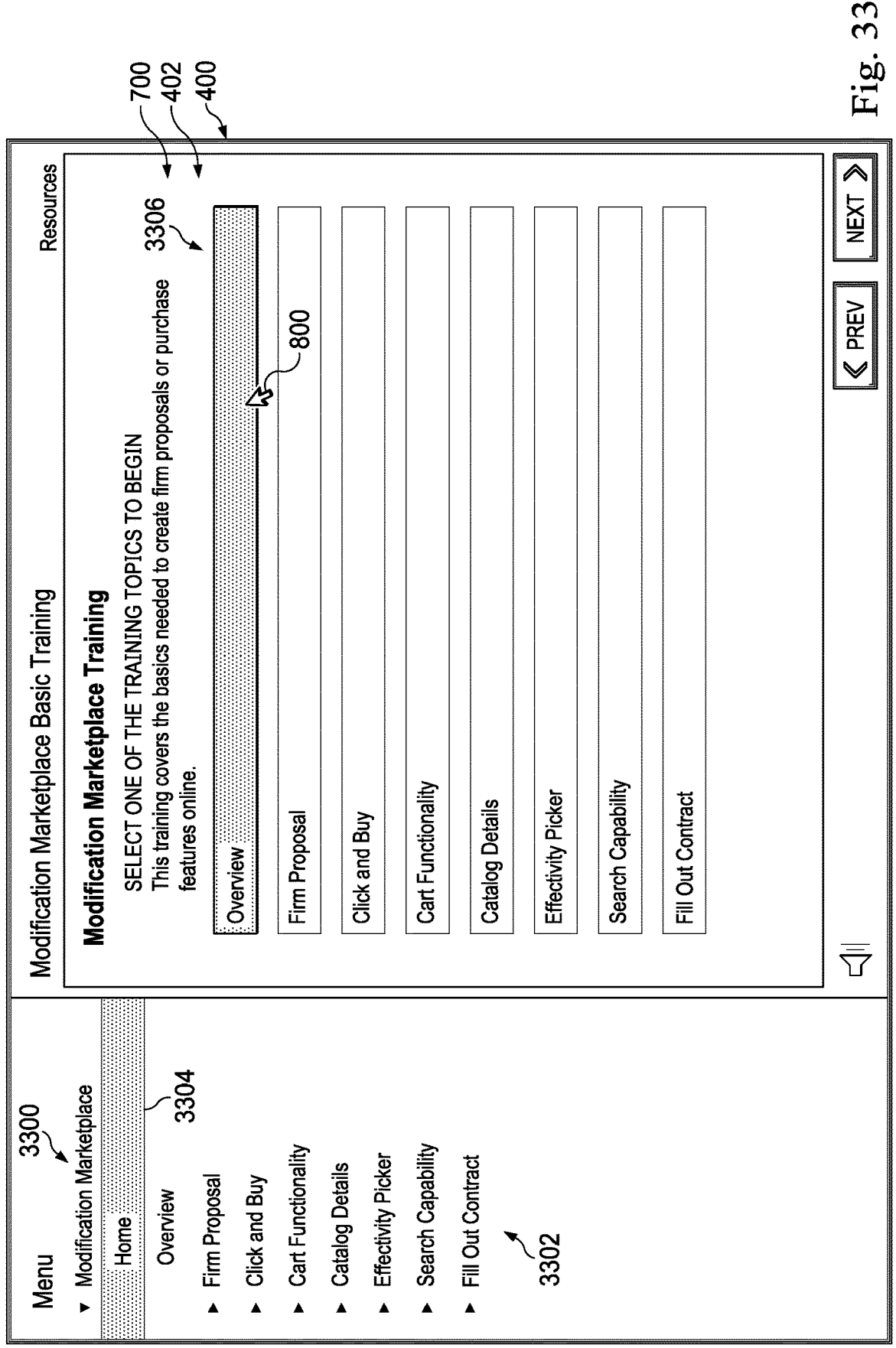
FIG. 33 is another illustration of the graphical user interface presenting the modification marketplace in accordance with an illustrative embodiment.

FIG. 33 is another illustration of graphical user interface 400 presenting modification marketplace 700 in accordance with an illustrative embodiment. In this illustrative example, help topics menu 3300 is displayed in response to the user having selected help topics option 3202 in FIG. 32. Help topics menu 3300 identifies various topics 3302 for which the user can view training information. One or more of these topics 3302 may include a submenu of topics. In this illustrative example, in response to the user selecting topic 3304, training modules menu 3306 is presented to the user. In this illustrative example, each of the training modules identified in training modules menu 3306 is selectable by the user. By selecting a particular training module, the user may be able to at least one of read training information, view one or more training videos, create a mock purchase order or firm proposal, or train in some other manner.

Figure 34:
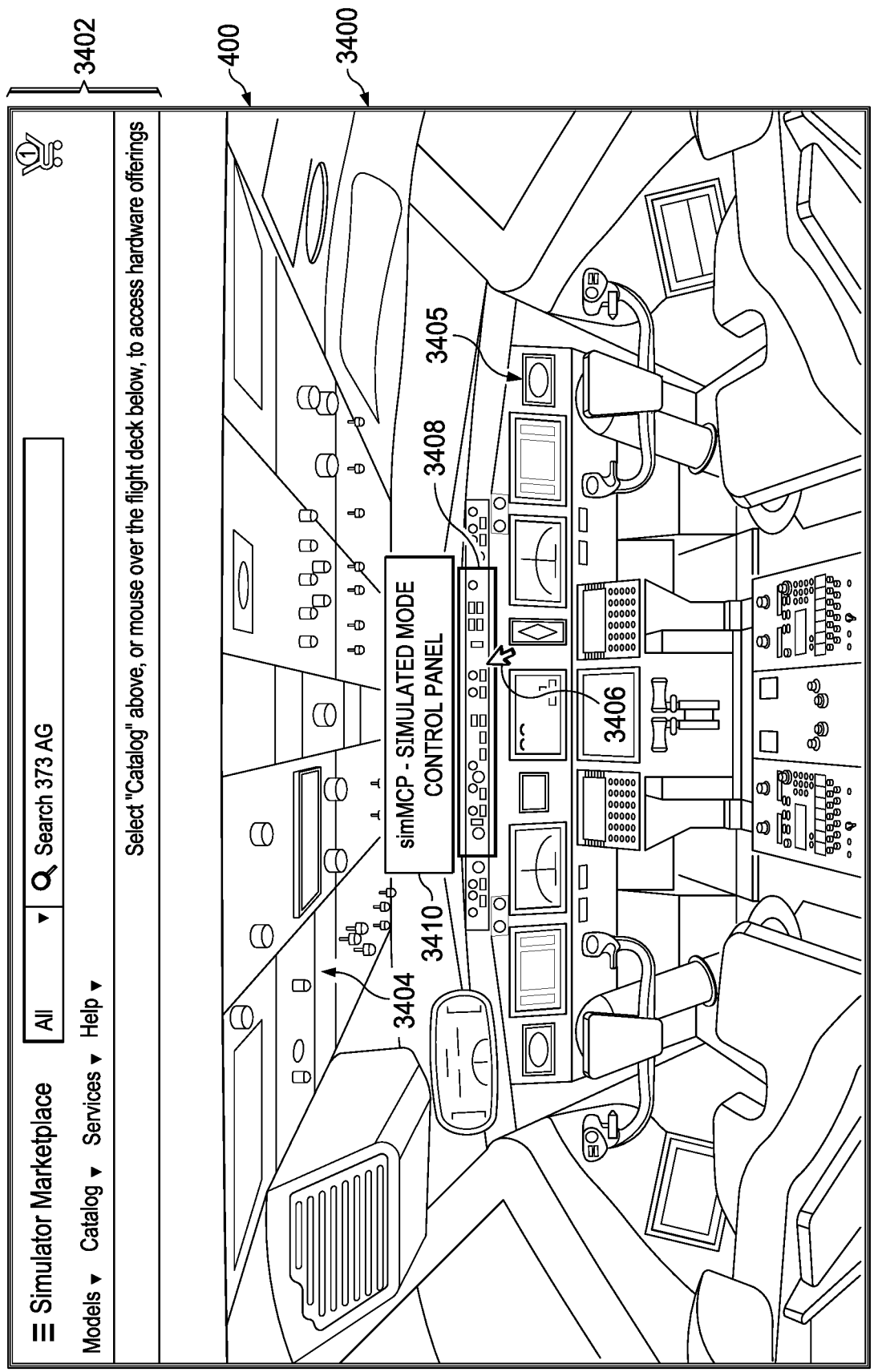
FIG. 34 is another illustration of the graphical user interface presenting the modification marketplace in accordance with an illustrative embodiment.

FIG. 34 is an illustration of graphical user interface 400 presenting a simulation marketplace is depicted in accordance with an illustrative embodiment. Simulation marketplace 3400 is an example of one implementation for simulation marketplace 105 in FIG. 1. As depicted, simulation marketplace 3400 includes navigation section 3402, which may be similar to navigation section 701 of modification marketplace 700 described above.

Simulation marketplace 3400 presents interactive layout 3404 to a user. Interactive layout 3404 represents the layout of a flight simulator for a model aircraft, which may be also referred to as an aircraft simulator. In this illustrative example, interactive layout 3404 represents a simulated flight deck. Interactive layout 3404 includes plurality of interactive components 3405, each of which is selectable. Each of plurality of interactive components 3405 represents a feature included in the flight simulator. In one illustrative example, cursor 3406 may be hovered over interactive component 3408 to display information box 3410. In this illustrative example, information box 3410 presents an identification (e.g., name) of the feature represented by interactive component 3408.

Figure 35:
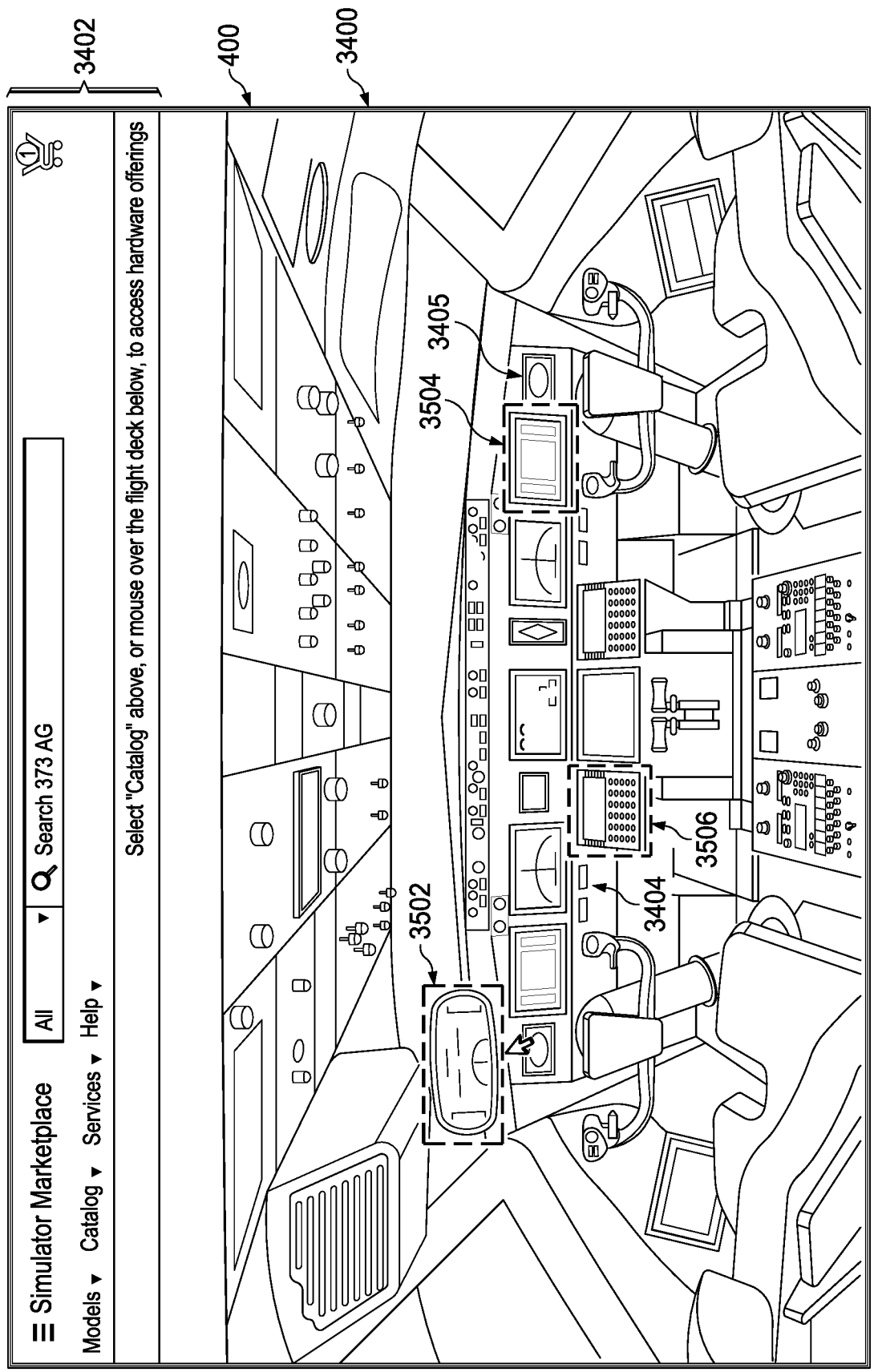
FIG. 35 is an illustration of the graphical user interface presenting a simulation marketplace in accordance with an illustrative embodiment.

FIG. 35 is another illustration of graphical user interface 400 presenting simulation marketplace 3400 is depicted in accordance with an illustrative embodiment. In this illustrative example, interactive component 3502, interactive component 3504, and interactive component 3506 are depicted. Each of these interactive components is selectable to display customized information regarding the feature represented by each interactive component to the user. Interactive component 3502 represents a head up display of the flight simulator. Interactive component 3504 represents a primary flight display unit the flight simulator. Interactive component 3506 represents a multifunctional control and display unit of the flight simulator.

Figure 36:
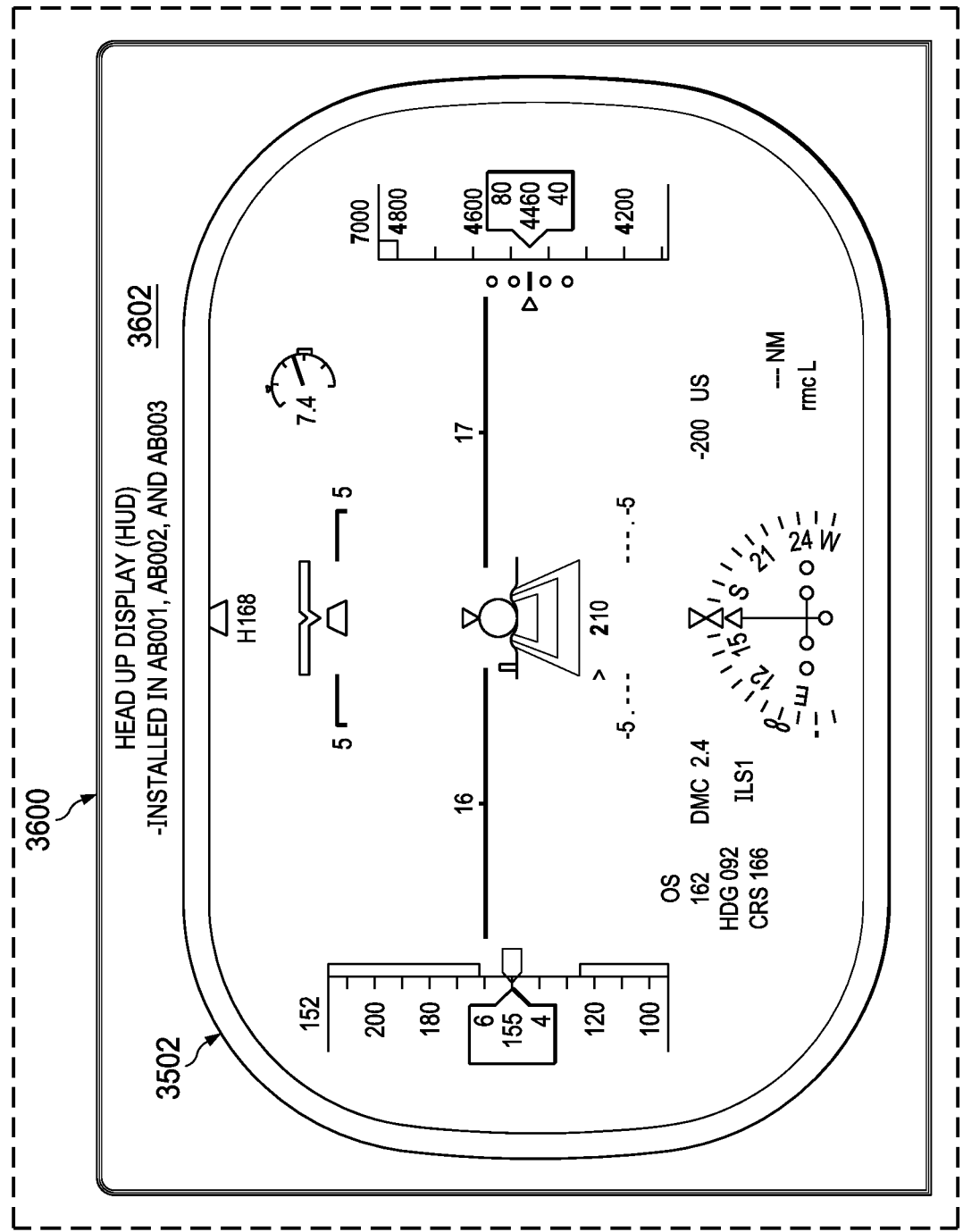
FIG. 36 is an illustration of the graphical user interface presenting a callout window for a simulation marketplace in accordance with an illustrative embodiment.

FIG. 36 is another illustration of a callout window for display within simulation marketplace 3400 from FIGS. 34-35 in accordance with an illustrative embodiment. Callout window 3600 is an example of a window that may be displayed in response to a selection of interactive component 3502 in FIG. 35. In this illustrative example, callout window 3600 includes image 3602 and customized information 3604. Image 3602 presents an enlarged view of the head up display represented by interactive component 3502 in FIG. 35. Customized information 3604 presents information customized for user with respect to the feature. For example, customized information 3604 includes an install status for the feature, which indicates each flight simulator (or model of aircraft) in which the feature was previously installed.

Figure 37:
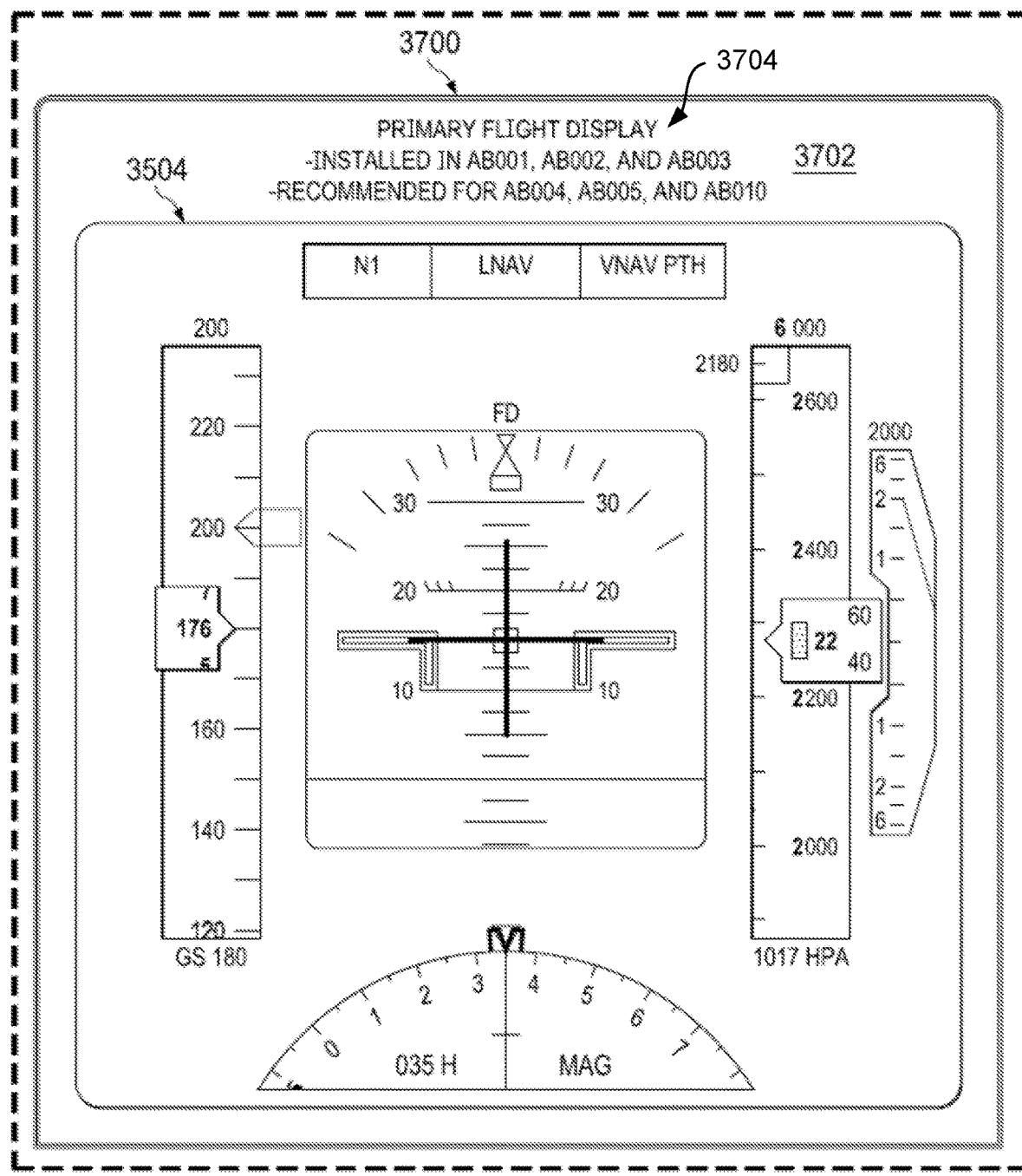

FIG. 37 is another illustration of a callout window displayed for display within simulation marketplace 3400 from FIGS. 34-35 in accordance with an illustrative embodiment. Callout window 3700 is an example of a window that may be displayed in response to a selection of interactive component 3504 in FIG. 35. In this illustrative example, callout window 3700 includes image 3702 and customized information 3704. Image 3702 presents an enlarged view of the primary flight display unit represented by interactive component 3504 in FIG. 35. Customized information 3704 presents information customized for user with respect to the feature. For example, customized information 3704 includes an install status for the feature, which indicates each flight simulator (or model of aircraft) in which the feature was previously installed.

Figure 38:
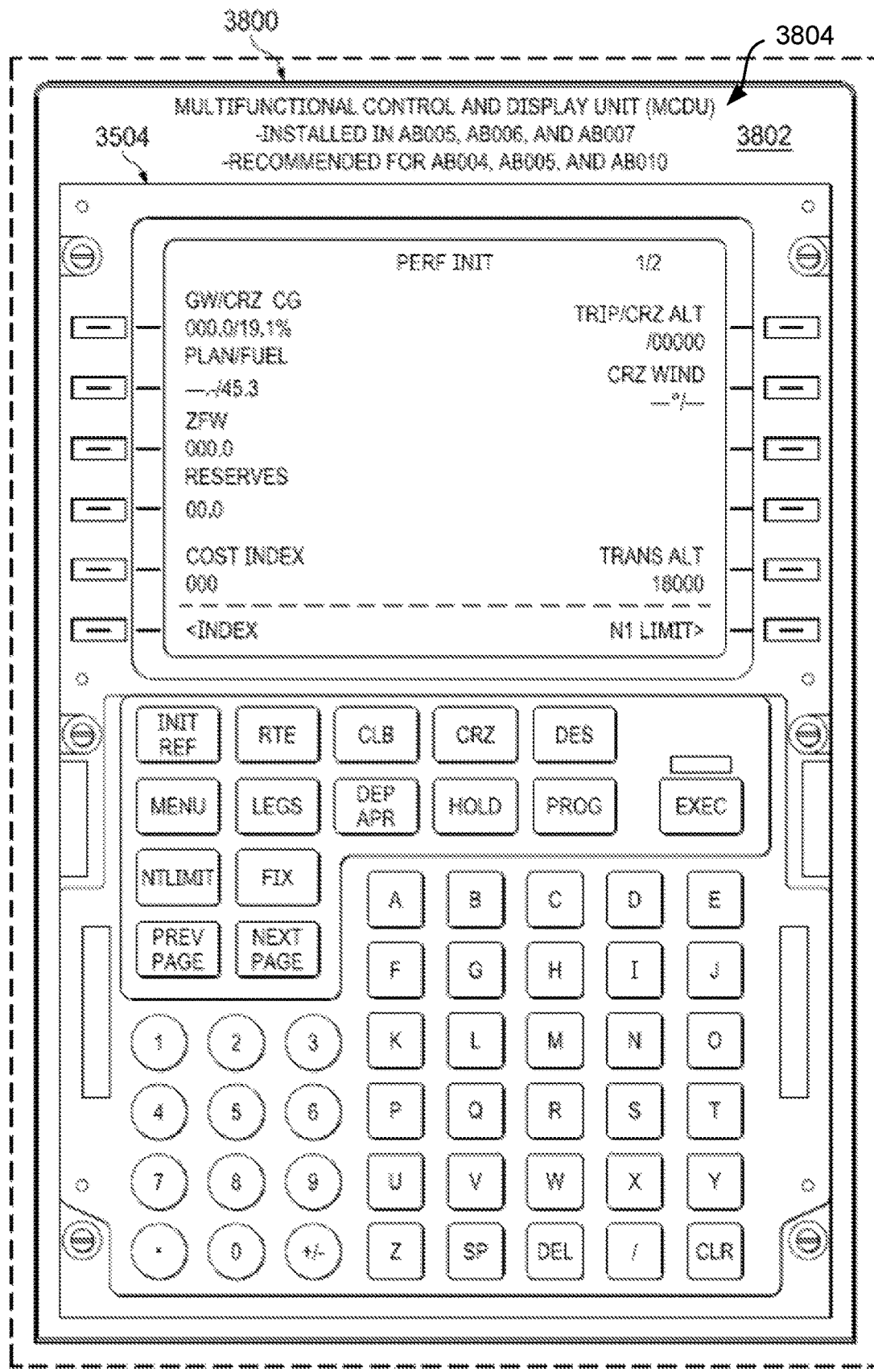
FIG. 38 is an illustration of the graphical user interface presenting a callout window for a simulation marketplace in accordance with an illustrative embodiment.

FIG. 38 is another illustration of a callout window for display within simulation marketplace 3400 from FIGS. 34-35 in accordance with an illustrative embodiment. Callout window 3800 is an example of a window that may be displayed in response to a selection of interactive component 3506 in FIG. 35. In this illustrative example, callout window 3800 includes image 3802 and customized information 3804. Image 3802 presents an enlarged view of the multifunctional control and display unit represented by interactive component 3506 in FIG. 35. Customized information 3804 presents information customized for user with respect to the feature. For example, customized information 3804 includes an install status for the feature, which indicates each flight simulator (or model of aircraft) in which the feature was previously installed.

The illustrations of graphical user interface 400 in FIGS. 4-38 are not meant to imply physical or architectural limitations to the manner in which an illustrative embodiment may be implemented. Other components in addition to or in place of the ones illustrated may be used. Some components may be optional. The different components shown in FIGS. 4-38 may be illustrative examples of how components shown in block form in FIGS. 1-3 can be implemented as physical structures. Additionally, some of the components in FIGS. 4-38 may be combined with components in FIGS. 1-3, used with components in FIG. 1-3, or a combination of the two.

Figure 39:
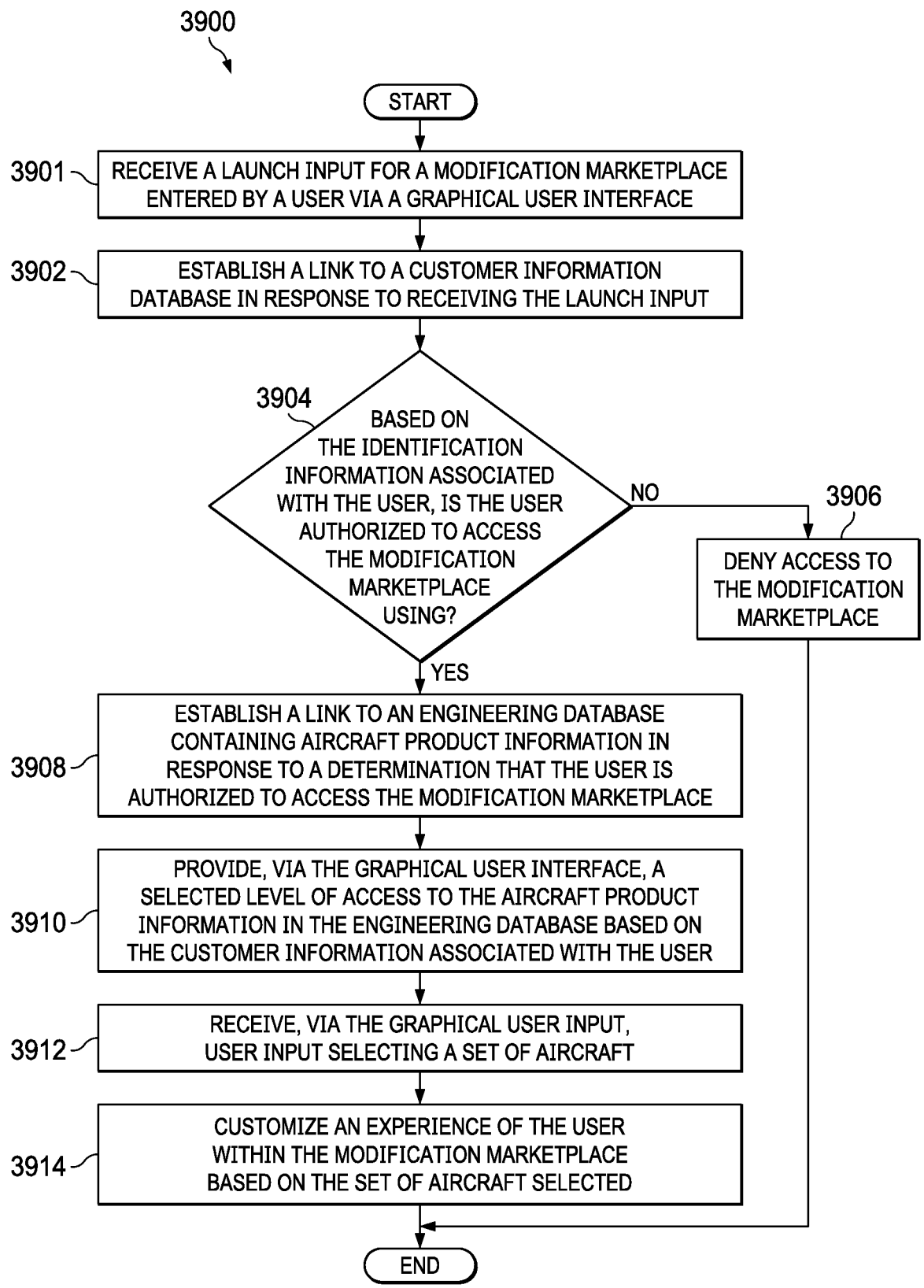
FIG. 39 is an illustration of the graphical user interface presenting a callout window for a simulation marketplace in accordance with an illustrative embodiment.

FIG. 39 is a flowchart of a process for managing modifications to aircraft in accordance with an example embodiment. Process 3900 is an example of one manner in which modifications to aircraft, such as, but not limited to retrofit features, may be managed. Process 3900 may be implemented within, for example, virtual aircraft marketplace 100 in FIG. 1. In particular, process 3900 may be implemented using modification marketplace 102 described in FIGS. 1 and 2.

Process 3900 may begin by receiving a launch input for a modification marketplace entered by a user via a graphical user interface (operation 3901). A link to a customer information database is then established in response to receiving the launch input (operation 3902). The customer information database includes identification information and customer information associated with the user.

A determination is then made as to whether the user is authorized to access the modification marketplace using the identification information associated with the user (operation 3904). With reference to operation 3904, if the user is not authorized, access is denied (operation 3906), with process 3900 terminating thereafter. If the user is authorized, however, a link to an engineering database containing aircraft product information is established (operation 3908). In some illustrative examples, operation 3908 includes establishing a link with any number of data systems to obtain aircraft product information.

For example, the modification marketplace may establish a link with one or more of the data systems in plurality of data systems 112 in FIGS. 1 and 2 in order to access aircraft product information. This aircraft product information may include information about the various aircraft models, information about the different stock configurations for different aircraft models, information about the various retrofit features available for each aircraft model and aircraft configuration, information about governmental mandates and regulations regarding aircraft features, other types of information, or a combination thereof.

Thereafter, a selected level of access to the aircraft product information in the engineering database is provided to the user via the graphical user interface based on the customer information associated with the user (operation 3910). In one or more illustrative examples, the selected level of access is determined as part of operation 3910. In other examples, the selected level of access is determined at some point after operation the determination in operation 3906 is made but before operation 3910. In one or more examples, the selected level of access to be provided to the user is determined using at least one of a purchase authorization filter, a product access filter, or a business scenario filter. For example, the purchase authorization filter limits features available to the user based on an owner status of a customer with which the user is associated. The product access filter limits features available to the user based on a customer type of the customer. Further, the business scenario filter is used to determine what types of business scenarios are applicable to the customer.

User input selecting a set of aircraft is received via the graphical user interface (operation 3912). An experience of the user within the modification marketplace is customized based on the set of aircraft selected (operation 3914), with the process terminating thereafter.

Figure 40:
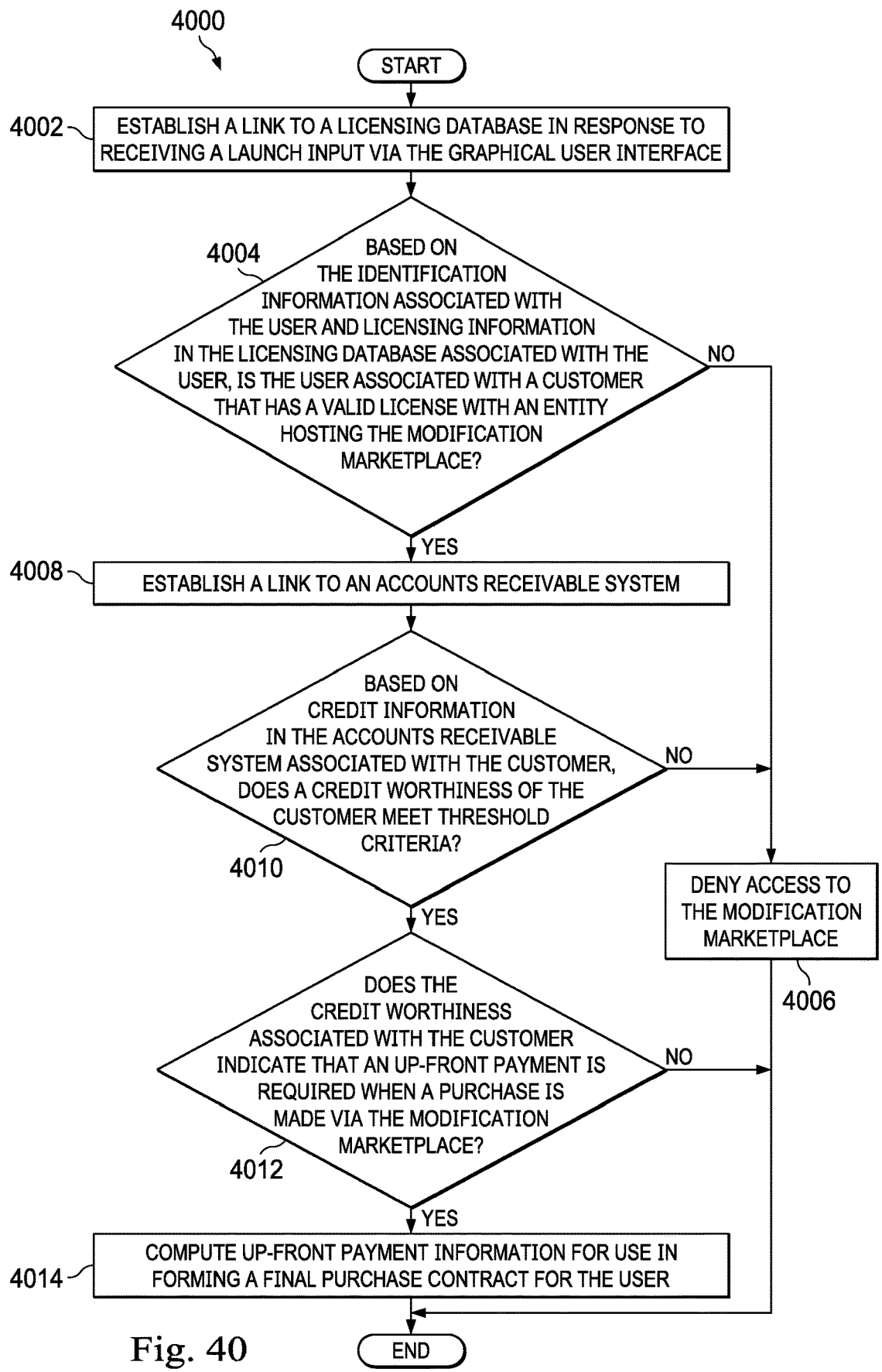
FIG. 40 is a flowchart of a process for managing modifications to an aircraft in accordance with an illustrative embodiment.

FIG. 40 is a flowchart of a process for determining whether a user is authorized to access a modification marketplace in accordance with an illustrative embodiment. Process 4000 is an example of one manner in which a determination is made about whether a user is authorized to access modification marketplace 102 described in FIGS. 1 and 2. Process 4000 may be implemented using, for example, access manager 200 of modification marketplace 102. Further, process 4000 may be an example of one manner in which operation 3904 in FIG. 39 may be implemented.

Process 4000 begins by establishing a link to a licensing database in response to receiving a launch input via the graphical user interface (operation 4002). A determination is made as to whether the user is associated with a customer that has a valid license with an entity hosting the modification marketplace based on the identification information associated with the user and licensing information in the licensing database associated with the user (operation 4004). In operation 4004, the identification information may be obtained from a customer information database, such as customer information database 114 described in FIGS. 1 and 2. For example, the identification information may include the same identification information described above in FIG. 39.

If the customer does not have a valid license with the entity, access to the modification marketplace is denied (operation 4006). Otherwise, if the customer does have a valid license, a link to an accounts receivable system is established (operation 4008). A determination is then made as to whether a credit worthiness of the customer meets threshold criteria based on credit information in the accounts receivable system associated with the customer (operation 4010).

If the credit worthiness of the customer does not meet the threshold criteria, process 4000 proceeds to operation 4006 as described above. Otherwise, if the credit worthiness of the customer does meet the threshold criteria, optionally, a determination is made as to whether the credit worthiness associated with the customer indicates that an up-front payment is required when a purchase is made via the modification marketplace (operation 4012). For example, in some cases, a customer may have a sufficiently high credit rating such that the customer meets the threshold criteria for gaining access to the modification marketplace. However, the credit rating may not be high enough to meet a secondary threshold. In these cases, the customer may be required to provide an up-front payment (e.g., a down payment) for any purchase made via modification marketplace.

If an up-front payment is required, up-front payment information is computed for use in forming a final purchase contract for the user (operation 4014). This up-front payment information may include, for example, a percentage of the total price, a standard amount, or a list of amounts with each being applicable for a different range of purchase price.

Figure 41:
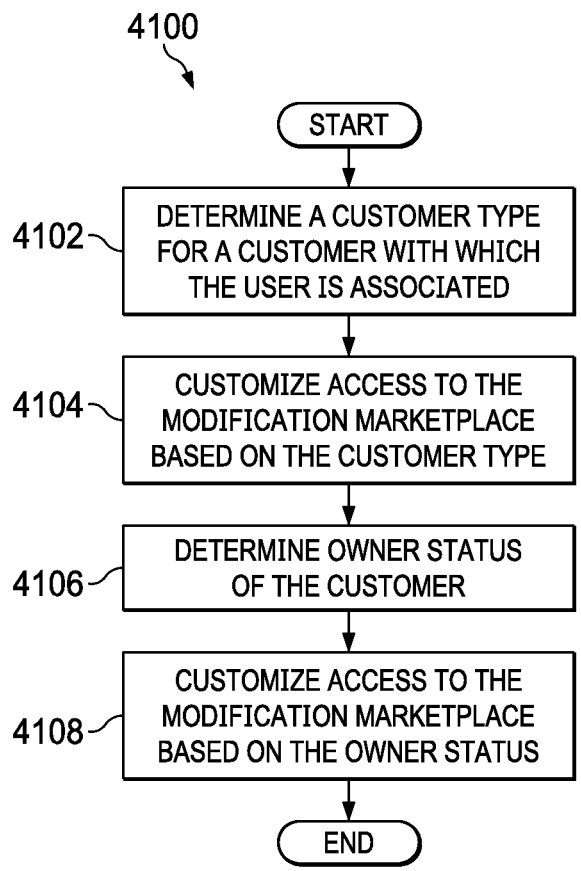
FIG. 41 is a flowchart of a process for managing modifications to an aircraft in accordance with an illustrative embodiment.

FIG. 41 is a flowchart of a process for providing a selected level of access to aircraft product information in accordance with an illustrative embodiment. Process 4100 is an example of one manner in which a selected level of access to aircraft product information is FIGS. 1 and 2. Process 4100 may be implemented using, for example, access manager 200 of modification marketplace 102. Further, process 4100 may be an example of one manner in which operation 3910 in FIG. 39 may be implemented.

Process 4100 begins by determining a customer type for a customer with which the user is associated (operation 4102). Next, access to the modification marketplace is customized based on the customer type (operation 4104). The customer type may be, for example, an aircraft purchaser, aircraft owner, aircraft lessor, aircraft operator, an airline, an air freight company, an aircraft charter company, an aircraft leasing company, a third-party aircraft modification center, or some other type of customer. In one or more examples, in operation 4104, the user's level of access to the modification marketplace may be limited based on the customer type so that only product information and business scenarios relevant for the customer type are accessible or presented to the user in the modification marketplace. This type of tailoring helps streamline the process for the user and makes the experience of modification marketplace more efficient.

The owner status of the customer is determined (operation 4106). Access to the modification marketplace is customized based on the owner status (operation 4108). In operation 4108, the owner status may be selected from one of owner or non-owner. In one or more examples, in operation 4108, the user's level of access to the modification marketplace may be limited based on the owner status such that the user is only allowed to make purchases if the user is associated with a customer who is an owner. In other words, the user is only allowed to make purchases if the user is or represents an owner. This type of tailoring further helps streamline the process for the user and makes the experience of modification marketplace more efficient.

Figure 42:
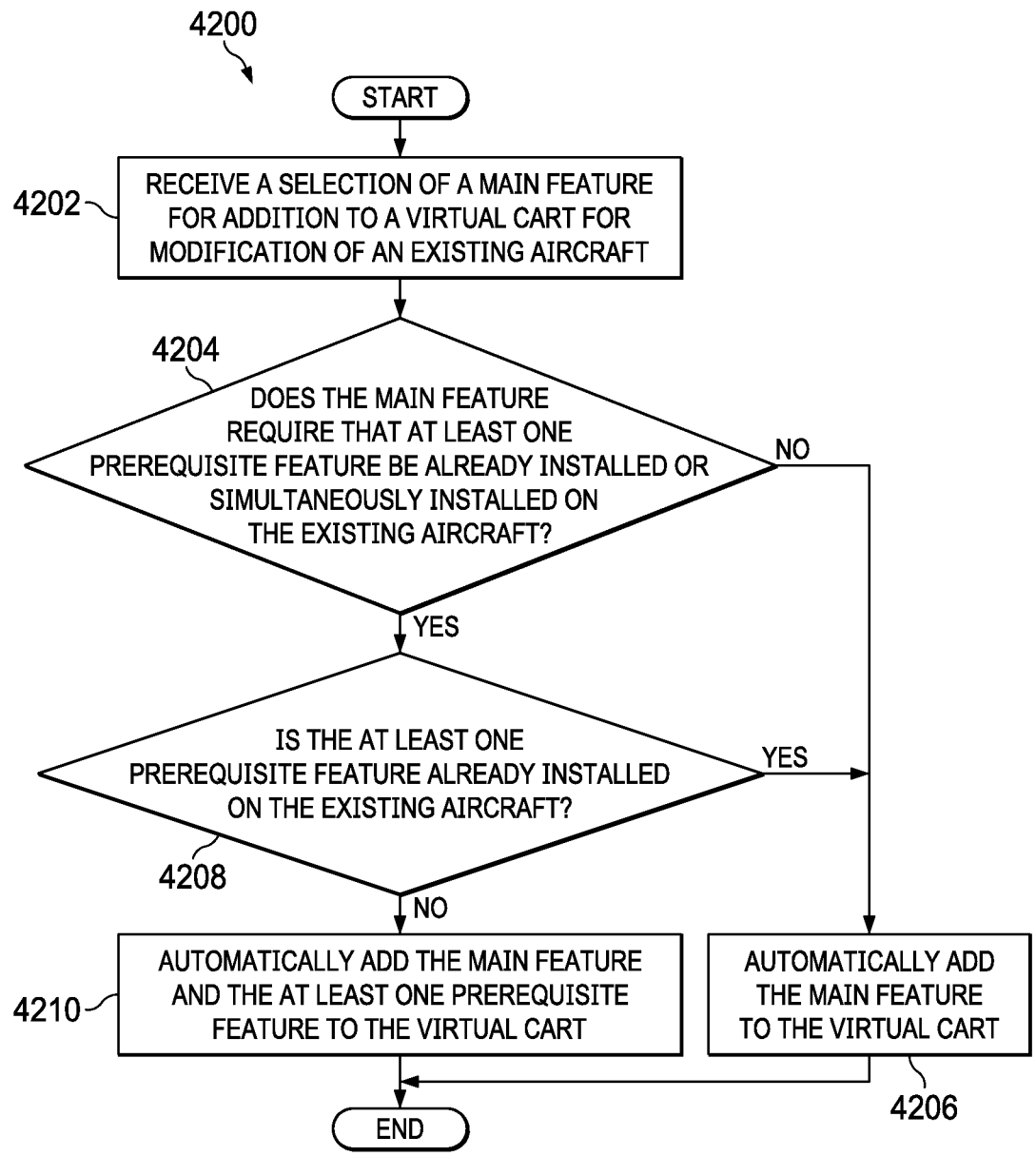
FIG. 42 is a flowchart of a process for managing modifications to an aircraft in accordance with an illustrative embodiment.

FIG. 42 is a flowchart of a process for modifications to an aircraft in accordance with an illustrative embodiment. Process 4200 is an example of one manner in which a modification marketplace manages the addition of retrofit features to existing aircraft. Process 4200 may be implemented within, for example, virtual aircraft marketplace 100 in FIG. 1. In particular, process 4200 may be implemented using modification marketplace 102 described in FIGS. 1 and 2.

Process 4200 begins by receiving a selection of a main feature for addition to a virtual cart for modification of an existing aircraft (operation 4202). A determination is made as to whether the main feature requires that at least one prerequisite feature be already installed or simultaneously installed on the existing aircraft (operation 4204). This determination may be made using information from, for example, an engineering database.

If no prerequisite features are required, the main feature is automatically added to the virtual cart (operation 4206) and the process terminates. However, if at least one prerequisite feature is required, a determination is made as to whether the at least one prerequisite feature is already installed on the existing aircraft (operation 4208). This determination may be made based on information obtained from at least one of an engineering database, a project management database, an aircraft tracking configuration database, or some other type of data system. If the prerequisite feature is already installed, the process proceeds to operation 4206 as described above. Otherwise, the main feature and the at least one prerequisite feature are automatically added to the virtual cart (operation 4210), with the process terminating thereafter.

Figure 43:
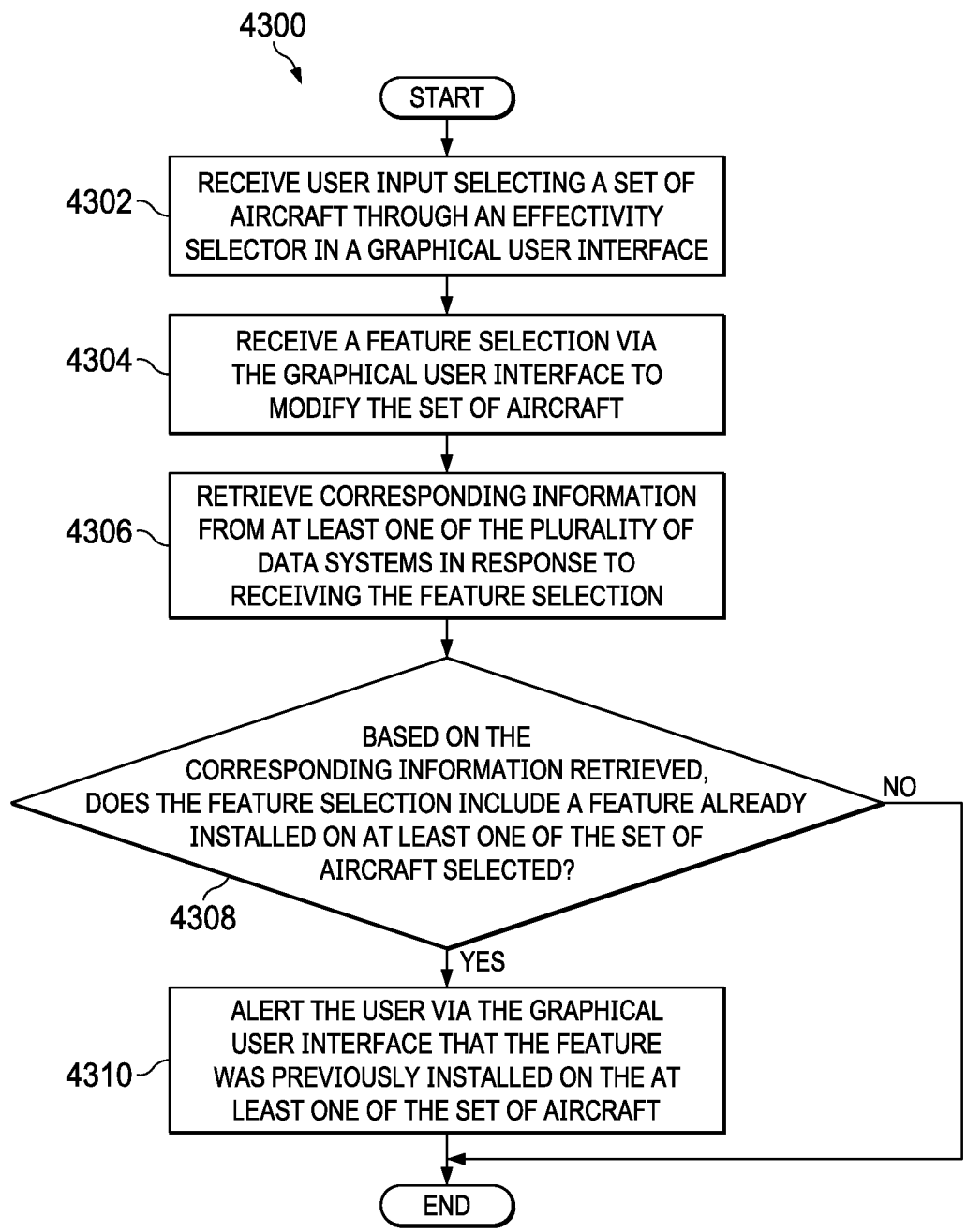
FIG. 43 is a flowchart of a process for managing modifications to an aircraft in accordance with an illustrative embodiment.

FIG. 43 is a flowchart of a process for managing modifications to an aircraft in accordance with an illustrative embodiment. Process 4300 is an example of one manner in which the addition of retrofit features to existing aircraft may be managed. Process 4300 may be implemented within, for example, virtual aircraft marketplace 100 in FIG. 1. In particular, process 4300 may be implemented using modification marketplace 102 described in FIGS. 1 and 2.

Process 4300 may begin by receiving user input selecting a set of aircraft through an effectivity selector in a graphical user interface (operation 4302). A feature selection is received via the graphical user interface to modify the set of aircraft (operation 4304). Corresponding information is retrieved from at least one of the plurality of data systems in response to receiving the feature selection (operation 4306). The corresponding information may be retrieved from at least one of a customer information database, an engineering database, an aircraft tracking configuration database, a contract database, or a project management database.

A determination is made as to whether the feature selection includes a feature already installed on at least one of the set of aircraft selected based on the corresponding information retrieved (operation 4308). If the feature is not already installed on the at least one of the set of aircraft, the process terminates. Otherwise, the user is alerted via the graphical user interface that the feature was previously installed on the at least one of the set of aircraft (operation 4310).

Figure 44:
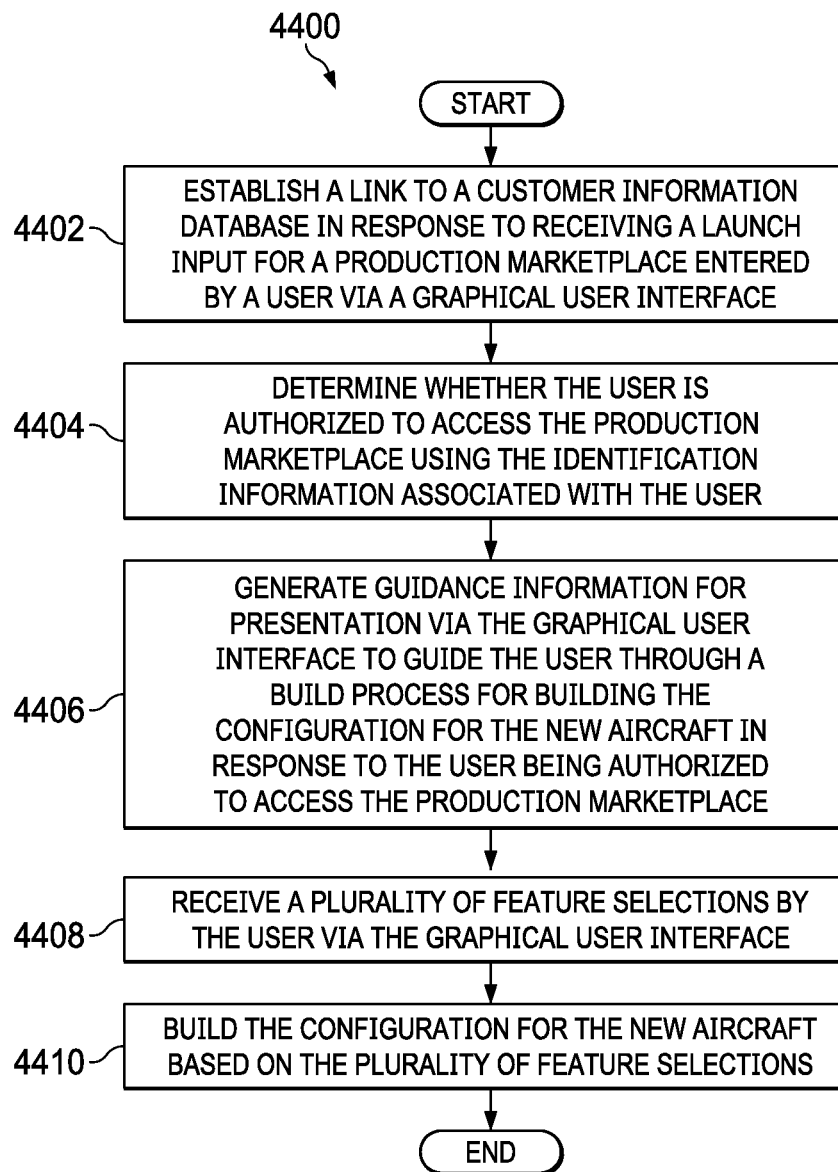
FIG. 44 is a flowchart of a process for managing modifications to an aircraft in accordance with an illustrative embodiment.

FIG. 44 is a flowchart of a process for managing the building of a configuration for a new aircraft in accordance with an illustrative embodiment. Process 4400 is an example of one manner in which a configuration for a new aircraft may be built within a production marketplace. Process 4400 may be implemented within, for example, virtual aircraft marketplace 100 in FIG. 1. In particular, process 4400 may be implemented using production marketplace 104 described in FIGS. 1 and 3.

Process 4400 begins by establishing a link to a customer information database in response to receiving a launch input for a production marketplace entered by a user via a graphical user interface (operation 4402). The user is associated with a customer. The user may be associated with a customer by being the customer or by representing the customer. In some cases, the user is an employee of the customer. In other examples, the user is a sales agent or account manager representing the entity hosting production marketplace 104 and acting on behalf of the customer. The customer information database includes identification information associated with the user.

A determination is made as to whether the user is authorized to access the production marketplace using the identification information associated with the user (operation 4404). Guidance information is generated for presentation via the graphical user interface to guide the user through a build process for building the configuration for the new aircraft in response to the user being authorized to access the production marketplace (operation 4406). The guidance information is customized for the customer. A plurality of feature selections by the user is received via the graphical user interface (operation 4408). The configuration for the new aircraft is built based on the plurality of feature selections (operation 4410), with the process terminating thereafter.

Figure 45:
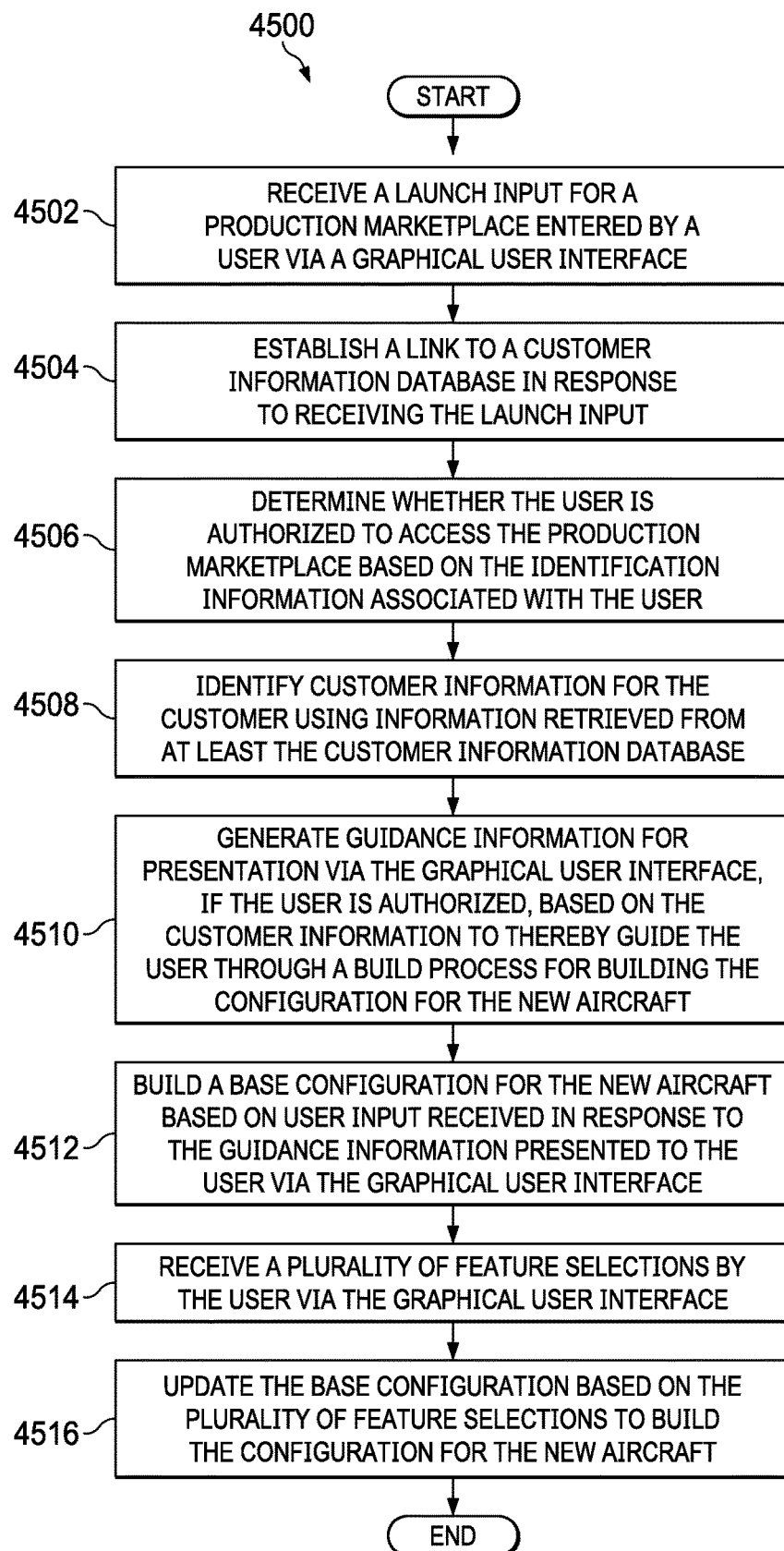
FIG. 45 is a flowchart of a process for managing a build of a configuration for a new aircraft in accordance with an illustrative embodiment.

FIG. 45 is a flowchart of a process for managing the building of a configuration for a new aircraft in accordance with an illustrative embodiment. Process 4500 is an example of one manner in which a configuration for a new aircraft may be built within a production marketplace. Process 4500 may be implemented within, for example, virtual aircraft marketplace 100 in FIG. 1. In particular, process 4500 may be implemented using production marketplace 104 described in FIGS. 1 and 3.

Process 4500 may begin by receiving a launch input for a production marketplace entered by a user via a graphical user interface (operation 4502). A link to a customer information database is established in response to receiving the launch input (operation 4504). The user is associated with a customer and the customer information database includes identification information associated with the user.

A determination is made as to whether the user is authorized to access the production marketplace based on the identification information associated with the user (operation 4506). Customer information is identified for the customer using information retrieved from at least the customer information database (operation 4508). The customer information includes at least one of a customer type or an owner status for the customer;

Thereafter, guidance information is generated for presentation via the graphical user interface, if the user is authorized, based on the customer information to thereby guide the user through a build process for building the configuration for the new aircraft (operation 4510). In this manner, the guidance information is customized for the customer. A base configuration is built for the new aircraft based on user input received in response to the guidance information presented to the user via the graphical user interface (operation 4512). The base configuration comprises a partially completed configuration that provides a starting point for building the configuration for the new aircraft. In other examples, the base configuration is a completed configuration that may be changed or revised to build the configuration for the new aircraft.

A plurality of feature selections is received by the user via the graphical user interface (operation 4514). The base configuration is updated based on the plurality of feature selections to build the configuration for the new aircraft (operation 4516), with the process terminating thereafter.

Figure 46:
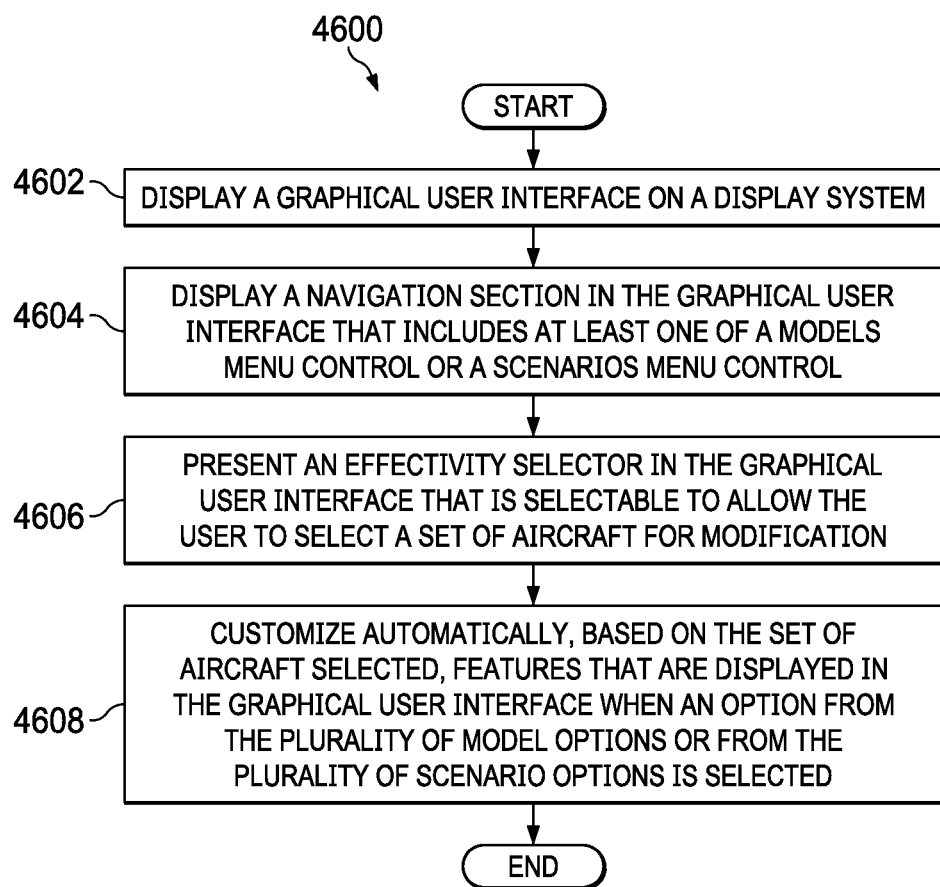
FIG. 46 is a flowchart of a process for managing a build of a configuration for a new aircraft in accordance with an illustrative embodiment.

FIG. 46 is a flowchart of a process for managing aircraft modifications via a graphical user interface in accordance with an illustrative embodiment. Process 4600 is an example of one manner of managing aircraft modifications using a graphical user interface. Process 4600 may be implemented within, for example, virtual aircraft marketplace 100 in FIG. 1. In particular, process 4600 may be implemented using graphical user interface 108 described in FIGS. 1 and 2.

Process 4600 may begin by displaying a graphical user interface on a display system (operation 4602). A navigation section that includes at least one of a models menu control or a scenarios menu control is displayed in the graphical user interface (operation 4604). The models menu control is selectable to present a plurality of model options to a user in which the plurality of model options is customized based on at least one of identification information associated with the user or customer information retrieved for the customer with which the user is associated. Further, the scenarios menu control is selectable to present a plurality of scenario options to a user in which the plurality of scenario options is tailored for the customer based on the at least one of identification information associated with the user or customer information retrieved for the customer.

An effectivity selector that is selectable to allow the user to select a set of aircraft for modification is presented in the graphical user interface (operation 4606). Based on the set of aircraft selected, features that are displayed in the graphical user interface when an option from the plurality of model options or from the plurality of scenario options is selected are customized automatically (operation 4608), with the process terminating thereafter.

Figure 47:
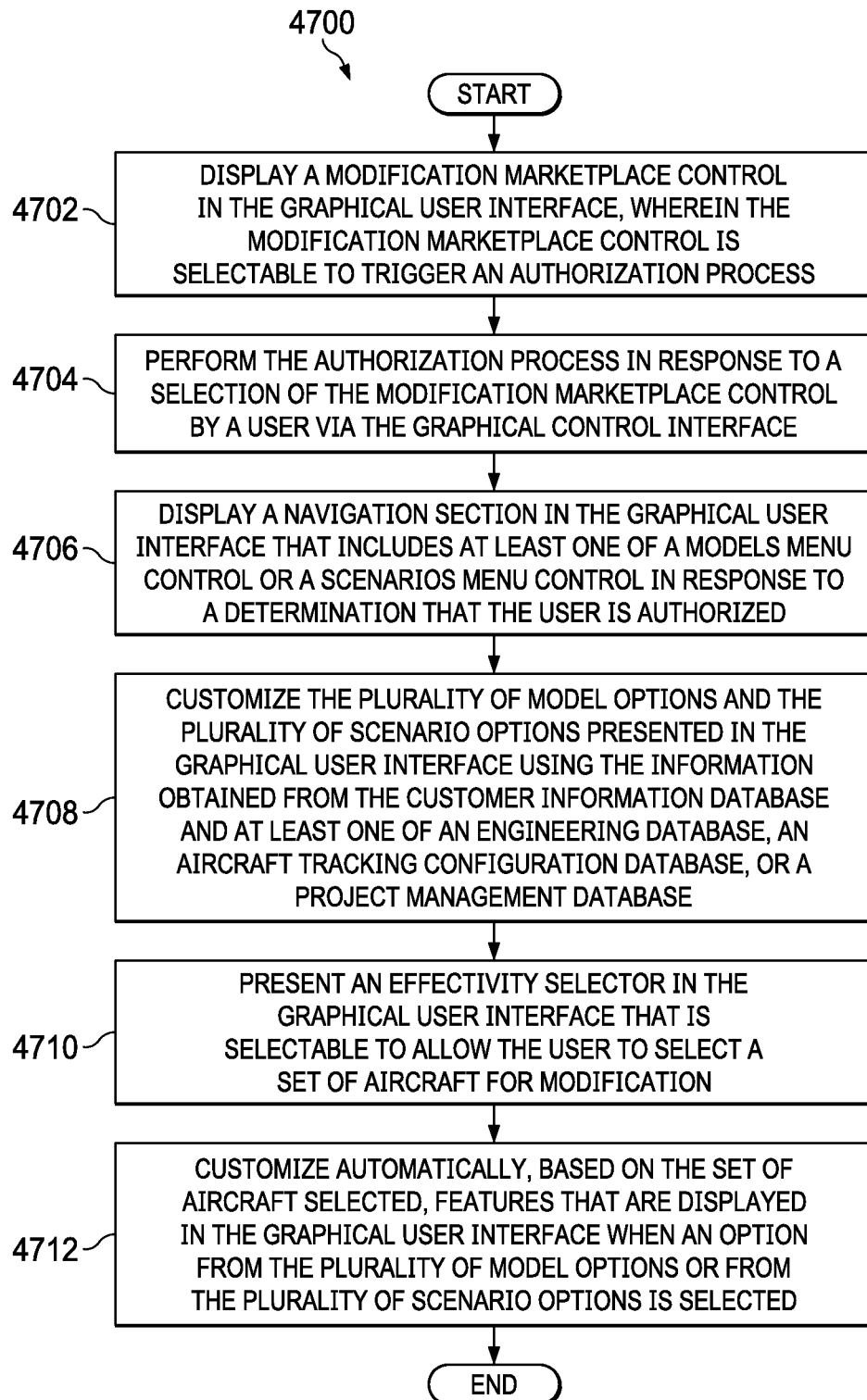
FIG. 47 is a flowchart of a process for managing modifications to an aircraft via a graphical user interface in accordance with an illustrative embodiment.

FIG. 47 is a flowchart of a process for managing aircraft modifications via a graphical user interface in accordance with an illustrative embodiment. Process 4700 is an example of one manner of managing aircraft modifications using a graphical user interface. Process 4700 may be implemented within, for example, virtual aircraft marketplace 100 in FIG. 1. In particular, process 4700 may be implemented using graphical user interface 108 described in FIGS. 1 and 2.

Process 4700 may begin by displaying a modification marketplace control in the graphical user interface (operation 4702). The modification marketplace control is selectable to trigger an authorization process. The authorization process is performed in response to a selection of the modification marketplace control by a user via the graphical control interface (operation 4704). The authorization process may include, for example, establishing a link with a customer information database, a licensing database, and an accounts receivable system to thereby obtain information for determining whether the user is authorized.

A navigation section that includes at least one of a models menu control or a scenarios menu control is displayed in the graphical user interface in response to a determination that the user is authorized (operation 4706). The models menu control is selectable to present a plurality of model options to a user and the scenarios menu control is selectable to present a plurality of scenario options to a user. The plurality of model options and the plurality of scenario options presented in the graphical user interface are customized using the information obtained from the customer information database and at least one of an engineering database, an aircraft tracking configuration database, or a project management database (operation 4708).

An effectivity selector that is selectable to allow the user to select a set of aircraft for modification is presented in the graphical user interface (operation 4710). Based on the set of aircraft selected, features that are displayed in the graphical user interface when an option from the plurality of model options or from the plurality of scenario options is selected are customized automatically (operation 4712), with the process terminating thereafter.

Figure 48:
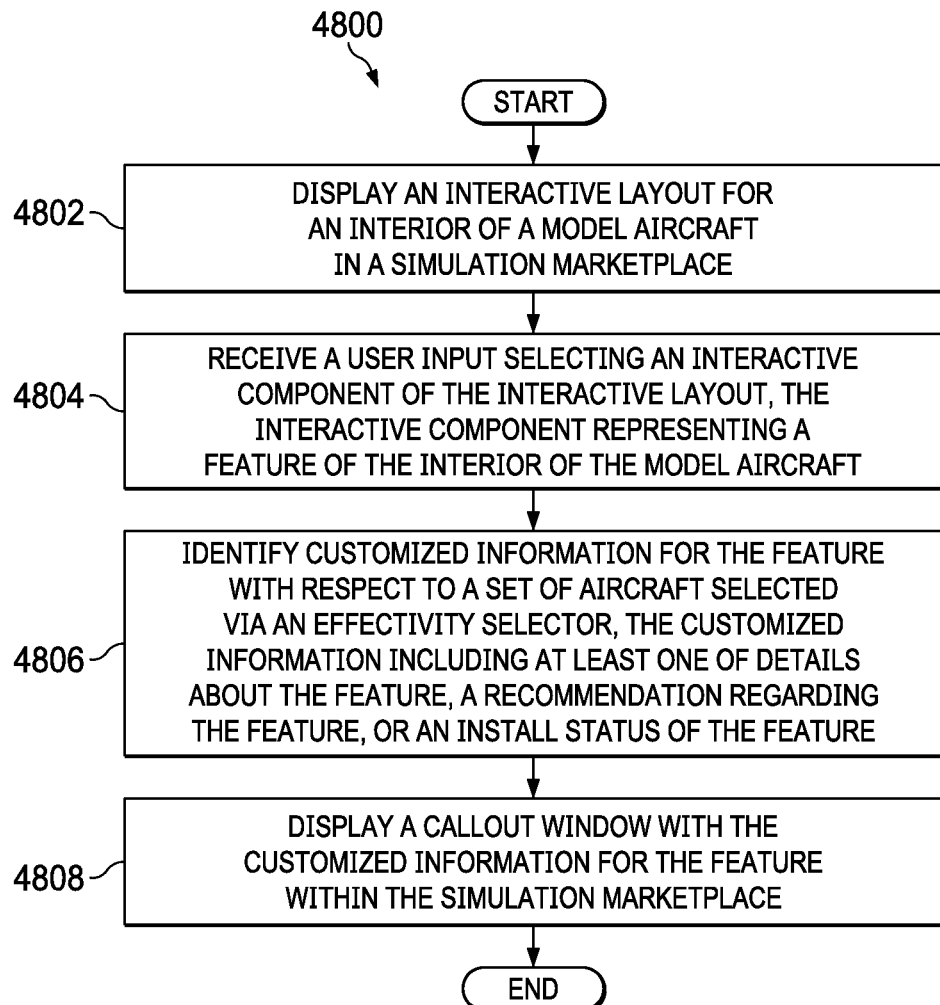
FIG. 48 is a flowchart of a process for managing modifications to an aircraft via a graphical user interface in accordance with an illustrative embodiment.

FIG. 48 is a flowchart of a process for managing aircraft modifications via a graphical user interface in accordance with an illustrative embodiment. Process 4800 is an example of one manner of managing aircraft modifications using a graphical user interface. Process 4800 may be implemented within, for example, virtual aircraft marketplace 100 in FIG. 1. In particular, process 4700 may be implemented within simulation marketplace 105 using graphical user interface 108 described in FIG. 1.

Process 4800 begins by displaying an interactive layout for an interior of a model aircraft in a simulation marketplace (operation 4802). The simulation marketplace is displayed to the user. In these illustrative examples, the model aircraft may be a representation of a simulator for a generic aircraft or for at least one of a set of aircraft selected by a user via an effectivity selector for simulation. In one illustrative example, the interactive layout is a layout of the cockpit or flight deck of the model aircraft. In other words, the interior layout may represent a simulator for the flight deck of the model aircraft. In some cases, the model aircraft may be the flight simulator.

A user input selecting an interactive component of the interactive layout is received, the interactive component representing a feature of the interior of the model aircraft (operation 4804). The interactive component may be an image, a portion of an image, a graphical feature, or a graphical control displayed as part of the interactive layout. For example, the interactive component may represent a head up display, a primary flight display unit, a multifunctional control and display unit, or some other type of feature. In some illustrative examples, the interactive component may represent a pilot control, a flight control button, or some other type of control or feature found in the cockpit or flight deck of the model aircraft. The user input received in operation 4804 may be, for example, a cursor being moved over the interactive component, a selection of the interactive component via a user input device (e.g., a touchscreen, a mouse, a joystick, a keyboard, etc.), or some other type of user input.

Next, customized information for the feature is identified with respect to a set of aircraft selected via an effectivity selector, the customized information including at least one of details about the feature, a recommendation regarding the feature, or an install status of the feature (operation 4806). In operation 4806, details about the feature may include at least one of, for example, without limitation, an identification of the feature, requirements regarding the feature, a price associated with the feature, a number of prerequisite features that are typically required to be installed before the feature is installed, a number of sub-features included as part of the feature, or some other type of feature.

A recommendation regarding the feature may include, for example, without limitation, a recommendation of one or more related features that should be installed after the feature. In some cases, the recommendation may identify what types of aircraft simulators in which the feature should be installed. In other cases, the recommendation may identify whether new regulations or requirements require installation of the feature in certain aircraft simulators. The install status of the feature may indicate, based on customer information retrieved for the user, whether the feature was previously installed in the simulator for each of the selected set of aircraft. In some cases, the install status may list each aircraft simulator owned or operated by the user in which the feature has already been installed.

A callout window with the customized information for the feature is then displayed in the simulation marketplace (operation 4808), with the process terminating thereafter. The callout window may be displayed over or adjacent to the interactive component. The callout window may also be referred to as a popup window. In other illustrative examples, operation 4808 may be instead performed by displaying the customized information in some other way within the simulation marketplace.

Figure 49:
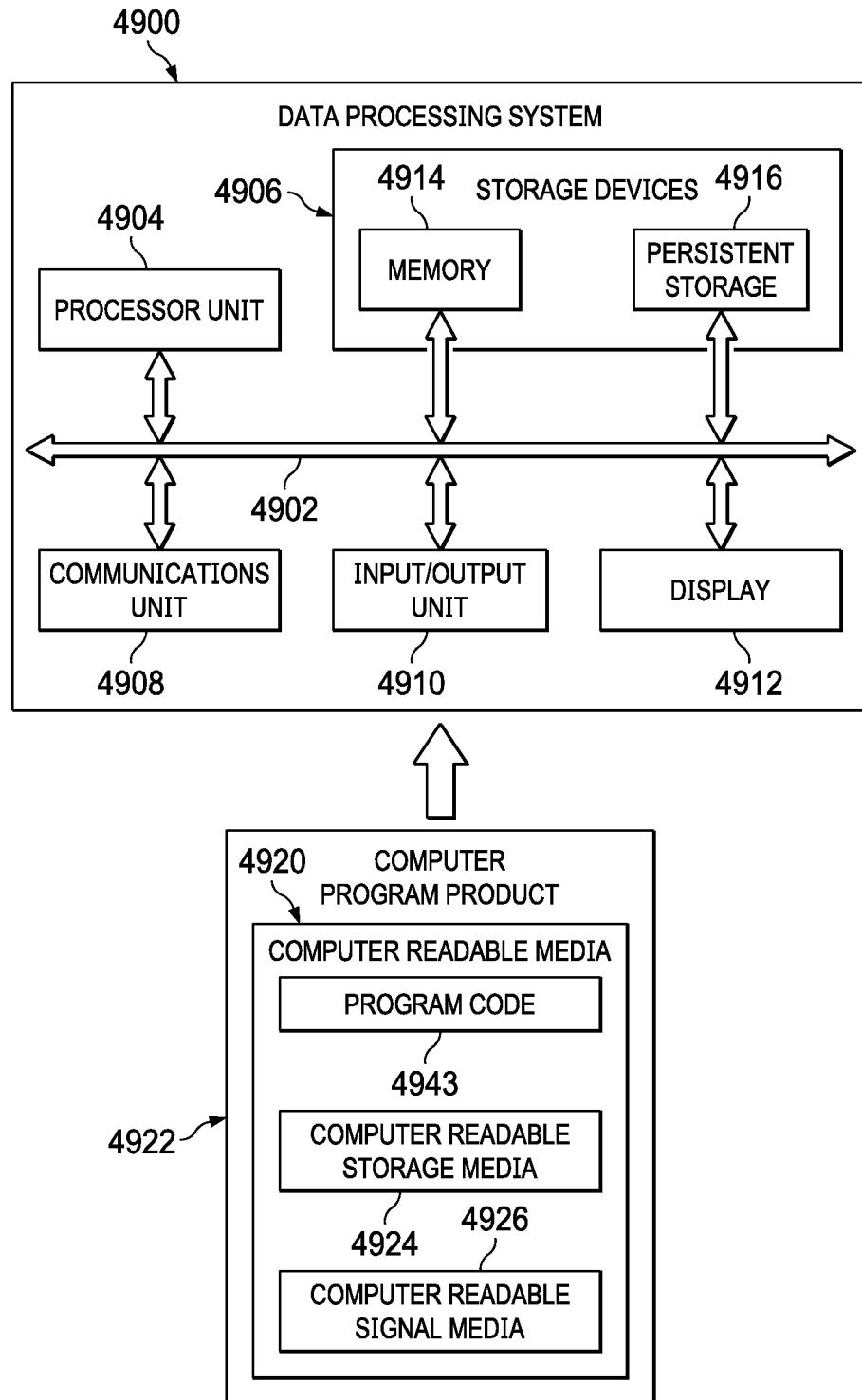
FIG. 49 is a block diagram of a data processing system in accordance with an example embodiment.

FIG. 49 is a block diagram of a data processing system, depicted in accordance with an illustrative embodiment. Data processing system 4900 may be used to computer system 106 in FIG. 1. As depicted, data processing system 4900 includes communications framework 4902, which provides communications between processor unit 4904, storage devices 4906, communications unit 4908, input/output unit 4910, and display 4912. In some cases, communications framework 4902 may be implemented as a bus system.

Processor unit 4904 is configured to execute instructions for software to perform a number of operations. Processor unit 4904 may comprise a number of processors, a multi-processor core, and/or some other type of processor, depending on the implementation. In some cases, processor unit 4904 may take the form of a hardware unit, such as a circuit system, an application specific integrated circuit (ASIC), a programmable logic device, or some other suitable type of hardware unit.

Instructions for the operating system, applications, and/or programs run by processor unit 4904 may be located in storage devices 4906. Storage devices 4906 may be in communication with processor unit 4904 through communications framework 4902. As used herein, a storage device, also referred to as a computer readable storage device, is any piece of hardware capable of storing information on a temporary and/or permanent basis. This information may include, but is not limited to, data, program code, and/or other information.

Memory 4914 and persistent storage 4916 are examples of storage devices 4906. Memory 4914 may take the form of, for example, a random access memory or some type of volatile or non-volatile storage device. Persistent storage 4916 may comprise any number of components or devices. For example, persistent storage 4916 may comprise a hard drive, a flash memory, a rewritable optical disk, a rewritable magnetic tape, or some combination of the above. The media used by persistent storage 4916 may or may not be removable.

Communications unit 4908 allows data processing system 4900 to communicate with other data processing systems and/or devices. Communications unit 4908 may provide communications using physical and/or wireless communications links.

Input/output unit 4910 allows input to be received from and output to be sent to other devices connected to data processing system 4900. For example, input/output unit 4910 may allow user input to be received through a keyboard, a mouse, and/or some other type of input device. As another example, input/output unit 4910 may allow output to be sent to a printer connected to data processing system 4900.

Display 4912 is configured to display information to a user. Display 4912 may comprise, for example, without limitation, a monitor, a touch screen, a laser display, a holographic display, a virtual display device, and/or some other type of display device.

In this illustrative example, the processes of the different illustrative embodiments may be performed by processor unit 4904 using computer-implemented instructions. These instructions may be referred to as program code, computer usable program code, or computer readable program code and may be read and executed by one or more processors in processor unit 4904.

In these examples, program code 4918 is located in a functional form on computer readable media 4920, which is selectively removable, and may be loaded onto or transferred to data processing system 4900 for execution by processor unit 4904. Program code 4918 and computer readable media 4920 together form computer program product 4922. In this illustrative example, computer readable media 4920 may be computer readable storage media 4924 or computer readable signal media 4926.

Computer readable storage media 4924 is a physical or tangible storage device used to store program code 4918 rather than a medium that propagates or transmits program code 4918. Computer readable storage media 4924 may be, for example, without limitation, an optical or magnetic disk or a persistent storage device that is connected to data processing system 4900.

Alternatively, program code 4918 may be transferred to data processing system 4900 using computer readable signal media 4926. Computer readable signal media 4926 may be, for example, a propagated data signal containing program code 4918. This data signal may be an electromagnetic signal, an optical signal, and/or some other type of signal that can be transmitted over physical and/or wireless communications links.

The illustration of data processing system 4900 in FIG. 49 is not meant to provide architectural limitations to the manner in which the illustrative embodiments may be implemented. The different illustrative embodiments may be implemented in a data processing system that includes components in addition to or in place of those illustrated for data processing system 4900. Further, components shown in FIG. 49 may be varied from the illustrative examples shown.

Figure 50:
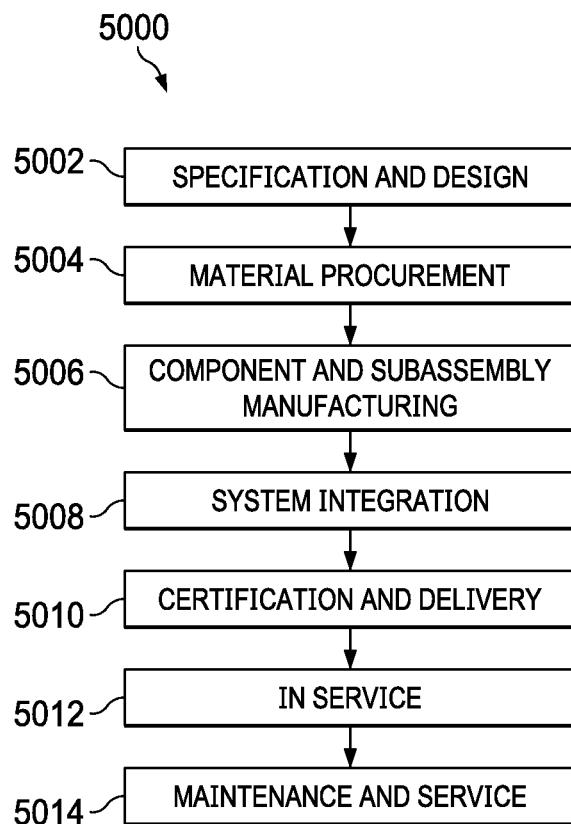
FIG. 50 is a block diagram of an aircraft manufacturing and service method in accordance with an example embodiment.
Figure 51:
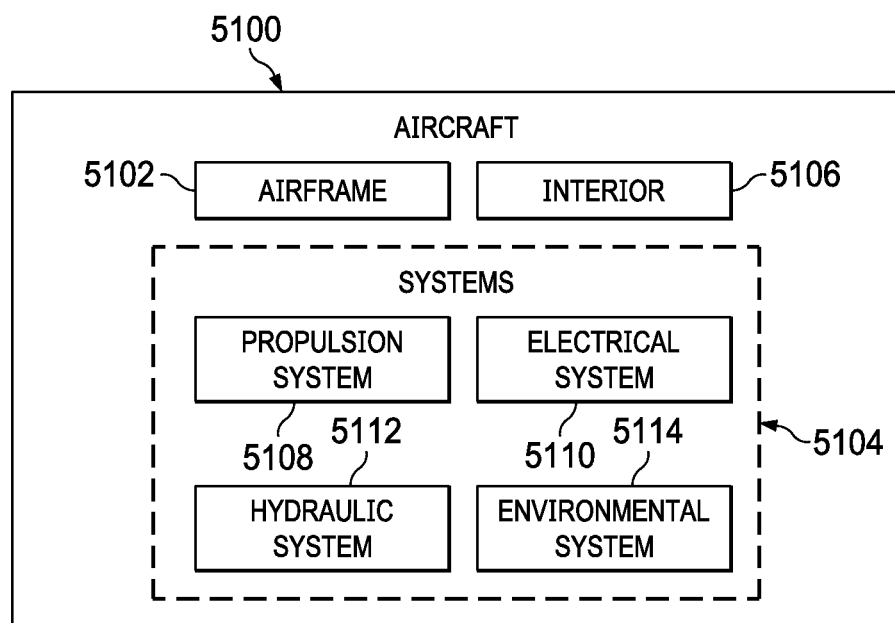
FIG. 51 is a block diagram of an aircraft in accordance with an example embodiment.

Illustrative embodiments of the disclosure may be described in the context of aircraft manufacturing and service method 5000 as shown in FIG. 50 and aircraft 5100 as shown in FIG. 51. FIG. 50 is a block diagram of an aircraft manufacturing and service method, depicted in accordance with an illustrative embodiment. Aircraft manufacturing and service method 5000 may be used to manufacture, for example, aircraft 490 in FIG. 1. During pre-production, aircraft manufacturing and service method 5000 may include specification and design 5002 of aircraft 5100 in FIG. 51 and material procurement 5004.

During production, component and subassembly manufacturing 5006 and system integration 5008 of aircraft 5100 in FIG. 51 takes place. Thereafter, aircraft 5100 in FIG. 51 may go through certification and delivery 5010 in order to be placed in service 5012. While in service 5012 by a customer, aircraft 5100 in FIG. 51 is scheduled for routine maintenance and service 5014, which may include modification, reconfiguration, refurbishment, and other maintenance or service.

Each of the processes of aircraft manufacturing and service method 5000 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

FIG. 51 is a block diagram of an aircraft, depicted in accordance with an illustrative embodiment. In this example, aircraft 5100 is produced by aircraft manufacturing and service method 5000 in FIG. 50 and may include airframe 5102 with plurality of systems 5104 and interior 5106. Examples of systems 5104 include one or more of propulsion system 5108, electrical system 5110, hydraulic system 5112, and environmental system 5114. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 5000 in FIG. 50. In particular, modifications may be made to aircraft 5100 using modification marketplace 102 and graphical user interface 108 in FIGS. 1 and 2. For example, modifications may be made to aircraft 5100 during any one or more of system integration 5008, certification and delivery 5010, in service 5012, and routine maintenance and service 5014. When aircraft 5100 is a new aircraft being built, production marketplace 104 and graphical user interface 108 may be used to build a new configuration for aircraft 5100. For example, production marketplace 104 may be used to build a new configuration for aircraft 5100 during any one or more of the stages of specification and design 5002, material procurement 5004, system integration 5008, or certification and delivery 5010.

In one illustrative example, components or subassemblies produced in component and subassembly manufacturing 5006 in FIG. 50 may be fabricated or manufactured in a manner similar to components or subassemblies produced while aircraft 5100 is in service 5012 in FIG. 50. As yet another example, one or more apparatus embodiments, method embodiments, or a combination thereof may be utilized during production stages, such as component and subassembly manufacturing 5006 and system integration 5008 in FIG. 50. One or more apparatus embodiments, method embodiments, or a combination thereof may be utilized while aircraft 5100 is in service 5012 and/or during maintenance and service 5014 in FIG. 50. The use of a number of the different illustrative embodiments may substantially expedite the assembly of and/or reduce the cost of aircraft 5100.

As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required. For example, without limitation, "at least one of item A, item B, or item C" or "at least one of item A, item B, and item C" may mean item A; item A and item B; item B; item A, item B, and item C; item B and item C; or item A and C. In some cases, "at least one of item A, item B, or item C" or "at least one of item A, item B, and item C" may mean, but is not limited to, two of item A, one of item B, and five of item C; three of item B and six of item C; or some other suitable combination.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different example embodiments has been presented for purposes of illustration and description, and is not intended to be exhaustive or limited to the embodiments in the form disclosed. Many modifications and variations will be apparent to those of ordinary skill in the art. Further, different example embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system for managing modifications to aircraft, the system comprising a computer system which comprises:
    a graphical user interface for display on a display system;
    a processor unit;
    computer storage; and
    a communications unit;
    wherein the system comprises a modification marketplace implemented by at least the computer system and presented to a user via the graphical user interface,
    wherein the modification marketplace is in communication with a plurality of data systems via one or more communications links, each communications link including at least one of a wired link, a wireless link, or an optical link, wherein the modification marketplace comprises:
an access manager that uses at least one of the one or more communications links to communicate to a customer information database contained in the plurality of data systems in response to receiving a launch input for the modification marketplace entered by the user via the graphical user interface, wherein the plurality of data systems comprises data-system computer storage and contains aircraft product information and information on orders for retrofit features;
wherein the customer information database includes, in the data-system computer storage, identification information and customer information associated with the user;
wherein the access manager determines, by the computer system, whether the user is authorized to access the modification marketplace implemented by at least the computer system, wherein accessing the modification marketplace is performed using the identification information associated with the user and a set of filters implemented by the computer system, the set of filters including a business scenario filter, a credit filter, and a license filter,
wherein the business scenario filter is used to determine what business scenarios are applicable to a customer associated with the user;
wherein the credit filter is used to determine, using information stored in the data-system computer storage, a credit worthiness of the customer based on a customer rating of the customer; and
wherein the license filter is used to determine, using information stored in the data-system computer storage, whether the customer has a license with an entity hosting the modification marketplace;
wherein the access manager provides, via the graphical user interface, a selected level of access to the aircraft product information based on the customer information associated with the user; and
wherein the modification marketplace further comprises a retrofit manager that tracks retrofit features installed on the aircraft;
wherein the graphical user interface comprises:
a first section for receiving a first user input selecting a set of aircraft to provide to the retrofit manager;
a second section for receiving a second user input selecting one or more retrofit features; and
a third section for providing information reflecting an installation status of the identified one or more retrofit features on each of the identified one or more aircraft;
wherein the retrofit manager identifies the set of aircraft and the one or more retrofit features and, based on information stored in the data-system computer storage, provides information reflecting the installation status of the one or more retrofit features on each of the set of aircraft selected.

2. The system of claim 1, wherein the customer information includes at least one of a customer type or an owner status associated with the user.

3. The system of claim 2, wherein the modification marketplace identifies a fleet associated with the user based on the customer information associated with the user and wherein the selected level of access allows access to only a portion of the aircraft product information that is relevant to the fleet.

4. The system of claim 3, wherein the owner status indicates whether the user is associated with a customer that owns the fleet, wherein a number of cart options available to the user is limited based on whether the customer owns the fleet, and wherein the cart options include a purchase option, a firm proposal option, and a rough order of magnitude option.

5. The system of claim 1, wherein the modification marketplace displays, in the first section, an effectivity selector in the graphical user interface that allows the user to select the set of aircraft to be modified from the plurality of aircraft, wherein the effectivity selector provides access to effectivity information for each aircraft in the plurality of aircraft.

6. The system of claim 1, wherein the set of filters includes at least one of a purchase authorization filter or a product access filter, wherein:
the purchase authorization filter limits features available to the user based on an owner status of the customer; and
the product access filter limits features available to the user based on a customer type of the customer.

7. The system of claim 6, wherein the set of filters includes the purchase authorization filter.

8. The system of claim 6, wherein the set of filters includes the product access filter.

9. The system of claim 1, therein the retrofit manager performs a configuration check to determine if each of the one or more retrofit features was previously installed on the aircraft of the set of aircraft selected, the configuration check being performed by the computer system while allowing the modification marketplace to be explored by the user via the graphical user interface.

10. The system of claim 1, wherein the modification marketplace further comprises:
a layout tool that presents at least one of an interactive interior layout or an interactive flight deck layout that allows the user to make feature selections for at least one of an interior of an aircraft or a flight deck of the aircraft, respectively.

11. The system of claim 1, wherein the modification marketplace further comprises:
a weight change manager that enables the user to make feature selections based on a desired weight change for an aircraft, wherein the weight change manager uses weight requirement information and operational weight information obtained from a weight data system to determine whether the desired weight change meets requirements.

12. The system of claim 1, wherein the retrofit manager providing information reflecting the installation status of the one or more retrofit features comprises the retrofit manager generating a notification via the graphical user interface of any retrofit features already installed on at least one of the set of aircraft.

13. The system of claim 1, wherein the retrofit manager prevents purchase of a retrofit feature for installation on each of the set of aircraft on which the retrofit feature is already installed.

14. A method for managing aircraft modification, the method comprising performing operations by a system for managing modifications to aircraft, the system comprising a computer system which comprises:
a graphical user interface for display on a display system;
a processor unit;
computer storage; and
a communications unit;

wherein the system comprises a modification marketplace implemented by at least the computer system and presented to a user via the graphical user interface, wherein the modification marketplace is in communication with a plurality of data systems via one or more communications links, each communications link including at least one of a wired link, a wireless link, or an optical link, wherein the modification marketplace comprises:

an access manager that uses at least one of the one or more communications links to communicate to a customer information database contained in the plurality of data systems in response to receiving a launch input for the modification marketplace entered by the user via the graphical user interface, wherein the plurality of data systems comprises data-system computer storage and contains aircraft product information and information on orders for retrofit features;

wherein the customer information database includes, in the data-system computer storage, identification information and customer information associated with the user;

wherein the access manager determines, by the computer system, whether the user is authorized to access the modification marketplace implemented by at least the computer system, wherein accessing the modification marketplace is performed using the identification information associated with the user and a set of filters implemented by the computer system, the set of filters including a business scenario filter, a credit filter, and a license filter, wherein the business scenario filter is used to determine what business scenarios are applicable to a customer associated with the user;

wherein the credit filter is used to determine, using information stored in the data-system computer storage, a credit worthiness of the customer based on a customer rating of the customer; and wherein the license filter is used to determine, using information stored in the data-system computer storage, whether the customer has a license with an entity hosting the modification marketplace;

wherein the access manager provides, via the graphical user interface, a selected level of access to the aircraft product information based on the customer information associated with the user; and wherein the modification marketplace further comprises a retrofit manager that tracks retrofit features installed on the aircraft;

wherein the graphical user interface comprises:

a first section for receiving a first user input selecting a set of aircraft to provide to the retrofit manager;

a second section for receiving a second user input selecting one or more retrofit features; and a third section for providing information reflecting an installation status of the identified one or more retrofit features on each of the identified one or more aircraft;

wherein the retrofit manager identifies the set of aircraft and the one or more retrofit features and, based on information stored in the data-system computer storage, provides information reflecting the installation status of the one or more retrofit features on each of the set of aircraft selected;

wherein the operations comprise:

using the one or more links to access the customer information database in response to receiving the launch input for the modification marketplace entered by the user via the graphical user interface, wherein the customer information database includes identification information and customer information associated with the user;

determining whether the user is authorized to access the modification marketplace using the identification information associated with the user;

using the one or more links to access an engineering database containing the aircraft product information in response to a determination that the user is authorized to access the modification marketplace; and providing, via the graphical user interface, the selected level of access to the aircraft product information in the engineering database based on the customer information associated with the user.

15. The method of claim 14, further comprising:

receiving, via the graphical user interface, user input selecting the set of aircraft; and customizing an experience of the user within the modification marketplace based on the set of aircraft selected.

16. The method of claim 14, wherein providing, via the graphical user interface, the selected level of access to the aircraft product information comprises:

retrieving the customer information from the customer information database, wherein the customer information includes at least one of a customer type or an owner status associated with the user; and limiting access of the user to the selected level of access based on the at least one of the customer type or the owner status associated with the user such that the user is allowed to only access a portion of the aircraft product information in the engineering database.

17. The method of claim 16, wherein providing, via the graphical user interface, the selected level of access to the aircraft product information further comprises:

identifying a fleet associated with the user based on the customer information associated with the user, wherein the selected level of access allows access to only a portion of the aircraft product information that is relevant to the fleet.

18. The method of claim 17, wherein the owner status indicates whether the user is associated with the customer that owns the fleet, wherein a number of cart options available to the user is limited based on whether the customer owns the fleet, and wherein the cart options include a purchase option, a firm proposal option, and a rough order of magnitude option.

19. The method of claim 14, further comprising:

identifying a plurality of aircraft relevant to the user based on the customer information; and displaying an effectivity selector in the graphical user interface that allows the user to select the set of aircraft to be modified from the plurality of aircraft, wherein the effectivity selector provides access to effectivity information for each aircraft in the plurality of aircraft.

20. The method of claim 14, wherein determining whether the user is authorized to access the modification marketplace comprises:

using the one or more links to access a licensing database in response to receiving the launch input; and determining, based on the identification information associated with the user and licensing information in the licensing database associated with the user, whether the user is associated with the customer having a valid license with the entity hosting the modification marketplace.

21. The method of claim 20, wherein determining whether the user is authorized to access the modification marketplace further comprises:
denying access to the modification marketplace in response to a determination that the customer does not have the valid license.

22. The method of claim 20, wherein determining whether the user is authorized to access the modification marketplace further comprises:
using the one or more links to access an accounts receivable system in response to a determination that the user is associated with the customer having the valid license with the entity; and
determining, based on credit information in the accounts receivable system associated with the customer, whether a credit worthiness of the customer meets threshold criteria.

23. The method of claim 22, wherein determining whether the user is authorized to access the modification marketplace further comprises:
denying access to the modification marketplace if the credit worthiness does not meet the threshold criteria.

24. The method of claim 22, wherein determining whether the user is authorized to access the modification marketplace further comprises:
determining whether the credit worthiness associated with the customer indicates that an up-front payment is required when a purchase is made via the modification marketplace, in response to a determination that the credit worthiness of the customer meets the threshold criteria; and
computing up-front payment information for use in forming a final purchase contract for the user in response to a determination that the credit worthiness indicates that the up-front payment is required.

25. The method of claim 14, wherein determining whether the user is authorized to access the modification marketplace comprises:
determining the selected level of access to be provided to the user using at least one of a purchase authorization filter, a product access filter, or the business scenario filter,
wherein the purchase authorization filter limits features available to the user based on an owner status of a customer with which the user is associated;
wherein the product access filter limits features available to the user based on a customer type of the customer; and
wherein the business scenario filter is used to determine what types of business scenarios are applicable to the customer.

26. The method of claim 14, further comprising:
customizing an experience of the user within the modification marketplace based on the set of aircraft selected by the user.

27. The method of claim 26, wherein customizing the experience of the user comprises:
receiving a feature selection via the graphical user interface;
retrieving corresponding information from at least one of the customer information database, an engineering database, an aircraft tracking configuration database, a contract database, or a project management database in response to receiving the feature selection; and
determining whether the feature selection includes a feature already installed on at least one of the set of aircraft selected based on the corresponding information retrieved.

28. The method of claim 27, wherein customizing the experience of the user further comprises: alerting the user, via the graphical user interface, that the feature was previously installed on the at least one of the set of aircraft.

29. The method of claim 26, wherein customizing the experience of the user comprises:
receiving a feature selection via the graphical user interface;
generating, automatically, pricing information for the feature selection based on a number of aircraft included in the set of aircraft selected.

30. A method for managing aircraft modification, the method comprising performing operations by a system for managing modifications to aircraft, the system comprising a computer system which comprises:
a graphical user interface for display on a display system;
a processor unit;
computer storage; and
a communications unit;
wherein the system comprises a modification marketplace implemented by at least the computer system and presented to a user via the graphical user interface,
wherein the modification marketplace is in communication with a plurality of data systems via one or more communications links, each communications link including at least one of a wired link, a wireless link, or an optical link,
wherein the modification marketplace comprises:
an access manager that uses at least one of the one or more communications links to communicate to a customer information database contained in the plurality of data systems in response to receiving a launch input for the modification marketplace entered by the user via the graphical user interface,
wherein the plurality of data systems comprises data-system computer storage and contains aircraft product information and information on orders for retrofit features;
wherein the customer information database includes, in the data-system computer storage, identification information and customer information associated with the user;
wherein the access manager determines, by the computer system, whether the user is authorized to access the modification marketplace implemented by at least the computer system, wherein accessing the modification marketplace is performed using the identification information associated with the user and a set of filters implemented by the computer system, the set of filters including a business scenario filter, a credit filter, and a license filter,
wherein the business scenario filter is used to determine what business scenarios are applicable to a customer associated with the user;
wherein the credit filter is used to determine, using information stored in the data-system computer storage, a credit worthiness of the customer based on a customer rating of the customer; and
wherein the license filter is used to determine, using information stored in the data-system computer storage, whether the customer has a license with an entity hosting the modification marketplace;

wherein the access manager provides, via the graphical user interface, a selected level of access to the aircraft product information based on the customer information associated with the user; and wherein the modification marketplace further comprises a retrofit manager that tracks retrofit features installed on the aircraft;

wherein the graphical user interface comprises:

a first section for receiving a first user input selecting a set of aircraft to provide to the retrofit manager;

a second section for receiving a second user input selecting one or more retrofit features; and a third section for providing information reflecting an installation status of the identified one or more retrofit features on each of the identified one or more aircraft;

wherein the retrofit manager identifies the set of aircraft and the one or more retrofit features and, based on information stored in the data-system computer storage, provides information reflecting the installation status of the one or more retrofit features on each of the set of aircraft selected;

wherein the operations comprise:

using the one or more links to access the customer information database in response to receiving the launch input for the modification marketplace entered by the user via the graphical user interface, wherein the customer information database includes identification information and customer information associated with the user;

determining whether the user is authorized to access the modification marketplace using the identification information associated with the user;

using the one or more links to access at least one of the plurality of data systems containing the aircraft product information in response to a determination that the user is authorized to access the modification marketplace;

providing, via the graphical user interface, the selected level of access to the aircraft product information based on the customer information associated with the user;

receiving, via the graphical user interface, user input selecting the set of aircraft;

receiving, via the graphical user interface, a feature selection to modify the set of aircraft;

retrieving corresponding information from at least one of the plurality of data systems in response to receiving the feature selection;

determining whether the feature selection includes a feature already installed on at least one of the set of aircraft selected based on the corresponding information retrieved; and alerting the user, via the graphical user interface, that the feature was previously installed on the at least one of the set of aircraft.

\* \* \* \* \*

UNITED STATES PATENT AND TRADEMARK OFFICE
CERTIFICATE OF CORRECTION

PATENT NO. : 11,605,122 B2
APPLICATION NO. : 16/573486
DATED : March 14, 2023
INVENTOR(S) : Patrick C. Fahey, Sheldon D. Gilley and Mark A. Bowe It is certified that error appears in the above-identified patent and that said Letters Patent is hereby corrected as shown below:

In the Specification

In the Cross Reference to Related Applications:

In Column 1, Line 10, change "patent application Ser. No." to --Patent Application No.--

In Column 1, Line 12, change "patent application Ser. No." to --Patent Application No.--

In the Claims

In Claim 9, Column 44, Line 27, change "therein" to --wherein--

Signed and Sealed this
Eighteenth Day of April, 2023

Katherine Kelly Vidal
*Director of the United States Patent and Trademark Office*